(12) United States Patent
Rogers et al.

(10) Patent No.: US 8,460,424 B2
(45) Date of Patent: Jun. 11, 2013

(54) AEROSOL SEPARATOR; AND METHOD

(75) Inventors: Robert M. Rogers, Minnetonka, MN (US); Brad E. Kahlbaugh, Bloomington, MN (US); Paul L. Kojetin, Rosemount, MN (US); Keh B. Dema, Plymouth, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 13/461,228

(22) Filed: May 1, 2012

(65) Prior Publication Data

US 2012/0210689 A1 Aug. 23, 2012

Related U.S. Application Data

(63) Continuation of application No. 11/883,690, filed as application No. PCT/US2006/004639 on Jan. 31, 2006, now Pat. No. 8,177,875.

(60) Provisional application No. 60/650,051, filed on Feb. 4, 2005.

(51) Int. Cl.
*B01D 46/00* (2006.01)

(52) U.S. Cl.
USPC ............... 55/486; 55/385.3; 55/487; 55/498; 55/510; 55/520

(58) Field of Classification Search
USPC ............... 55/211, 385.3, 486–487, 510, 520, 55/524, 527–528; 210/490, 500.1, 500.26, 210/503, 509
See application file for complete search history.

(56) References Cited

U.S. PATENT DOCUMENTS

| | | | |
|---|---|---|---|
| 431,108 | A | 7/1890 | Cowley |
| 657,860 | A | 9/1900 | Cummings |
| 2,764,602 | A | 9/1956 | Ahlbrecht et al. |
| 2,764,603 | A | 9/1956 | Ahlbrecht et al. |
| 2,801,706 | A | 8/1957 | Asker |
| 2,803,656 | A | 8/1957 | Ahlbrecht et al. |
| 3,019,127 | A | 1/1962 | Czerwonka et al. |
| 3,073,735 | A | 1/1963 | Till et al. |
| 3,147,064 | A | 9/1964 | Brown et al. |
| 3,252,270 | A | 5/1966 | Pall et al. |
| 3,255,131 | A | 6/1966 | Ahlbrecht et al. |

(Continued)

FOREIGN PATENT DOCUMENTS

| | | |
|---|---|---|
| DE | 4344819 | 7/1994 |
| DE | 202005020566 | 5/2005 |

(Continued)

OTHER PUBLICATIONS

Lennox-Kerr, "Advances in Textiles Technology", International Newsletters Ltd., UK Sep. 2003, vol. 153, 3 pages.

(Continued)

*Primary Examiner* — Jason M Greene
*Assistant Examiner* — Karla Hawkins
(74) *Attorney, Agent, or Firm* — Pauly, Devries, Smith & Deffner, L.L.C.

(57) ABSTRACT

Crankcase ventilation arrangements are shown. Preferred wet laid media materials, for use in such arrangements are described. Also described and shown are example crankcase ventilation components, parts for use with a preferred media described and characterized.

14 Claims, 23 Drawing Sheets

U.S. PATENT DOCUMENTS

| | | |
|---|---|---|
| 3,279,151 A | 10/1966 | Kauer, Jr. et al. |
| 3,303,621 A | 2/1967 | Hill |
| 3,448,038 A | 6/1969 | Pall et al. |
| 3,450,755 A | 6/1969 | Ahlbrecht et al. |
| 3,505,794 A | 4/1970 | Nutter et al. |
| 3,589,956 A | 6/1971 | Krantz et al. |
| 3,595,731 A | 7/1971 | Davies et al. |
| 3,616,160 A | 10/1971 | Wincklhofer et al. |
| 3,616,183 A | 10/1971 | Brayford et al. |
| 3,620,819 A | 11/1971 | Croce |
| 3,639,195 A | 2/1972 | Sanders |
| 3,653,181 A | 4/1972 | Becker |
| 3,676,242 A | 7/1972 | Prentice |
| 3,705,480 A | 12/1972 | Wireman |
| 3,714,763 A | 2/1973 | Suzuki |
| 3,728,848 A | 4/1973 | Vest, Jr. |
| 3,744,256 A | 7/1973 | Cobb et al. |
| 3,826,067 A | 7/1974 | Wilder et al. |
| 3,841,953 A | 10/1974 | Lohkamp et al. |
| 3,849,241 A | 11/1974 | Butin et al. |
| 3,878,014 A | 4/1975 | Melead |
| 3,891,417 A | 6/1975 | Wade |
| 3,900,648 A | 8/1975 | Smith |
| 3,917,448 A | 11/1975 | Wood et al. |
| 3,934,238 A | 1/1976 | Pavlou |
| 3,937,860 A | 2/1976 | Gusman et al. |
| 3,971,373 A | 7/1976 | Braun |
| 3,972,694 A | 8/1976 | Head |
| 3,998,988 A | 12/1976 | Shimomai et al. |
| 4,042,522 A | 8/1977 | Falk |
| 4,045,350 A | 8/1977 | Kupf et al. |
| 4,047,914 A | 9/1977 | Hansen et al. |
| 4,069,158 A | 1/1978 | Bertocchio et al. |
| 4,069,244 A | 1/1978 | Mueller |
| 4,079,675 A | 3/1978 | Beumel, Jr. |
| 4,088,726 A | 5/1978 | Cumbers |
| 4,090,967 A | 5/1978 | Falk |
| 4,100,324 A | 7/1978 | Anderson et al. |
| 4,102,785 A | 7/1978 | Head et al. |
| 4,111,815 A | 9/1978 | Walker et al. |
| 4,160,059 A | 7/1979 | Samejima |
| 4,161,422 A | 7/1979 | Lawson et al. |
| 4,161,590 A | 7/1979 | Mueller |
| 4,161,602 A | 7/1979 | Mueller |
| 4,169,754 A | 10/1979 | Perrotta |
| 4,177,141 A | 12/1979 | Nakamura et al. |
| 4,189,338 A | 2/1980 | Ejima et al. |
| 4,196,027 A | 4/1980 | Walker et al. |
| 4,210,540 A | 7/1980 | Perrotta |
| 4,211,819 A | 7/1980 | Kunimune et al. |
| 4,227,904 A | 10/1980 | Kasmark, Jr. et al. |
| 4,231,768 A | 11/1980 | Seibert et al. |
| 4,234,655 A | 11/1980 | Kunimune et al. |
| 4,239,278 A | 12/1980 | Skilliter, Jr. |
| 4,239,516 A | 12/1980 | Klein |
| 4,254,731 A | 3/1981 | Taylor |
| 4,267,016 A | 5/1981 | Okazaki et al. |
| 4,269,888 A | 5/1981 | Ejima et al. |
| 4,272,318 A | 6/1981 | Walker et al. |
| 4,274,914 A | 6/1981 | Keith et al. |
| 4,309,475 A | 1/1982 | Hoffman, Jr. |
| 4,318,774 A | 3/1982 | Powell et al. |
| 4,327,936 A | 5/1982 | Sekiguchi |
| 4,370,152 A | 1/1983 | Luper |
| 4,388,086 A | 6/1983 | Bauer et al. |
| 4,423,995 A | 1/1984 | Karis |
| 4,429,001 A | 1/1984 | Kolpin et al. |
| 4,443,233 A | 4/1984 | Moran |
| 4,457,974 A | 7/1984 | Summers |
| 4,460,642 A | 7/1984 | Errede et al. |
| 4,487,617 A | 12/1984 | Dienes et al. |
| 4,500,384 A | 2/1985 | Tomioka et al. |
| 4,501,598 A | 2/1985 | Long |
| RE31,849 E | 3/1985 | Klein |
| 4,504,289 A | 3/1985 | Waller et al. |
| 4,516,994 A | 5/1985 | Kocher |
| 4,536,440 A | 8/1985 | Berg |
| 4,545,789 A | 10/1985 | Lato |
| 4,548,624 A | 10/1985 | Waller |
| 4,551,378 A | 11/1985 | Carey, Jr. |
| 4,552,603 A | 11/1985 | Harris, Jr. et al. |
| 4,555,430 A | 11/1985 | Mays |
| 4,579,774 A | 4/1986 | Kuwazuru et al. |
| 4,597,218 A | 7/1986 | Friemel et al. |
| 4,604,205 A | 8/1986 | Ayers |
| 4,610,678 A | 9/1986 | Weisman et al. |
| 4,627,863 A | 12/1986 | Klein |
| 4,650,506 A | 3/1987 | Barris et al. |
| 4,657,804 A | 4/1987 | Mays et al. |
| 4,659,467 A | 4/1987 | Spearman |
| 4,661,132 A | 4/1987 | Thornton et al. |
| 4,676,807 A | 6/1987 | Miller et al. |
| 4,677,929 A | 7/1987 | Harris |
| 4,681,801 A | 7/1987 | Eian et al. |
| 4,684,576 A | 8/1987 | Tabor et al. |
| 4,688,511 A | 8/1987 | Gerlach et al. |
| 4,689,057 A | 8/1987 | Gasper |
| 4,713,285 A | 12/1987 | Klein |
| 4,726,817 A | 2/1988 | Roger |
| 4,729,371 A | 3/1988 | Krueger et al. |
| 4,732,809 A | 3/1988 | Harris, Jr. et al. |
| 4,734,208 A | 3/1988 | Pall et al. |
| 4,753,730 A | 6/1988 | Maurer |
| 4,759,782 A | 7/1988 | Miller et al. |
| 4,764,189 A | 8/1988 | Yanagawa et al. |
| 4,765,812 A | 8/1988 | Homonoff et al. |
| 4,765,915 A | 8/1988 | Diehl |
| 4,807,619 A | 2/1989 | Dyrud et al. |
| 4,814,033 A | 3/1989 | Spearman et al. |
| 4,816,224 A | 3/1989 | Vogel et al. |
| 4,838,903 A | 6/1989 | Thomaides et al. |
| 4,838,905 A | 6/1989 | Billiet et al. |
| 4,840,838 A | 6/1989 | Wyss |
| 4,868,032 A | 9/1989 | Eian et al. |
| 4,874,666 A | 10/1989 | Kubo et al. |
| 4,886,058 A | 12/1989 | Brostrom et al. |
| 4,889,764 A | 12/1989 | Chenoweth et al. |
| 4,904,385 A | 2/1990 | Wessling et al. |
| 4,910,064 A | 3/1990 | Sabee |
| 4,911,789 A | 3/1990 | Rieunier et al. |
| 4,917,714 A | 4/1990 | Kinsley, Jr. |
| 4,919,753 A | 4/1990 | Johnson et al. |
| 4,933,129 A | 6/1990 | Huykman |
| 4,983,434 A | 1/1991 | Sassa |
| 5,022,964 A | 6/1991 | Crane et al. |
| 5,027,781 A | 7/1991 | Lewis |
| 5,034,040 A | 7/1991 | Walcott et al. |
| 5,042,468 A | 8/1991 | Lambert |
| 5,045,210 A | 9/1991 | Chen et al. |
| 5,057,368 A | 10/1991 | Largman et al. |
| 5,066,538 A | 11/1991 | Huykman |
| 5,068,141 A | 11/1991 | Kubo et al. |
| 5,080,791 A | 1/1992 | Sims |
| 5,082,476 A | 1/1992 | Kahlbaugh et al. |
| 5,087,278 A | 2/1992 | Suzuki |
| 5,089,119 A | 2/1992 | Day et al. |
| 5,092,911 A | 3/1992 | Williams et al. |
| 5,104,537 A | 4/1992 | Stifelman et al. |
| 5,108,827 A | 4/1992 | Gessner |
| 5,110,330 A | 5/1992 | Loughran |
| 5,131,387 A | 7/1992 | French et al. |
| 5,135,792 A | 8/1992 | Hogan |
| 5,147,553 A | 9/1992 | Waite |
| 5,147,721 A | 9/1992 | Baron et al. |
| 5,167,764 A | 12/1992 | Nielsen et al. |
| 5,167,765 A | 12/1992 | Nielsen et al. |
| 5,190,569 A | 3/1993 | McGrath |
| 5,190,812 A | 3/1993 | Joseph et al. |
| 5,208,098 A | 5/1993 | Stover |
| 5,212,131 A | 5/1993 | Belding |
| 5,238,474 A | 8/1993 | Kahlbaugh et al. |
| 5,246,474 A | 9/1993 | Greatorex |
| 5,246,772 A | 9/1993 | Manning |
| 5,275,743 A | 1/1994 | Miller et al. |
| 5,283,106 A | 2/1994 | Seiler et al. |
| 5,284,704 A | 2/1994 | Kochesky et al. |
| 5,284,997 A | 2/1994 | Spearman et al. |

| | | | | | | |
|---|---|---|---|---|---|---|
| 5,302,443 A | 4/1994 | Manning et al. | | 5,853,439 A | 12/1998 | Gieseke et al. |
| 5,307,796 A | 5/1994 | Kronzer et al. | | 5,885,390 A | 3/1999 | Alkire et al. |
| 5,328,758 A | 7/1994 | Markell et al. | | 5,885,696 A | 3/1999 | Groeger |
| 5,332,426 A | 7/1994 | Tang et al. | | 5,911,213 A | 6/1999 | Ahlborn et al. |
| 5,334,446 A | 8/1994 | Quantrille et al. | | 5,932,104 A | 8/1999 | Kawamura |
| 5,336,286 A | 8/1994 | Alexander et al. | | 5,935,879 A | 8/1999 | Helwig et al. |
| 5,342,418 A | 8/1994 | Jesse | | 5,935,883 A | 8/1999 | Pike |
| 5,344,698 A | 9/1994 | Rock et al. | | 5,948,344 A | 9/1999 | Cusick et al. |
| 5,354,603 A | 10/1994 | Erede et al. | | 5,952,092 A | 9/1999 | Groeger et al. |
| 5,364,456 A | 11/1994 | Kahlbaugh et al. | | 5,952,252 A | 9/1999 | Shawver et al. |
| 5,366,631 A | 11/1994 | Adiletta | | 5,954,962 A | 9/1999 | Adiletta |
| 5,380,580 A | 1/1995 | Rogers et al. | | 5,965,091 A | 10/1999 | Navarre et al. |
| 5,405,682 A | 4/1995 | Shawyer et al. | | 5,965,468 A | 10/1999 | Marmon et al. |
| 5,415,676 A | 5/1995 | Tokar et al. | | 5,972,166 A | 10/1999 | Helwig et al. |
| 5,423,892 A | 6/1995 | Kahlbaugh et al. | | 5,972,477 A | 10/1999 | Kim et al. |
| 5,436,980 A | 7/1995 | Weeks et al. | | 5,972,808 A | 10/1999 | Groeger et al. |
| 5,454,945 A | 10/1995 | Spearman | | 5,976,998 A | 11/1999 | Sandor et al. |
| 5,458,960 A | 10/1995 | Nieminen et al. | | 5,981,410 A | 11/1999 | Hansen et al. |
| 5,468,572 A | 11/1995 | Zguris et al. | | 5,989,432 A * | 11/1999 | Gildersleeve et al. ........ 210/650 |
| 5,472,467 A | 12/1995 | Pfeffer | | 5,989,688 A | 11/1999 | Barge et al. |
| 5,478,466 A | 12/1995 | Heilmann et al. | | 5,993,501 A | 11/1999 | Cusick et al. |
| 5,486,410 A | 1/1996 | Groeger et al. | | 5,993,905 A | 11/1999 | Sheehan |
| 5,508,079 A | 4/1996 | Grant et al. | | 5,993,943 A | 11/1999 | Bodaghi et al. |
| 5,508,093 A | 4/1996 | Mehdorn | | 6,007,608 A | 12/1999 | Johnson |
| 5,509,340 A | 4/1996 | Kawamura | | 6,007,898 A | 12/1999 | Kim et al. |
| 5,545,453 A | 8/1996 | Grant | | 6,013,587 A | 1/2000 | Truong et al. |
| 5,545,475 A | 8/1996 | Korleski | | 6,024,782 A | 2/2000 | Freund et al. |
| 5,565,062 A | 10/1996 | Nass et al. | | 6,041,782 A | 3/2000 | Angadjivand et al. |
| 5,575,832 A | 11/1996 | Boyd | | 6,045,597 A | 4/2000 | Choi |
| 5,580,459 A | 12/1996 | Powers et al. | | 6,071,419 A | 6/2000 | Beier et al. |
| 5,581,647 A | 12/1996 | Onishi et al. | | 6,071,641 A | 6/2000 | Zguris |
| 5,584,784 A | 12/1996 | Wu | | 6,077,391 A | 6/2000 | Girondi |
| 5,597,654 A | 1/1997 | Scholz et al. | | 6,099,726 A | 8/2000 | Gembolis et al. |
| 5,603,747 A | 2/1997 | Matuda et al. | | 6,103,181 A | 8/2000 | Berger |
| 5,605,746 A | 2/1997 | Groeger et al. | | 6,103,643 A | 8/2000 | Forsten |
| 5,607,490 A | 3/1997 | Taniguchi et al. | | 6,110,249 A | 8/2000 | Medcalf et al. |
| 5,607,735 A | 3/1997 | Brown | | 6,114,262 A | 9/2000 | Groh et al. |
| 5,614,283 A | 3/1997 | Potnis et al. | | 6,136,058 A | 10/2000 | Miller |
| 5,616,408 A | 4/1997 | Oleszczuk et al. | | 6,139,595 A | 10/2000 | Herman et al. |
| 5,620,641 A | 4/1997 | Berger | | 6,143,049 A | 11/2000 | Gieseke et al. |
| 5,620,785 A | 4/1997 | Watt et al. | | 6,143,441 A | 11/2000 | Zguris et al. |
| 5,633,082 A | 5/1997 | Berger | | 6,146,436 A | 11/2000 | Hollingsworth et al. |
| 5,638,569 A | 6/1997 | Newell | | 6,152,120 A | 11/2000 | Julazadeh |
| 5,643,467 A | 7/1997 | Romanco | | 6,156,682 A | 12/2000 | Fletemier et al. |
| 5,643,653 A | 7/1997 | Griesbach, III et al. | | 6,156,842 A | 12/2000 | Hoenig et al. |
| 5,645,057 A | 7/1997 | Watt et al. | | 6,165,572 A | 12/2000 | Kahlbaugh et al. |
| 5,645,689 A | 7/1997 | Ruf et al. | | 6,169,045 B1 | 1/2001 | Pike et al. |
| 5,645,690 A | 7/1997 | Cox, Jr. | | 6,171,355 B1 | 1/2001 | Gieseke et al. |
| 5,652,048 A | 7/1997 | Haynes et al. | | 6,171,369 B1 | 1/2001 | Schultink et al. |
| 5,662,728 A | 9/1997 | Groeger | | 6,171,684 B1 | 1/2001 | Kahlbaugh et al. |
| 5,665,235 A | 9/1997 | Gildersleeve et al. | | 6,174,603 B1 | 1/2001 | Berger |
| 5,667,562 A | 9/1997 | Midkiff | | 6,183,536 B1 | 2/2001 | Schultink et al. |
| 5,669,949 A | 9/1997 | Dudrey et al. | | 6,186,992 B1 | 2/2001 | Roe et al. |
| 5,672,399 A | 9/1997 | Kahlbaugh et al. | | 6,187,073 B1 | 2/2001 | Gieseke et al. |
| 5,672,415 A | 9/1997 | Sawyer et al. | | 6,190,768 B1 | 2/2001 | Turley et al. |
| 5,677,058 A | 10/1997 | Neal et al. | | 6,197,709 B1 | 3/2001 | Tsai et al. |
| 5,679,042 A | 10/1997 | Varona | | 6,200,669 B1 | 3/2001 | Marmon et al. |
| 5,681,469 A | 10/1997 | Barboza | | 6,203,713 B1 | 3/2001 | Tanny |
| 5,705,119 A | 1/1998 | Takeuchi et al. | | 6,241,886 B1 | 6/2001 | Kitagawa et al. |
| 5,709,735 A | 1/1998 | Midkiff et al. | | 6,251,224 B1 | 6/2001 | Dong |
| 5,711,878 A | 1/1998 | Ogata et al. | | 6,264,044 B1 | 7/2001 | Meyering |
| 5,721,180 A | 2/1998 | Pike et al. | | 6,267,252 B1 | 7/2001 | Amsler |
| 5,728,187 A | 3/1998 | Kern et al. | | 6,267,843 B1 | 7/2001 | Helwig et al. |
| 5,728,298 A | 3/1998 | Hamlin | | 6,290,739 B1 | 9/2001 | Gieseke et al. |
| 5,753,002 A | 5/1998 | Glucksman | | 6,300,261 B1 | 10/2001 | Young et al. |
| 5,755,963 A | 5/1998 | Sugiura et al. | | 6,301,887 B1 | 10/2001 | Gorel et al. |
| 5,779,847 A | 7/1998 | Groeger | | 6,306,539 B1 | 10/2001 | Zguris |
| 5,783,505 A | 7/1998 | Duckett et al. | | 6,316,107 B1 | 11/2001 | Lubnin et al. |
| 5,785,725 A | 7/1998 | Cusick et al. | | 6,330,883 B1 | 12/2001 | Berger |
| 5,792,711 A | 8/1998 | Roberts | | 6,351,078 B1 | 2/2002 | Wang et al. |
| 5,795,835 A | 8/1998 | Bruner et al. | | 6,352,947 B1 | 3/2002 | Haley et al. |
| 5,800,586 A | 9/1998 | Cusick et al. | | 6,355,076 B2 | 3/2002 | Gieseke et al. |
| 5,800,587 A * | 9/1998 | Kahlbaugh et al. .............. 55/486 | | 6,355,079 B1 | 3/2002 | Sorvari et al. |
| 5,800,884 A | 9/1998 | D'Anna et al. | | 6,364,976 B2 | 4/2002 | Fletemier et al. |
| 5,804,286 A | 9/1998 | Quantrille et al. | | 6,365,001 B1 | 4/2002 | Helwig et al. |
| 5,820,646 A | 10/1998 | Gillingham et al. | | 6,371,977 B1 | 4/2002 | Bumbarger et al. |
| 5,837,018 A | 11/1998 | Goerg | | 6,372,004 B1 | 4/2002 | Schultink et al. |
| 5,837,627 A | 11/1998 | Halabisky et al. | | 6,384,369 B1 | 5/2002 | Stenersen et al. |
| 5,840,245 A | 11/1998 | Coombs et al. | | 6,395,153 B1 | 5/2002 | Matousek et al. |

| Patent No. | Date | Inventor(s) |
|---|---|---|
| 6,406,789 B1 | 6/2002 | McDaniel et al. |
| 6,409,785 B1 | 6/2002 | Smithies et al. |
| 6,409,787 B1 | 6/2002 | Smithies et al. |
| 6,419,721 B1 | 7/2002 | Hunter |
| 6,419,839 B1 | 7/2002 | Cox et al. |
| 6,420,626 B1 | 7/2002 | Erspamer et al. |
| 6,428,610 B1 | 8/2002 | Tsai et al. |
| 6,440,192 B2 | 8/2002 | Guerin et al. |
| 6,458,456 B1 | 10/2002 | Zainiev et al. |
| 6,471,740 B2 | 10/2002 | Kobayashi et al. |
| 6,478,953 B2 | 11/2002 | Spearman et al. |
| 6,479,147 B2 | 11/2002 | Lubnin et al. |
| 6,488,811 B1 | 12/2002 | Dong |
| 6,492,183 B1 | 12/2002 | Perman et al. |
| 6,495,286 B2 | 12/2002 | Zguris et al. |
| 6,495,656 B1 | 12/2002 | Haile et al. |
| 6,497,950 B1 | 12/2002 | Haile et al. |
| 6,503,447 B1 | 1/2003 | Mondjian et al. |
| 6,511,774 B1 | 1/2003 | Tsukuda et al. |
| 6,514,306 B1 | 2/2003 | Rohrbach et al. |
| 6,517,612 B1 | 2/2003 | Crouch et al. |
| 6,517,725 B2 | 2/2003 | Spearman et al. |
| 6,521,012 B2 | 2/2003 | Lamon et al. |
| 6,521,321 B2 | 2/2003 | Kahlbaugh et al. |
| 6,528,439 B1 | 3/2003 | Stokes et al. |
| 6,530,366 B2 | 3/2003 | Geiger et al. |
| 6,530,969 B2 * | 3/2003 | Gieseke et al. ................ 55/330 |
| 6,540,801 B2 | 4/2003 | Gieseke et al. |
| 6,541,114 B2 | 4/2003 | Katou et al. |
| 6,547,860 B2 | 4/2003 | Buchwald et al. |
| 6,551,608 B2 | 4/2003 | Yao |
| 6,555,489 B1 | 4/2003 | Pfeffer |
| 6,576,034 B2 | 6/2003 | Berger |
| 6,579,342 B2 | 6/2003 | Wang et al. |
| 6,585,808 B2 | 7/2003 | Burban et al. |
| 6,588,641 B2 | 7/2003 | Pritie |
| 6,602,311 B2 | 8/2003 | Berger |
| 6,607,997 B1 | 8/2003 | Cox et al. |
| 6,613,704 B1 | 9/2003 | Arnold et al. |
| 6,616,723 B2 | 9/2003 | Berger |
| 6,624,099 B1 | 9/2003 | Shah |
| H2086 H | 10/2003 | Amsler |
| 6,645,388 B2 | 11/2003 | Sheikh-Ali |
| 6,646,179 B1 | 11/2003 | Melius et al. |
| 6,649,547 B1 | 11/2003 | Arnold et al. |
| 6,652,614 B2 | 11/2003 | Gieseke et al. |
| 6,653,381 B2 | 11/2003 | Thames et al. |
| 6,673,864 B2 | 1/2004 | Patel et al. |
| 6,682,576 B1 | 1/2004 | Kiyotani et al. |
| 6,682,809 B2 | 1/2004 | Van Rheenen |
| 6,695,148 B2 | 2/2004 | Homonoff et al. |
| 6,705,270 B1 | 3/2004 | Rau et al. |
| 6,706,086 B2 | 3/2004 | Emig et al. |
| 6,723,142 B2 | 4/2004 | Emerson et al. |
| 6,723,149 B2 | 4/2004 | Ernst et al. |
| 6,723,669 B1 | 4/2004 | Clark et al. |
| 6,726,751 B2 | 4/2004 | Bause et al. |
| 6,740,142 B2 | 5/2004 | Buettner et al. |
| 6,743,273 B2 | 6/2004 | Chung et al. |
| 6,758,873 B2 | 7/2004 | Gieseke et al. |
| 6,770,356 B2 | 8/2004 | O'Donnell et al. |
| 6,792,925 B2 | 9/2004 | Dworatzek et al. |
| 6,797,377 B1 | 9/2004 | DeLucia et al. |
| 6,815,383 B1 | 11/2004 | Arnold |
| 6,818,037 B2 | 11/2004 | Tanaka et al. |
| 6,821,321 B2 | 11/2004 | Chinn et al. |
| 6,821,672 B2 | 11/2004 | Zguris |
| 6,835,311 B2 | 12/2004 | Koslow |
| 6,848,866 B1 | 2/2005 | McGinn |
| 6,849,330 B1 | 2/2005 | Morin et al. |
| 6,852,148 B2 | 2/2005 | Gieseke et al. |
| 6,858,057 B2 | 2/2005 | Healey |
| 6,860,917 B2 | 3/2005 | Henrichsen et al. |
| 6,866,692 B2 | 3/2005 | Emerson et al. |
| 6,872,431 B2 | 3/2005 | Kahlbaugh et al. |
| 6,872,674 B2 | 3/2005 | Williams et al. |
| 6,874,641 B2 | 4/2005 | Clary |
| 6,875,249 B2 | 4/2005 | Gogins |
| 6,878,191 B2 | 4/2005 | Escaffre et al. |
| 6,878,193 B2 | 4/2005 | Kasmark, Jr. |
| 6,883,321 B2 | 4/2005 | Fornof |
| 6,900,148 B2 | 5/2005 | Yoneda et al. |
| 6,916,752 B2 | 7/2005 | Berrigan et al. |
| 6,918,939 B2 | 7/2005 | Dworatzek et al. |
| 6,923,182 B2 | 8/2005 | Angadjivand et al. |
| 6,924,028 B2 | 8/2005 | Chung et al. |
| 6,926,961 B2 | 8/2005 | Roth |
| 6,936,554 B1 | 8/2005 | Singer |
| 6,939,386 B2 | 9/2005 | Sato et al. |
| 6,939,492 B2 | 9/2005 | Jackson et al. |
| 6,942,711 B2 | 9/2005 | Faulkner et al. |
| 6,955,708 B1 | 10/2005 | Julos et al. |
| 6,955,775 B2 | 10/2005 | Chung et al. |
| 6,962,615 B2 | 11/2005 | Staudenmayer et al. |
| 6,966,940 B2 | 11/2005 | Krisko et al. |
| 6,991,113 B2 | 1/2006 | Nakajima |
| 6,997,208 B2 | 2/2006 | Mack |
| 7,008,144 B2 | 3/2006 | McGinn |
| 7,008,465 B2 | 3/2006 | Graham et al. |
| 7,011,011 B2 | 3/2006 | Jessberger et al. |
| 7,017,563 B2 | 3/2006 | Dworatzed et al. |
| 7,029,516 B2 | 4/2006 | Campbell et al. |
| 7,033,410 B2 | 4/2006 | Hilpert et al. |
| 7,033,493 B2 | 4/2006 | McGarvey et al. |
| 7,037,569 B2 | 5/2006 | Curro et al. |
| 7,049,254 B2 | 5/2006 | Bansal et al. |
| 7,070,640 B2 | 7/2006 | Chung et al. |
| 7,081,145 B2 | 7/2006 | Gieseke et al. |
| 7,090,715 B2 | 8/2006 | Chung et al. |
| 7,094,270 B2 | 8/2006 | Schultink et al. |
| 7,115,150 B2 | 10/2006 | Johnson et al. |
| 7,125,470 B2 | 10/2006 | Graef et al. |
| 7,163,349 B2 | 1/2007 | Policicchio et al. |
| 7,174,612 B2 | 2/2007 | Ortega et al. |
| 7,182,537 B2 | 2/2007 | Policicchio et al. |
| 7,182,804 B2 | 2/2007 | Gieseke et al. |
| 7,267,789 B2 | 9/2007 | Chhabra et al. |
| 7,278,542 B2 | 10/2007 | Dussaud et al. |
| 7,288,338 B2 | 10/2007 | Zguris |
| 7,309,372 B2 | 12/2007 | Kahlbaugh et al. |
| 7,314,497 B2 | 1/2008 | Kahlbaugh et al. |
| 7,329,623 B2 | 2/2008 | Kinn et al. |
| 7,520,994 B2 | 4/2009 | Dong et al. |
| 7,717,975 B2 | 5/2010 | Kalayci et al. |
| 7,737,224 B2 | 6/2010 | Willis et al. |
| 7,772,456 B2 | 8/2010 | Zhang et al. |
| 7,896,941 B2 | 3/2011 | Choi |
| 7,918,913 B2 | 4/2011 | Kalayci et al. |
| 7,985,344 B2 | 7/2011 | Dema et al. |
| 8,021,455 B2 | 9/2011 | Adamek et al. |
| 8,021,457 B2 | 9/2011 | Dema et al. |
| 8,021,547 B2 | 9/2011 | Hukki |
| 8,057,567 B2 | 11/2011 | Webb et al. |
| 8,096,290 B2 | 1/2012 | Karlsson |
| 8,177,875 B2 | 5/2012 | Rogers et al. |
| 2001/0000375 A1 | 4/2001 | Kobayashi et al. |
| 2001/0033932 A1 | 10/2001 | Katou et al. |
| 2002/0007167 A1 | 1/2002 | Dan et al. |
| 2002/0013111 A1 | 1/2002 | Dugan et al. |
| 2002/0016120 A1 | 2/2002 | Nagano et al. |
| 2002/0083690 A1 | 7/2002 | Emig et al. |
| 2002/0116910 A1 | 8/2002 | Berger |
| 2002/0121194 A1 | 9/2002 | Buchwald et al. |
| 2002/0127939 A1 | 9/2002 | Hwo et al. |
| 2002/0148876 A1 | 10/2002 | Prittie |
| 2002/0193030 A1 | 12/2002 | Yao et al. |
| 2003/0019193 A1 | 1/2003 | Chinn et al. |
| 2003/0022575 A1 | 1/2003 | Yoneda et al. |
| 2003/0082979 A1 | 5/2003 | Bean et al. |
| 2003/0084788 A1 | 5/2003 | Fraser |
| 2003/0087568 A1 | 5/2003 | Kinn et al. |
| 2003/0089092 A1 | 5/2003 | Bause et al. |
| 2003/0096549 A1 | 5/2003 | Ortega et al. |
| 2003/0099576 A1 | 5/2003 | Li et al. |
| 2003/0106294 A1 | 6/2003 | Chung et al. |
| 2003/0109190 A1 | 6/2003 | Geel |
| 2003/0139110 A1 | 7/2003 | Nagaoka et al. |
| 2003/0145569 A1 | 8/2003 | Sato et al. |

| | | |
|---|---|---|
| 2003/0148691 A1 | 8/2003 | Pelham, Sr. et al. |
| 2003/0150820 A1 | 8/2003 | Dussaud et al. |
| 2003/0211069 A1 | 11/2003 | Deckner et al. |
| 2003/0211799 A1 | 11/2003 | Yao et al. |
| 2004/0116026 A1 | 6/2004 | Kubose et al. |
| 2004/0134355 A1 | 7/2004 | Kasmark, Jr. |
| 2004/0192141 A1 | 9/2004 | Yang et al. |
| 2004/0211400 A1 | 10/2004 | Basset |
| 2004/0221436 A1 | 11/2004 | Ortega et al. |
| 2004/0242108 A1 | 12/2004 | Russell et al. |
| 2005/0000876 A1 | 1/2005 | Knight |
| 2005/0026526 A1 | 2/2005 | Verdegan et al. |
| 2005/0109683 A1 | 5/2005 | Joyce et al. |
| 2005/0160711 A1 | 7/2005 | Yang |
| 2005/0210844 A1 | 9/2005 | Kahlbaugh et al. |
| 2005/0211232 A1 | 9/2005 | Dushek et al. |
| 2005/0214188 A1 | 9/2005 | Rohrbach et al. |
| 2005/0215965 A1 | 9/2005 | Schmidt et al. |
| 2005/0233665 A1 | 10/2005 | Groten et al. |
| 2005/0266760 A1 | 12/2005 | Chhabra et al. |
| 2006/0004336 A1 | 1/2006 | Zhang et al. |
| 2006/0009106 A1 | 1/2006 | Nishimura et al. |
| 2006/0086344 A1 | 4/2006 | Karlsson |
| 2006/0094320 A1 | 5/2006 | Chen |
| 2006/0096263 A1* | 5/2006 | Kahlbaugh et al. ............ 55/527 |
| 2006/0096932 A1 | 5/2006 | Dema et al. |
| 2006/0101796 A1 | 5/2006 | Kern et al. |
| 2006/0121811 A1 | 6/2006 | Mangold et al. |
| 2006/0137317 A1 | 6/2006 | Bryner et al. |
| 2006/0207932 A1 | 9/2006 | Hajek et al. |
| 2006/0230731 A1 | 10/2006 | Kalayci et al. |
| 2006/0242933 A1 | 11/2006 | Webb et al. |
| 2006/0246798 A1 | 11/2006 | Reneker et al. |
| 2006/0266701 A1 | 11/2006 | Dickerson et al. |
| 2007/0021569 A1 | 1/2007 | Willis et al. |
| 2007/0062855 A1 | 3/2007 | Chase et al. |
| 2007/0210008 A1 | 9/2007 | Sprenger et al. |
| 2008/0035103 A1 | 2/2008 | Barris et al. |
| 2008/0245037 A1 | 10/2008 | Rogers et al. |
| 2009/0050578 A1 | 2/2009 | Israel et al. |
| 2009/0266759 A1 | 10/2009 | Green et al. |
| 2010/0187171 A1 | 7/2010 | Gupta |
| 2010/0187712 A1 | 7/2010 | Gupta et al. |
| 2011/0154790 A1 | 6/2011 | Israel et al. |
| 2011/0215046 A1 | 9/2011 | Rogers et al. |

FOREIGN PATENT DOCUMENTS

| | | |
|---|---|---|
| EP | 0340763 | 11/1989 |
| EP | 1211342 | 6/2002 |
| EP | 1141454 | 3/2006 |
| EP | 1378283 | 4/2007 |
| GB | 1532076 | 11/1978 |
| JP | H03-270703 | 12/1991 |
| JP | 7265640 | 10/1995 |
| JP | H08-206421 | 8/1996 |
| JP | 10165731 | 6/1998 |
| JP | 2002085918 | 3/2002 |
| JP | 2003325411 | 11/2003 |
| JP | 2004-002176 | 1/2004 |
| JP | 2004-160361 | 6/2004 |
| JP | 2004160328 | 6/2004 |
| JP | 2004255230 | 9/2004 |
| JP | 2004305853 | 11/2004 |
| WO | 9310881 | 6/1993 |
| WO | 9405396 | 3/1994 |
| WO | 9741167 | 11/1997 |
| WO | 9947211 | 9/1999 |
| WO | 0032854 | 6/2000 |
| WO | 0059969 | 10/2000 |
| WO | 0103802 | 1/2001 |
| WO | 0110929 | 2/2001 |
| WO | 0141898 | 6/2001 |
| WO | 0185824 | 11/2001 |
| WO | 03013732 | 2/2003 |
| WO | 03080904 | 10/2003 |
| WO | 03080905 | 10/2003 |
| WO | 2004089509 | 10/2004 |
| WO | 2005005696 | 1/2005 |
| WO | 2005005704 | 1/2005 |
| WO | 2005075054 | 8/2005 |
| WO | 2005082488 | 9/2005 |
| WO | 2005083240 | 9/2005 |
| WO | 2005120678 | 12/2005 |
| WO | 2006052656 | 5/2006 |
| WO | 2006052732 | 5/2006 |
| WO | 2009088647 | 7/2009 |

OTHER PUBLICATIONS

"Three-Dimensional Structure Incorporates Heterofil Fibre and Carbon Beads", Nonwovens Report, International Oct. 1995, No. 295, pp. 8-9.

"Filter Bag", Nonwoven Industry, Mar. 1992, vol. 23, No. 3, pp. 5 and 68.

Hagewood, J., "Bicomponent Filtration: Variable Capacity Continuous Extended Area Filter", International Fiber Journal, Feb. 1998, vol. 14, No. 1, pp. 58-67.

Zhao, R., "An Investigation of Bicomponent Polypropylene/Poly-(ethylene Terephthalate) Melt Blown Microfiber Nonwovens, A Dissertation", Front Cover, Dec. 2001, pp. i-xix, pp. 1-207, 3 information pages.

"2.2 The Fourdrinier", http://www.paper.org.uk/papertech/data/unit_03/2_mechanical_methods/2-2_fourdrinier . . . Sep. 24, 2007, 7 pages.

Puurtinen, "Multilayering of Fine Paper With 30 Layer Headbox and Roll and Blade Gap Former", Helsinki University of Technology, Laboratory of Paper Technology Reports, Series A19, May 14, 2004, pp. 1-54.

"Filtration—Daiwabo and Kyowa Jointly Produce Microfiber Filter", Nonwovens Markets Feb. 14, 1992, vol. 7, No. 4, p. 5.

Extended European Search Report, dated Mar. 3, 2011, in co-pending European Patent Application 10010696.2 (5 pages).

Extended European Search Report, dated Mar. 3, 2011, in co-pending European Patent Application 10010698.8 (4 pages).

Pending claims for U.S. Appl. No. 10/589,512, filed May 7, 2007.

Pending claims for U.S. Appl. No. 11/884,743, filed Jul. 14, 2010.

Hinds, W., "Aerosol Technology Properties, Behavior, and Measurement of Airborne Particles," Second Edition, (Copyright 1999), 3 pages.

Chinese Office Action Received, for Chinese Application No. 2006800106160, corresponding to U.S. Appl. No. 11/883,690, mailed Oct. 19, 2011, (pp. 23) Including English translation.

"Cost Effective Emissions Solutions for Diesel Engines", Donaldson Company brochure, 2004, 4 pages.

Dahiya, A et al., "Dry-Laid Nonwovens", http://www.engr.utk.edu/mse/pages/Textiles/Dry%20Laid%20Nonwovens.htm, (Apr. 2004), 10 pages.

Ko, F et al., "Elecrospinning of Continuous Carbon Nanotube-Filled Nanofiber Yarns", Adv. Mater., vol. 15, No. 14, pp. 1161-1165, (Jul. 17, 2003).

European Office Action Received, from the European Patent Office in EP Patent Application No. 06720573.2-1213, corresponding to U.S. Appl. No. 11/883,690, mailed May 13, 2011, (pp. 5).

Extended European Search Report, from EP Application No. 07119967.3, corresponding to U.S. Appl. No. 11/381,010, mailed May 6, 2008, pp. 1-6.

Extended European Search Report, from EP Application No. 10010698.8, corresponding to U.S. Appl. No. 11/381,010, mailed Feb. 16, 2011, pp. 1-4.

Extended European Search Report, from EP Application No. 10010697.0, corresponding to U.S. Appl. No. 60/625,459, mailed Mar. 9, 2011, pp. 1-4.

Final Office Action, for JP Application No. 2007-554356, corresponding to U.S. Appl. No. 11/883,690, mailed Aug. 19, 2011, (pp. 9) Including English translation.

Final Office Action Received, from JP Application No. 2007-540069, corresponding to U.S. Appl. No. 11/267,958, mailed Jul. 22, 2011, (pp. 18) Including English translation.

First Office Action Received, First Office Action for Chinese Application No. 201010255252.0, corresponding to U.S. Appl. No. 11/381,010, mailed May 25, 2011, (pp. 22) Including English translation.

"HEPA & 95% DOP Panel Filters", Donaldson Company Torit brochure, 2004, 4 pages.

Frautmann, P et al., "High Performance Nanofibre Coated Filter Media for Engine Intake Air Filtration", Filtration, vol. 6, No. 1, pp. 53-56 (2006).

"Migration of Superabsorbent Polymer (SAP) Media Downstream of Filtration", Velcron Filters, Inc. Service Bulletin, May 2007, http://www.velcon.com/doc/Vo16-Npl-05.21.07.pdf.

Non Final Office Action, mailed Apr. 28, 2011 in co pending U.S. Appl. No. 11/381,010, "Filter Medium and Breather Filter Structure" (30 pages).

Non-Final Office Action received in co-pending U.S. Appl. No. 11/884,743, mailed May 3, 2012, 37 pages.

Response to Non-Final Office Action dated May 3, 2012, filed with the USPTO on Nov. 5, 2012 for co-pending U.S. Appl. No. 11/884,743, 9 pages.

Notice of Allowance received in co-pending U.S. Appl. No. 11/884,743, mailed Nov. 26, 2012, 60 pages.

PCT International Search Report and Written Opinion, from International Application No. PCT/US2005/039793, corresponding to U.S. Appl. No. 10/982,538, mailed Mar. 23, 2006, pp. 1-11.

PCT International Search Report and Written Opinion, from International Application No. PCT/US2008/054574, corresponding to U.S. Appl. No. 11/381,010, mailed Nov. 21, 2007, pp. 1-14.

PCT International Search Report and Written Opinion, from International Application No. PCT/US2008/054574, corresponding to U.S. Appl. No. 12/036,022, mailed Aug. 29, 2008, pp. 1-11.

Response to Chinese Office Action, dated Mar. 8, 2011 Filed in the Chinese Patent Office on Jul. 11, 2011 for Chinese Patent Application No. 200580046000.4, corresponding to U.S. Appl. No. 11/267,958, (p. 26).

Response to European Examination Report, dated May 13, 2011, Filed in the European Patent Office on Sep. 16, 2011 for EP Patent Application No. 06 720 573.2-1213, corresponding to U.S. Patent Application No. PCT/US06/004639, (pp. 1-7).

Hansen, L et al., "Water Absorption and Mechanical Properties of Electrospun Structured Hydrogels", Journal of Applied Polymer Science, vol. 95, pp. 427-434 (2005).

* cited by examiner

AEROSOL SEPARATOR; AND METHOD

This application is a continuation of U.S. application Ser. No. 11/883,690, filed Apr. 4, 2008, which will issue on May 15, 2012 as U.S. Pat. No. 8,177,875, and which is a U.S. National Stage Application of International Application Number PCT/US2006/004639, filed on Jan. 31, 2006, and claims priority to U.S. Provisional Application Ser. No. 60/650,051, filed Feb. 4, 2005.

This application incorporates the following U.S. Patents herein by reference: U.S. Pat. No. 5,853,439; U.S. Pat. No. 6,171,355; U.S. Pat. No. 6,355,076; U.S. Pat. No. 6,143,049; U.S. Pat. No. 6,187,073; U.S. Pat. No. 6,290,739; U.S. Pat. No. 6,540,801; U.S. Pat. No. 6,530,969. This application incorporates by reference PCT Publication WO 01/47618 published on Jul. 5, 2001, and PCT Publication WO 00/32295 published on Jun. 8, 2000. This application incorporates by reference commonly assigned U.S. patent application Ser. No. 10/168,906 filed Jun. 20, 2002. This application also incorporates, with edits, portions of U.S. Provisional Application 60/547,759, filed Feb. 23, 2004 and U.S. Provisional Application filed Jan. 11, 2005 entitled Aerosol Separator; and, Methods. U.S. Provisional Application 60/547,759 and U.S. Provisional Application filed Jan. 11, 2005 entitled Aerosol Separator; and, Methods, are incorporated herein by reference.

TECHNICAL FIELD

This disclosure relates to systems and methods for separating hydrophobic fluids (such as oils) which are entrained as aerosols, from gas streams (for example crankcase gases). Preferred arrangements also provide for filtration of other fine contaminants, for example carbon material, from the gas streams. Methods for conducting the separations are also provided.

BACKGROUND

Certain gas streams, such as blow-by gases from the crankcase of diesel engines, carry substantial amounts of entrained oils therein, as aerosol. The majority of the oil droplets within the aerosol are generally within the size of 0.1-5.0 microns.

In addition, such gas streams also carry substantial amounts of fine contaminant, such as carbon contaminants. Such contaminants generally have an average particle size of about 0.5-3.0 microns. It is preferred to reduce the amount of such contaminants in these systems.

A variety of efforts have been directed to the above types of concerns. The variables toward which improvements are desired generally concern the following: (a) size/efficiency concerns; that is, a desire for good efficiency of separation while at the same time avoidance of a requirement for a large separator system; (b) cost/efficiency; that is, a desire for good or high efficiency without the requirement of substantially expensive systems; (c) versatility; that is, development of systems that can be adapted for a wide variety of applications and uses, without significant re-engineering; and, (d) cleanability/regeneratability; that is, development of systems which can be readily cleaned (or regenerated) if such becomes desired, after prolonged use.

SUMMARY OF THE DISCLOSURE

This disclosure particularly concerns development of preferred crankcase ventilation (CCV) filters. It particularly concerns use of advantageous filter media, in arrangements to filter crankcase gases. The preferred media is provided in sheet form from a wet laid process. It can be incorporated into filter arrangements, in a variety of ways, for example by a wrapping or coiling approach or by providing in a panel construction.

According to the present disclosure, filter constructions for preferred uses to filter blow-by gases from engine crankcases are provided. Example constructions are provided. Also provided are preferred filter element or cartridge arrangements including the preferred type of media. Further, methods are provided.

DETAILED DESCRIPTION

I. A Typical Application—Engine Crankcase Breather Filter

Pressure-charged diesel engines often generate "blow-by" gases, i.e., a flow of air-fuel mixture leaking past pistons from the combustion chambers. Such "blow-by gases" generally comprise a gas phase, for example air or combustion off gases, carrying therein: (a) hydrophobic fluid (e.g., oil including fuel aerosol) principally comprising 0.1-5.0 micron droplets (principally, by number); and, (b) carbon contaminant from combustion, typically comprising carbon particles, a majority of which are about 0.1-10 microns in size. Such "blow-by gases" are generally directed outwardly from the engine block, through a blow-by vent.

Herein when the term "hydrophobic" fluids is used in reference to the entrained liquid aerosol in gas flow, reference is meant to nonaqueous fluids, especially oils. Generally such materials are immiscible in water. Herein the term "gas" or variants thereof, used in connection with the carrier fluid, refers to air, combustion off gases, and other carrier gases for the aerosol.

The gases may carry substantial amounts of other components. Such components may include, for example, copper, lead, silicone, aluminum, iron, chromium, sodium, molybdenum, tin, and other heavy metals.

Engines operating in such systems as trucks, farm machinery, boats, buses, and other systems generally comprising diesel engines, may have significant gas flows contaminated as described above. For example, flow rates and volumes on the order of 2-50 cubic feet per minute (cfm), typically 5 to 10 cfm, are fairly common.

Figure 1:
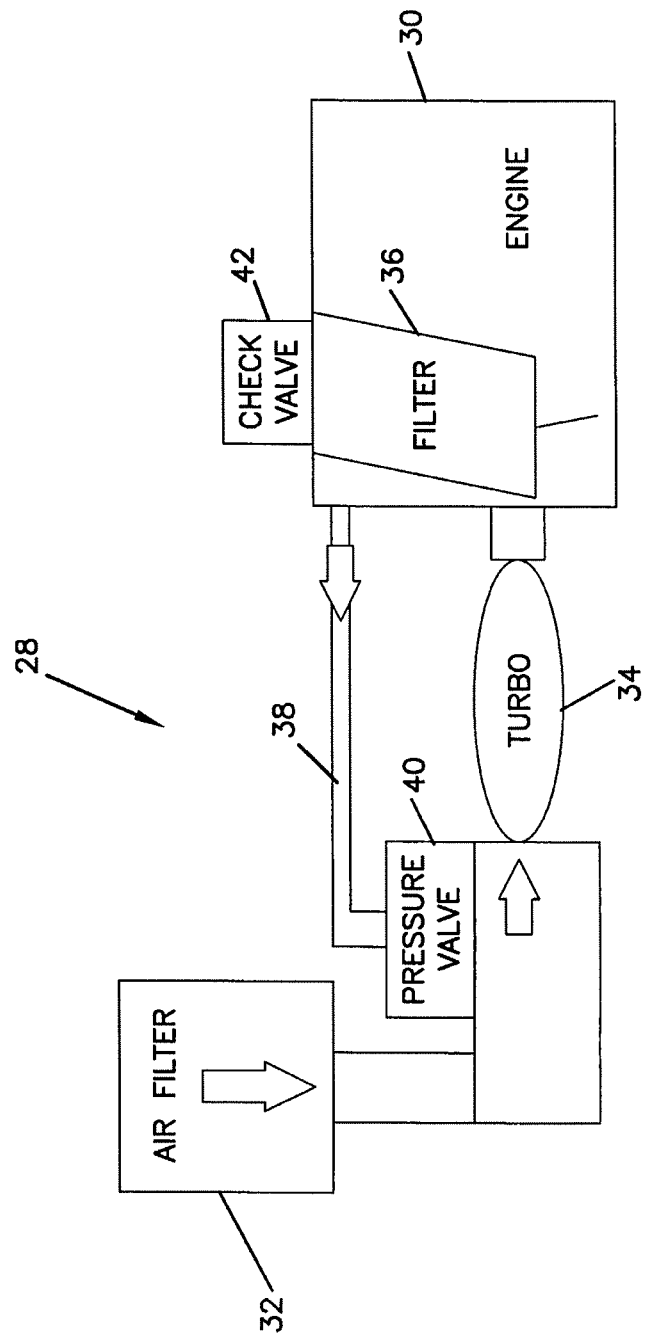
FIG. 1 is a schematic view of an engine system using a filter arrangement constructed according to principles of this disclosure.

FIG. 1 illustrates a schematic indicating a typical system 28 in which a coalescer/separator arrangement according to the present invention would be utilized. Referring to FIG. 1, block 30 represents a turbocharged diesel engine. Air is taken to the engine 30 through an air filter 32. Air filter or cleaner 32 cleans the air taken in from the atmosphere. A turbo 34 draws the clean air from the air filter 32 and pushes it into engine 30. While in engine 30, the air undergoes compression and combustion by engaging with pistons and fuel. During the combustion process, the engine 30 gives off blow-by gases. A filter arrangement 36 is in gas flow communication with engine 30 and cleans the blow-by gases. From filter arrangement 36, the air is directed through channel 38 and through a pressure valve 40. From there, the air is again pulled through by the turbo 34 and into the engine 30. Regulator valve or pressure valve 40 regulates the amount of pressure in the engine crankcase 30. Pressure valve 40 opens more and more, as the pressure in the engine crankcase increases, in order to try to decrease the pressure to an optimal level. The pressure valve 40 closes to a smaller amount when it is desirable to increase the pressure within the engine. A check valve 42 is provided, such that when the pressure exceeds a certain amount in the engine crankcase 30, the check valve 42 opens to the atmosphere, to prevent engine damage.

According to this disclosure, the filter arrangement 36 for separating a hydrophobic liquid phase from a gaseous stream (sometimes referred to herein as a coalescer/separator arrangement) is provided. In operation, a contaminated gas flow is directed into the coalescer/separator arrangement 36. Within the arrangement 36, the fine oil phase or aerosol phase (i.e., hydrophobic phase) coalesces. The arrangement 36 is constructed so that as the hydrophobic phase coalesces into droplets, it will drain as a liquid such that it can readily be collected and removed from the system. With preferred arrangements as described herein below, the coalescer or coalescer/separator, especially with the oil phase in part loaded thereon, operates as a filter for other contaminant (such as carbon contaminant) carried in the gas stream. Indeed, in some systems, as the oil is drained from the system, it will provide some self-cleaning of the coalescer because the oil will carry therein a portion of the trapped carbon contaminant.

The principles according to the present disclosure can be implemented in single stage arrangements or multistage arrangements. In many of the figures, multistage arrangements are depicted. In the general descriptions, we will explain how the arrangements could be varied to a single stage arrangement, if desired.

II. Multi-Stage Oil Aerosol Separator Embodiment, FIGS. 2-9

Figure 2:
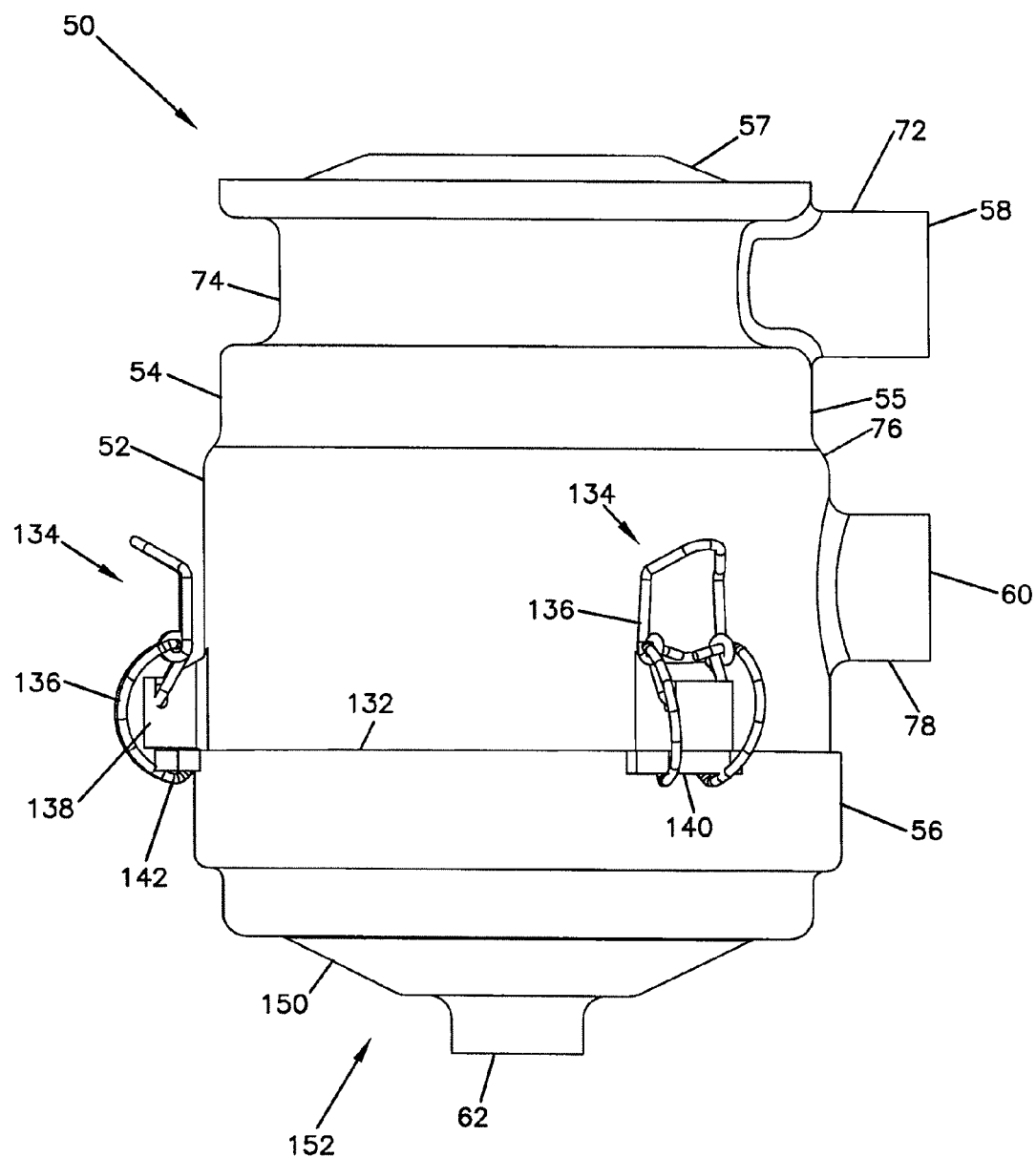
FIG. 2 is a schematic side elevational view of one embodiment of a filter arrangement, constructed according to principles of this disclosure.
Figure 3:
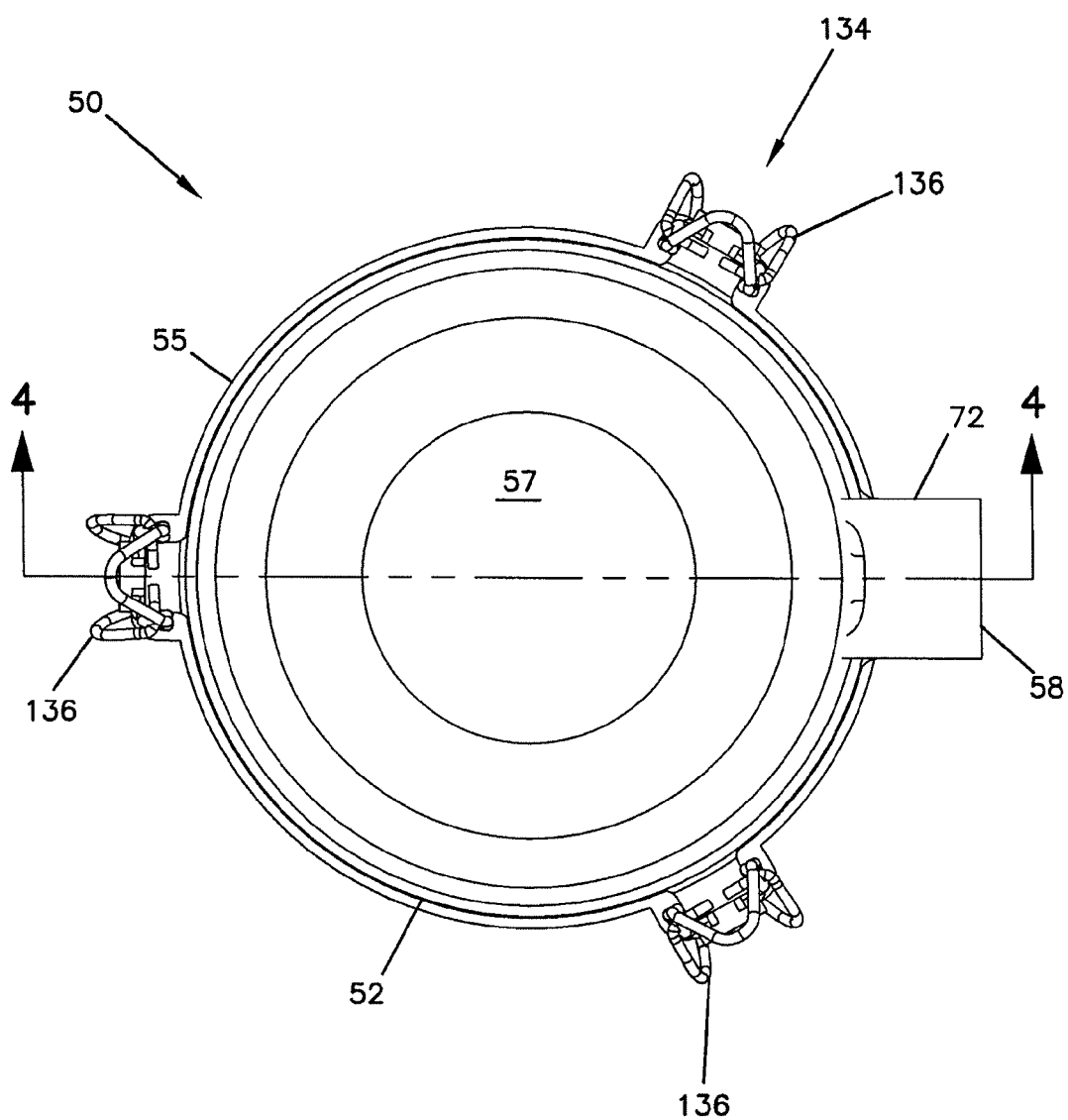
FIG. 3 is an end view of the filter arrangement depicted in FIG. 2.

Referring to FIG. 2, an embodiment of a crankcase gas filter or filter arrangement 36 is depicted at reference numeral 50. The typical filter arrangement 50 depicted includes a housing 52. The depicted housing 52 has a two-piece construction. More specifically, housing 52 comprises a body assembly 54 and a removable cover member 56. The body assembly 54 includes body 55 and lid 57.

Figure 4:
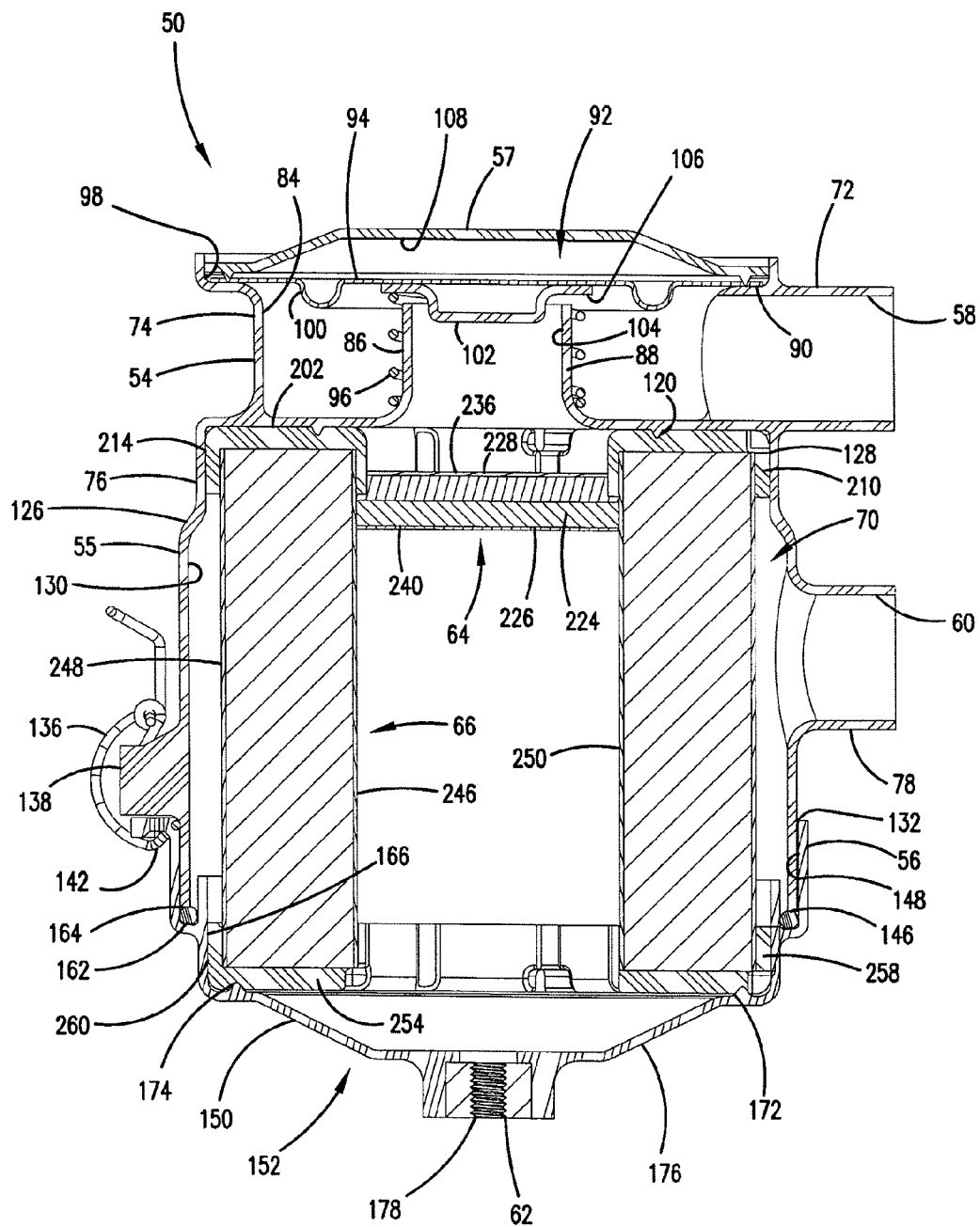
FIG. 4 is a cross-sectional view of the filter arrangement depicted in FIGS. 2 and 3, and taken along the line 4-4 of FIG. 3.

Referring to FIGS. 2 and 4, the housing 52 depicted includes the following three (3) ports: gas flow inlet port 58; gas flow outlet port 60; and liquid flow outlet port or liquid drain 62.

In general, the filter arrangement 50 may be generally referenced herein as a "multi-stage" arrangement because it includes both: (a) a preliminary coalescer filter, to remove a liquid phase from a liquid entrained gas stream; and, (b) at least a single but could include multiple, downstream or second stage filters, for further purification of the air stream. In FIG. 4, a cross-sectional view of the filter arrangement 50 including both the housing 52 and its internal components is depicted. In general, the filter arrangement 50 includes an optional first stage coalescer filter 64, and a second stage tubular construction of filter media 66.

In some arrangements, first stage coalescer filter 64 could be left out, with only the filter media section 66 used. In such arrangements, the filter media section 66 could be used for both coalescing and drainage as well as particular filtering. Media appropriate for this is described in detail below.

In use, an air or gas stream to be modified is directed through the inlet port 58, and through the optional first stage coalescer filter 64. At least a portion of the liquid phase is coalesced and removed from the gaseous stream by the optional first stage coalescer filter 64. The liquid that is coalesced within the first stage coalescer filter 64 drains by gravity, and in the particular embodiment shown exits the housing 52 through the liquid flow outlet port 62. The gas phase is directed through media construction 66. The media construction 66 removes at least a portion of particulates from the gas stream and provides for further coalescing and drainage of entrained liquids. The cleaned gas stream is then directed outwardly from the housing 52 through the gas flow outlet 60.

Figure 5:
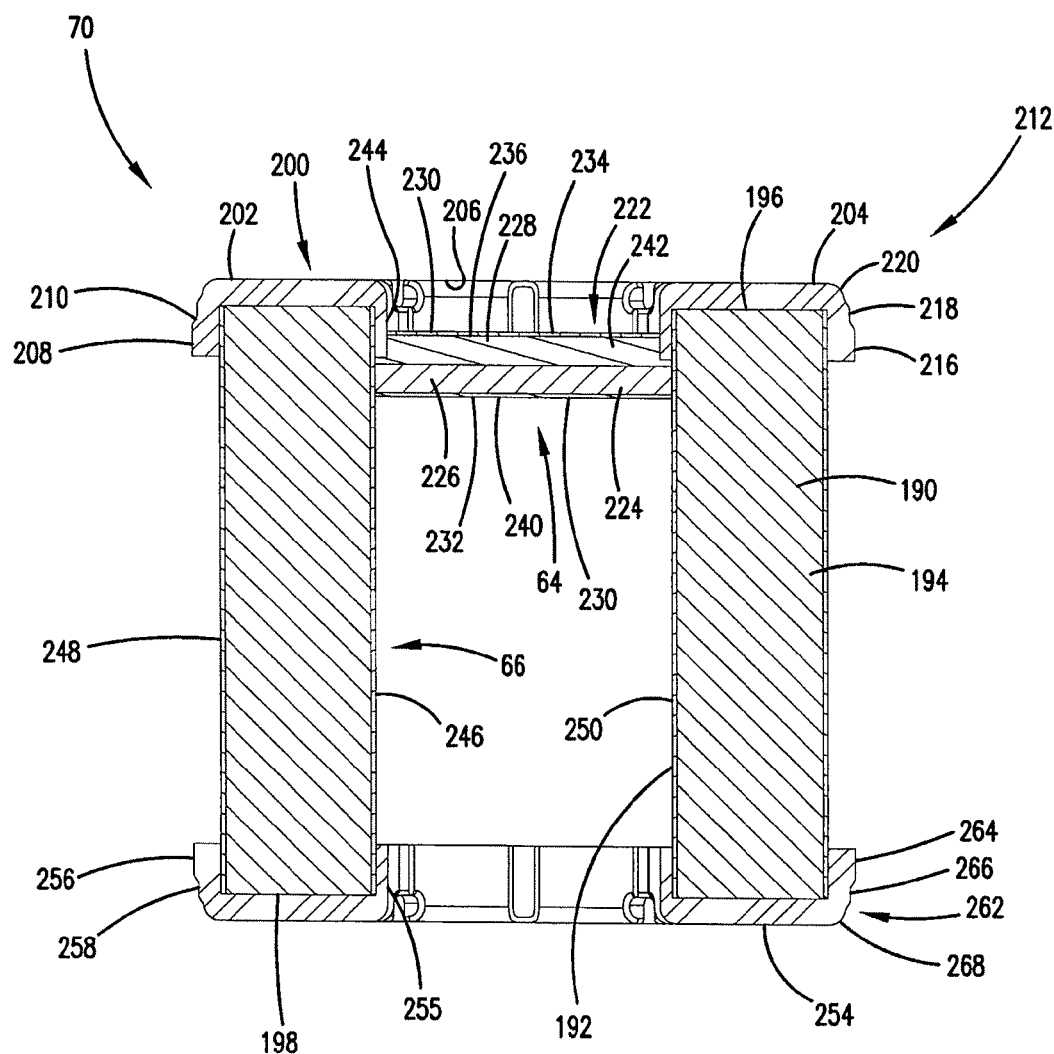
FIG. 5 is a schematic cross-sectional view of one embodiment of a filter element utilized in the filter arrangement of FIGS. 2-4; the cross-section being the same cross-section taken along the line 4-4, but depicting the filter element removed from the housing construction.

As can be seen in FIG. 5, in the embodiment shown the (optional) first stage coalescer filter 64 and the tubular construction of media 66 are a single, unitary construction forming a filter arrangement or element 70. In the preferred embodiment illustrated, the filter element 70 is removable and replaceable with respect to the housing 52. That is, it is a serviceable filter cartridge or element. By "unitary" in this context it is meant that the optional first stage coalescer filter 64 and the tubular construction of media 66 cannot be separated from one another without destroying a portion of the assembled element 70. In certain embodiments, end caps 202, 254 form part of the unitary construction.

In reference again to FIG. 4, for the housing 52 depicted, there is an inlet tube construction 72, a regulator valve housing 74, a canister portion 76, and a outlet tube construction 78. In the embodiment shown, each of the inlet tube construction 72, regulator valve housing 74, canister portion 76, and outlet tube construction 78 form a portion of the body 55. Together with the lid 57, the body 55 and lid 57 are part of the body assembly 54.

In the one shown, the inlet tube construction 72 is a cylindrical member 80 that defines the gas flow inlet port 58. In certain assemblies, the inlet tube construction 78 is in gas flow communication with the crankcase of engine 30, in order to treat blow-by gases emitted from the crankcase.

The regulator valve housing 74 depicted is immediately downstream of the inlet tube construction 72. The regulator valve housing 74 includes an outer surrounding wall 82 defining an open interior 84, where the gas to be treated is allowed to flow and collect before passing into the filter element 70. The regulator valve housing 74 also includes an internal wall 86 forming a neck 88. In the one illustrated, the regulator valve housing 74 also includes a shelf 90 for holding and supporting the lid 57 thereon. The neck 88 holds and supports a regulator valve assembly 92 (FIG. 4) between the canister portion 76 and the lid 57.

In reference to FIG. 4, the valve assembly 92 is constructed and arranged to regulate the gas flow from the crankcase of the engine 30 and through the filter element 70. While a variety of valve constructions are contemplated herein, the particular valve assembly 92 depicted includes diaphragm construction 94 and a biasing mechanism, such as spring 96. In FIG. 4, note that the diaphragm construction 94 is generally circular with an outermost rim 98 that is held by and rests upon shelf 90. The diaphragm construction 94 also includes a groove 100 having a generally U-shaped cross-section and being generally circular, in plan view. The groove 100 is inboard of the rim 98. The groove 100 helps to keep the diaphragm construction 94 properly oriented and centered upon the neck 88. Secured to the diaphragm construction 94 is a centering projection 102. The centering projection 102 is sized to extend into the interior portion 104 of the neck 88. In the one shown, the centering projection 102 is secured to the diaphragm construction 94 in a region inboard of the groove 100. The centering projection 102, together with the groove 100, helps to keep the diaphragm construction 94 properly oriented over the neck 88.

Still in reference to FIG. 4, in the particular valve assembly 92 shown, the spring 96 rests around the outside wall 86 of the neck 88. The spring 96 applies a force to the diaphragm construction 94 to pull the diaphragm construction 94 in a direction toward the neck 88 and toward the filter element 70. Note that there is a gap 106 between the diaphragm construction 94 and the neck 88. The gap 106 allows for gas flow from the interior 84 of the regulator valve housing 74 and into the interior portion 104 of the neck 88.

In operation, the valve assembly 92 generally operates to limit the rate of gas flow from the engine crankcase 30 to the filter element 70. The spring 96 pulls the diaphragm construction 94 toward the neck 88 against the pressure exerted by the gas flow inwardly from the gas flow inlet 58. The diaphragm construction 94 is constructed of a flexible material, such as rubber. As such, a diaphragm construction 94 is allowed to flex in a direction away from the neck 88 and toward the lid 57 in the volume 108 defined between the lid 57 and the shelf 90 of the regulator valve housing 74.

Figure 6:
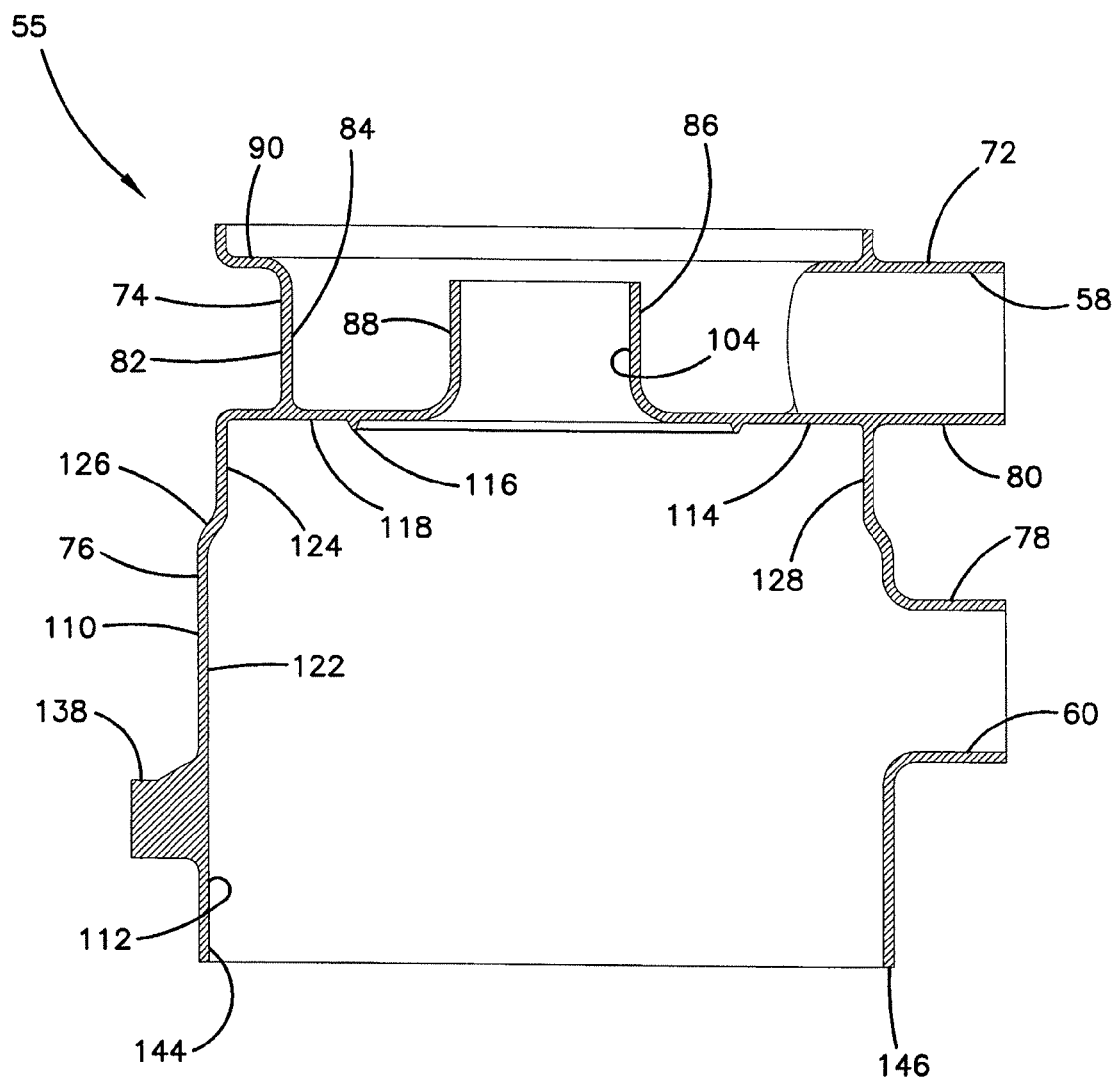
FIG. 6 is a schematic cross-sectional view of one embodiment of the housing construction body; the cross-section being analogous to the cross-section taken along the line 4-4, but depicting only the housing construction body and with a lid removed.

In reference now to FIG. 6, the canister portion 76 of the body 55 includes an outer surrounding wall 110 that is generally tubular in construction to define an open interior 112 for receipt of the filter element 70. In the one depicted, the wall 110 generally is cylindrical to define a circular cross-section. The canister 76 includes an end wall 114 that helps to hold and contain the filter element 70 inside of the canister 76. The end wall 114 includes a projection 116 extending from a flat, planar portion 118. When the filter element 70 is operably assembled within the housing 52, the projection 116 will act as a secondary, or supplemental sealing mechanism to create a secondary seal 120 (FIG. 4) between the end wall 114 of the body 55 and the element 70. The primary sealing function is in a radial sealing system between the filter element 70 and the housing 52, which is described in further detail below. The secondary seal 120 helps to prevent unintended amounts of oil seepage from passing along the end wall 114 between the filter element 70 and the housing 52. It is noted that in alternate arrangements axial seals between the filter element and the housing can be used, with radial seals avoided.

Still in reference to FIG. 6, note that the body 55 includes a first tubular region 122 having a first greatest outer dimension and a second tubular region 124 having a second greatest outer dimension. In the particular example illustrated, the greatest outer dimensions of the tubular region 122 and tubular region 124 are diameters. The diameter of the tubular region 122 is greater than the diameter of the tubular region 124, to create a stepped region 126 therebetween. The tubular region 124 defines an inner, annular sealing surface 128. As will be described further below, the sealing surface creates a surface of which it can accept pressure of a seal member to create a radial seal therebetween. The tubular region 122 is spaced from the filter element 70, when the filter element 70 is operably assembled therein, to create a gas flow volume 130 therebetween.

As can be seen in FIG. 2, the body assembly 54 and the cover member 56 are joined to one another along a seam 132 by a latch arrangement 134. The latch arrangement 134 includes a plurality of latches 136 that are used to securely hold the cover member 56 and body assembly 54 together along the seam 132. The latches 136 allow the cover member 56 to be selectively removed from the body assembly 54 in order to access internal components, such as filter element 70 during servicing. There can be a number of latches, and in the particular embodiment illustrated, there are three latches 136. As can be seen in FIGS. 2, 4, and 6, the body 55 includes a latch mount 138 thereon for each of the latches 136. In FIG. 2, it can be seen that the cover member 56 includes appropriate latch receiving structure, such as a slot 140, for receiving a hook portion 142 of each of the latches 136.

The body 55 has an open end 144 (FIG. 6) that is opposite of the end wall 114, in the illustrated embodiment. The open end 144 is circumscribed by a rim 146 that is for communicating with a receiving slot 148 (FIG. 7) in the cover member 56.

Figure 7:
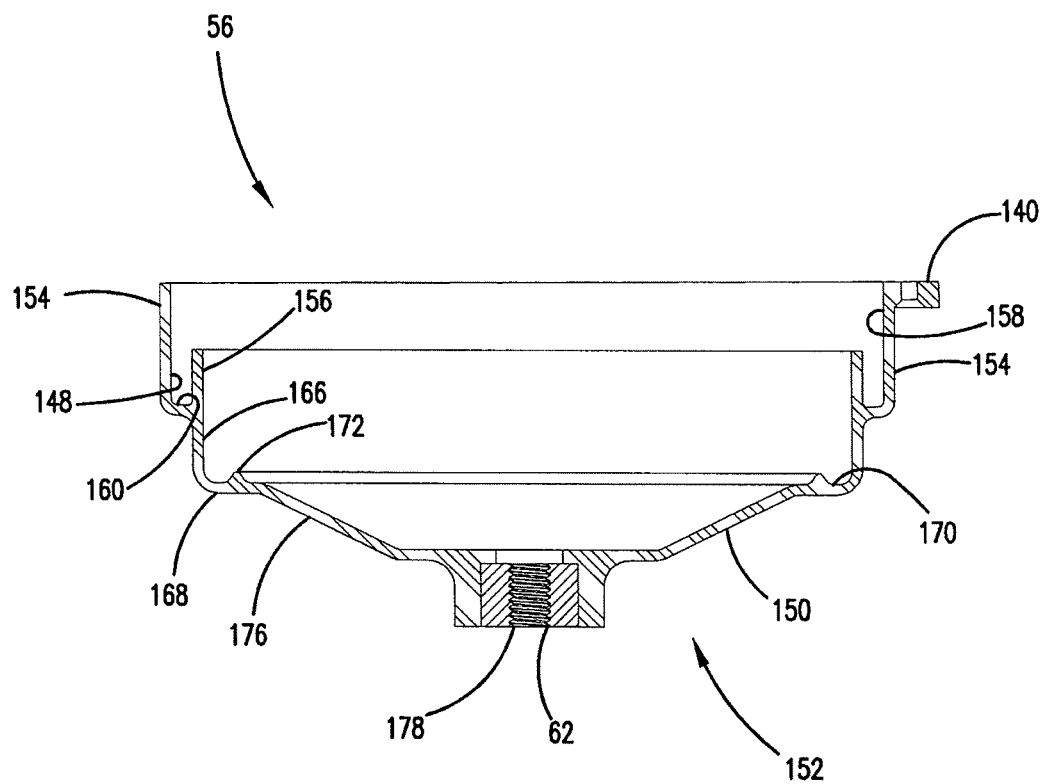
FIG. 7 is a schematic cross-sectional view of one embodiment of the housing construction cover member; the cross-section being analogous to the cross-section taken along the line 4-4, but depicting only the housing construction cover member.

Turning now to the cover member 56 illustrated in FIG. 7, note that the cover member 56 has a bowl or funnel-shaped end second 150. The combination of bowl 150 and drain 62 comprises a liquid collection arrangement 152. In use, as liquid coalesces within the housing 52, it will drain downwardly toward the bowl 150 and will be funneled to the drain 62. Typically, appropriate drain lines will be secured to the drain 62 to direct the collected liquid as desired, for example, to an oil sump.

In reference to FIG. 7, still further detail of the illustrated cover member 56 is shown. In the particular embodiment illustrated, in the cover member 56 includes and outer surrounding wall 154 and an inner wall 156 spaced from the outer wall 154. The outer wall 154 and the inner wall 156 together define the slot 148. The slot 148 functions as a volume 158 for receipt of the body assembly 54, in particular, the rim 146. The outer surrounding wall 154 also includes the latch receiving structure 140.

The volume 158 also provides a seat 160 for holding and containing a gasket member such as O-ring 162 (FIG. 4). In the construction shown, the O-ring 162 is between the rim 146 and the seat 160. The latch arrangement 154 provides axial forces to squeeze the cover member 56 and body assembly 54 together. This provides a force of the rim 146 on the O-ring 162 to create a seal 164 (FIG. 4) between the cover member 56 and body assembly 54. This seal 164 prevents unintended amounts of gas flow to flow between the body assembly 54 and the cover member 56. Rather, the seal 164 forces the gas flow to exit through the gas flow outlet 60.

In reference again to FIG. 7, the inner wall 156 provides an annular, sealing surface 166. The annular sealing surface 166 provides a structure against which a sealing portion of the filter element 70 is oriented to create a radial seal therewith. This is described in further detail below.

The cover member 56 also includes an end wall 168 that is generally normal to the inner wall 156. The end wall 168 acts as a stop 170 for orientation of the filter element 70. In other words, the stop 170 prevents the filter element 70 from moving axially within the housing 52. Extending from the end wall 168 is a projection 172. When filter element 70 is operably installed within housing 52, the projection 172 will be pressed against a sealing portion of the filter element 70 to create a secondary seal 174 (FIG. 4) with the filter element 70. The secondary seal 174 will help to prevent unintended amounts of oil seepage from traveling from within the filter element 70 to the volume 130 outside of the filter element 70. Again, the primary sealing function is accomplished by a radial sealing system, to be described further below. Also, again, many of the techniques described herein can be applied in arrangements in which the primary sealing function is provided by axial seals.

Extending from the end wall 168 is a sloped wall 176 that terminates in the liquid flow outlet 62. The sloped wall 176 forms the funnel shaped section or bowl 150.

Note that the liquid flow outlet 62 includes a threaded section 178. Threaded section 178 can be a brass insert, and is convenient for connecting fittings to lead to an oil sump, for example.

Herein, the term "gas flow direction arrangement" or variants thereof will sometimes be used to refer to the portions of arrangements that direct gas flow. For filter arrangement 50, FIG. 4, this would include the gas flow inlet 58, the inlet tube construction 72, the various walls of the housing 52 (including the walls 82, 86, 110, and 154) and the outlet tube construction 78, including the gas flow outlet 60. The gas flow direction arrangement generally operates to ensure proper gas flow, through the filter element 70 in proper order.

Attention is now directed to FIGS. 4 and 5. The filter element 70 is shown in FIG. 4 operably assembled within the housing 52. By the term "operably assembled" and variants thereof, it is meant that the filter element 70 is oriented within the housing 52 such that the seals are in place and gas flow is permitted to flow properly from the inlet 58, through the filter element 70, and out through the outlet 60.

It can be seen in FIGS. 4 and 5 that the filter element 70 includes both the optional first stage coalescer filter 64 and the tubular construction media of 66 in a single construction. When the filter element 70 is handled, for example during servicing, both the first stage coalescer filter 64 and the tubular construction of media 66 are handled together. In general, the tubular construction of media 66 includes a media pack 190 arranged in a closed, tubular form to define an open filter interior 192. In preferred constructions, the media pack 190 will be configured to have a generally cylindrical shape, defining a circular cross section.

The media pack 190 can be many different types of media, adjusted to achieve the desired efficiency and restriction. One example of media 194 useable in media pack 190 is formed media. Another example is pleated media. By "pleated media", it is meant a flexible sheet of media folded into a plurality of pleats. Herein below, a preferred media for the media pack 190 is described, as a wet laid media having preferred characteristics. This media is preferred when the function of media pack 190 is to provide for both: coalescing/drainage function and a particulate entrapment function. This function can be provided by media pack 190 when the media pack 190 is used without the optional first stage coalescer filter 64 or when it is used with the optional first stage coalescer filter 64. It is noted that media pack 190 can be provided in a multilayer or multistage form.

In the illustrated embodiment, the media 194 has a first end 196 and an opposite, second end 198. The length of the media 194 extends between the first end 196 and second end 198. In the filter element 70 shown, at the first end 196 is a first end cap arrangement 200. In the particular embodiment shown in FIG. 5, the end cap arrangement 200 includes an end cap 202 and the first stage coalescer filter 64. In certain constructions, the end cap arrangement 200 is a single, unitary structure.

In some embodiments, the end cap 202 includes a ring 204 of a molded, polymeric material. The ring 204 defines a center aperture 206 that, in the preferred embodiment illustrated, is centered in the ring 204. By "centered", it is meant that the aperture 206 has a center of symmetry that is the same as the center of symmetry of the ring 204. In other words, the center 206 is preferably not eccentrically disposed within the ring 204.

In some arrangements, the center aperture 206 will be circular and have a diameter that is not greater than about 50 percent of the diameter of the ring 204. In some arrangements, the diameter of the aperture 206 will be less than 40 percent of the diameter of the ring 204.

The ring 204 also includes an outer, annular surface 208. When filter element 70 is operably assembled within housing 52, the outer annular sealing surface 208 functions as a sealing portion 210. In preferred arrangements, the sealing portion 210 includes a stepped construction 212.

In particular, the stepped construction 212 helps with the insertion and formation of a radial seal 214 (FIG. 4) between the end-cap arrangement 200 and the sealing surface 128 of the housing 52. In FIG. 5, the stepped construction 212 includes a first region of largest diameter 216, adjacent to a second region 218 of a diameter smaller than the first region 216, adjacent to a third region 220 of a diameter smaller than that of the second region 218. This stepped construction 212 of decreasing diameters, results in a construction that helps with the insertion of the filter element 70 in the body 55.

The sealing portion 210 of the end cap 202 can be made from a compressible material, such that there is radial compression of the sealing portion 210 against the sealing surface 128, when the element is operably installed in the housing 52. Example, usable materials for the sealing portion 210, and the entire end cap 202, are described below. In general, end caps 202 can comprise a soft, polyurethane foam having an as-molded density of typically, less than 22 lbs per cubic foot, for example about 12-22 lbs. per cubic foot. Of course alternate materials can be used in variations from the examples described herein, with units still incorporating many of the principles described.

Still in reference to FIG. 5, the end cap arrangement 200 also includes a frame construction 222 oriented in the center aperture 206 of the ring 204. The frame construction 222 holds, contains, and encapsulates a region of fibrous media 224. In the construction shown, the fibrous media 224 is used as the optional first stage coalescer filter 64. In certain arrangements, the fibrous media 224 comprises at least one layer, and typically, a plurality of layers 226 of nonwoven, nonpleated, non open tubular, coalescing media. In the embodiment shown in FIG. 5, there are two layers 226, 228 of fibrous media 224. Certain usable, example materials for the fibrous media 224 are described further below. Again, it is noted that in some arrangements the first stage coalescer filter 64 is not used, and only the tubular filter construction 66 is present.

Still in reference to FIG. 5, in the frame construction 220 depicted, the frame construction 222 is a multi-piece, in particular, a two-piece construction including a first frame piece 230 and a second frame piece 232. The first frame piece 230 includes a support grid 234 in covering relation to the upstream face 236 of the fibrous media 224. The support grid 234 is a porous, mesh that permits gas flow to flow therethrough and across the fibrous media 224. The support grid 234 provides structural support to the fibrous media 224.

Similarly, the second frame piece 232 includes a porous support grid 238 in covering relation to the downstream face 240 of the fibrous media 224. The support grid 238 also provides structural support for the fibrous media 224, while permitting gas flow to penetrate therethrough and into the open filter interior 192.

In the arrangement shown, the first frame piece 230 and the second frame piece 232 are arranged adjacent to each other to form a retaining pocket 242 between the support grid 234 and support grid 238 that holds or encapsulates the fibrous media 224. In certain arrangements, the first frame piece 230 and the second frame piece 232 fit together, such as by snap engagement.

As can be seen in FIG. 5, in the embodiment depicted, the frame construction 222 is molded or embedded within the polymeric end cap 202, along the inner annular region 244 of the ring 204.

The particular filter element 70 depicted further includes an inner support liner 246 and an outer support liner 248. Each of the inner liner 246 and outer liner 248 extends between the first end 196 and second end 198 of the media pack 190. The inner liner 246 and outer liner 248 help to support the media 194. The liners 246 and 248, in typical arrangements, are constructed of a plastic, porous structure that permits gas flow therethrough. The outer liner 248 circumscribes the media 194 and the region of fibrous media 224.

It is noted that alternate materials can be used for the liners. Also in some instances the outer liner, the inner liner or both, are not required, depending on the structural integrity of the filter media 194.

In the particular embodiment illustrated in FIG. 5, the inner liner 246 is an integral, unitary part of the second frame piece 232. That is, the inner liner 246 and the second frame piece 232 are a single member. The inner liner 246 also forms a drain surface 250 for allowing the drippage and flow of coalesced liquid from the first stage coalescer filter 64 down to the bowl 150.

The filter element 70 also includes an end cap 254 at the second end 198 of the media pack 190. The end cap 254 preferably is constructed of a molded, polymeric material, such that the media 194 is potted or embedded there within. Similarly, the inner liner 246 and the outer liner 248, in certain preferred embodiments, extend between and are embedded within the molded, polymeric material of the first end cap 202 and second end cap 254. The second end cap 254 includes an outer annular surface 256 that forms a sealing portion 258. Typically, the sealing portion 258 is compressible, such that it is squeezed against the sealing surface 166 of the cover member 56 when the filter element 70 is operably installed within the housing 52. The end cap 254 has an aperture 255 that, for the example shown, is aligned with the liquid flow outlet 62 to allow coalesced liquid to drain from the first stage coalescer filter 64, through the aperture 255, and exit through the outlet 62.

Attention is directed to FIG. 4. When the filter element 70 is operably installed within the housing 52, the sealing portion 258 is compressed between and against the sealing surface 166 and the outer support liner 248 to form a radial seal 260 therebetween. As can be also seen in FIG. 4, the sealing portion 210 of the first end cap 202 is compressed between and against the sealing surface 128 and the outer support liner 248 to form radial seal 214 therebetween. The radial seals 214, 260 provide for the primary sealing system within the filter arrangement 50. The radial seals 214, 260 prevent unintended amounts of gas flow to bypass either one or both of the first stage coalescer filter 64 and second stage polishing filter 66.

Attention is again directed to FIG. 5. The sealing portion 258 of the end cap 254 also preferably includes a stepped construction 262. The stepped construction 262 is analogous to the stepped construction 212 of end cap 202. In the particular embodiment illustrated, there are three steps of decreasing diameter, including step 264, step 266, and step 268. Again, the stepped construction 262 helps in insertion of the filter element 70 in the housing 52 and the formation of radial seal 260.

The end cap 254 shown comprises a molded, polymeric material, such as molded polyurethane foam having an as-molded density of typically less than 22 lbs per cubic foot, for example, about 10-22 lbs. per cubic foot. One example material is described further below. Alternate materials can be used.

Note that when the end caps 202 and 254 are molded in place, the end caps 202, 254; the first and second plastic extensions 246, 248; the media pack 190; and the non-pleated, non-woven fibrous media 24 are secured together in the form of unitary, cylindrical filter element 70.

Figure 8:
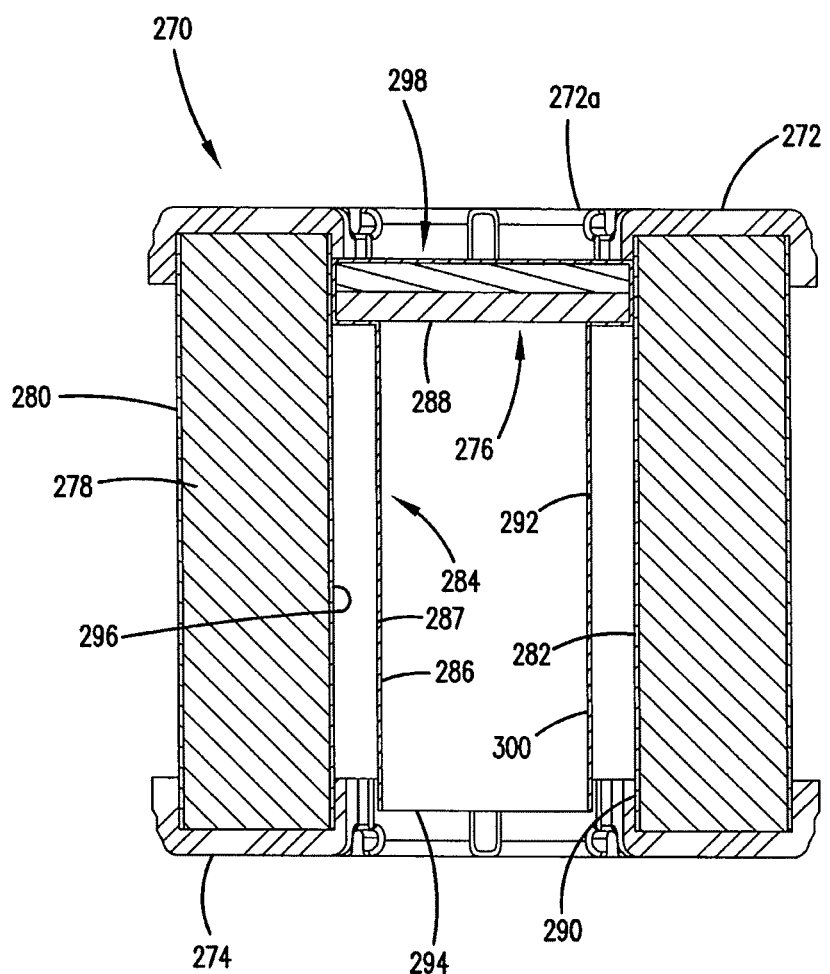
FIG. 8 is a schematic cross-sectional view of a first alternative embodiment of a filter element that can be utilized in the filter arrangement of FIGS. 2-4; the cross-section being analogous to the cross-section of FIG. 5.

An alternative embodiment of filter element 70 is illustrated in FIG. 8 at reference numeral 270. Element 270 is analogous to the element 70 of FIG. 5, in that it includes end cap 272, end cap 274, an optional region of fibrous media 276, media 278, and an outer liner 280. End cap 272 includes a central gas stream inlet aperture 272a. The element 270 further includes an inner support liner 282 potted within, and extending between the end caps 272, 274. In this embodiment, there is further included a flow construction 284 to aid in draining liquid that has been coalesced by the optional fibrous media 276.

In the embodiment illustrated in FIG. 8, the flow construction 284 includes a tube 286. In typical arrangements, the tube 286 extends from the downstream flow face 288 of the coalescer media 276 to the aperture 290 of the end cap 274. The length of the tube 286 can vary between about 33%-95% of the total length of the media 278. In many cases, the tube 286 with have a length of at least 25% of the media pack 190; and usually less than 100% of the length of the media pack 190. In typical embodiments, the tube 286 will have at least a section 287 that is constructed of a generally gas impermeable material, such that gas flow is required to exit from the downstream flow face 288, through the tube interior 292, past the end tip 294 of the tube 286, and then up into the volume 296 before flowing through the media pack 190. The volume 296 is the region between the inner liner 282 and the tube 286. In the particular embodiment depicted, the entire tube 286 includes the imperforate section 287. In other embodiments, there may be portions of the tube 286 that are perforated, or gas permeable.

In the embodiment depicted, the tube 286 is part of a frame construction 298 that is used to trap, encapsulate, or hold the optional fibrous media 276. Typically, the frame construction 298 will be molded within the end cap 272.

The tube 286 will aid in the drainage of coalesced liquid (typically oil). In operation, the coalesced liquid will drain by gravity along the inside wall 300 of the tube 286, and then drip into the bowl 150, and then exit through the liquid flow outlet 62. The tube 286 can help to prevent coalesced liquid from being drawn into the media 278.

Figure 9:
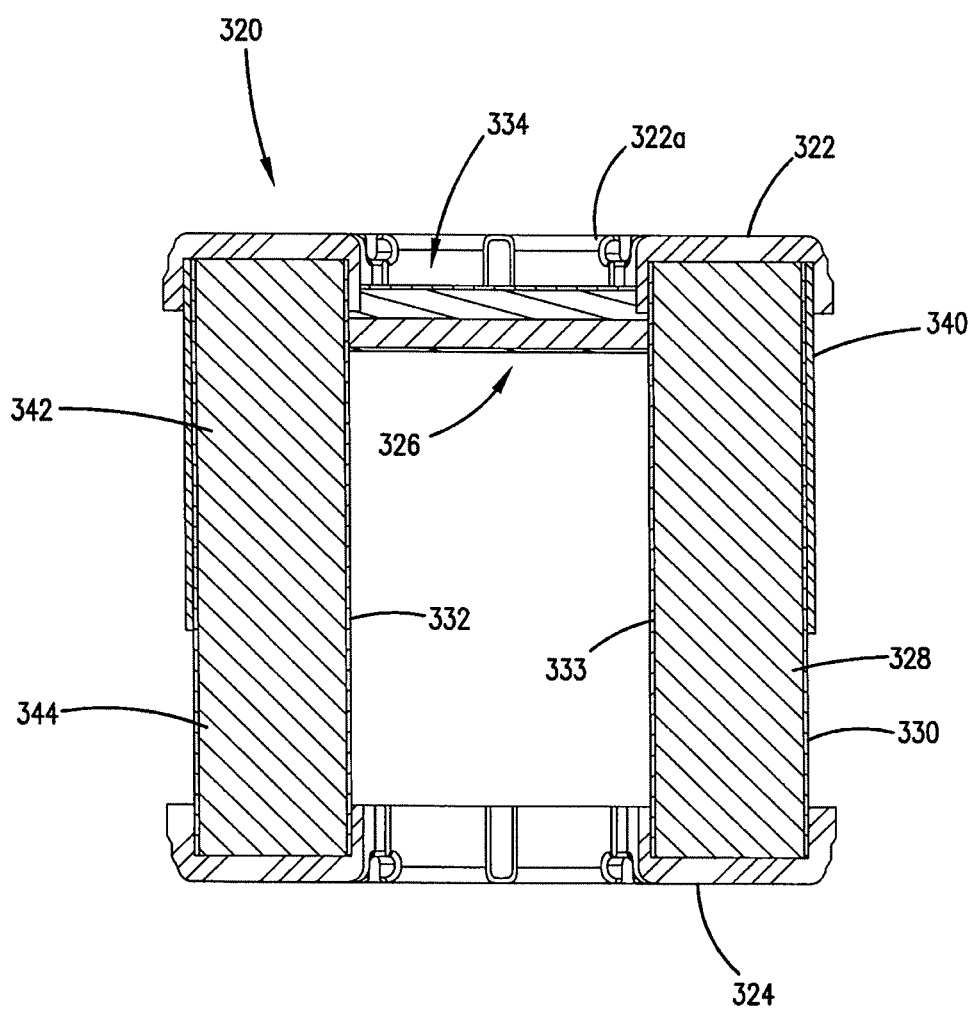
FIG. 9 is a schematic cross-sectional view of a second alternative embodiment of a filter element that can be utilized in the filter arrangement of FIGS. 2-4; the cross-section being analogous to the cross-section of FIG. 5.

Another alternative embodiment of filter element 70 is illustrated in FIG. 9 at reference numeral 320. Element 320 is analogous to the element 70 of FIG. 5, in that it includes end cap 322, end cap 324, an optional region of fibrous media 326, a media pack 327 (illustrated as media 328), an outer liner 330, an inner liner 332, and a frame construction 334 encapsulating the fibrous media 326. End cap 322 includes a central gas stream inlet aperture 322a. The media pack 327 defines an open tubular interior 333. The element 320 further includes an impervious outer wrap 340 circumscribing and in covering relation to the outer liner 330.

In the embodiment depicted, the outer wrap 340 extends between about 25-75% of the length of the media pack 327, typically from the end cap 322 (holding the fibrous media 326) toward the other end cap 324 (stopping short of the end cap 324). The outer wrap 340 aids in draining liquid that has been coalesced by the optional fibrous media 326, as explained further. In particular, the outer wrap 340 helps to prevent gas flow through the region 342 of media 328 that is masked by the wrap 340. This encourages gas flow to travel further in the direction toward the end cap 324, and to the region 344 of media 326 that is not masked by the wrap 340. This helps in the drainage by gravity of coalesced liquid out of the element 320.

A. Example Operation and Chance Out

In operation, the filter arrangement 50 works as follows. Blow-by gases from an engine crankcase are taken in through the gas flow inlet port 58. The gases pass into the interior 84 of the regulator valve housing 74. The valve assembly 92 permits passage of the gas through the gap 106 between the diaphragm construction 94 and the neck 88. The gap 106 become larger as the pressure from the engine crankcase increases, causing the diaphragm construction 94 to move against the spring 96 and into the volume 108 against the lid 57. The gas then flows into the interior portion 104 of the neck 88. From there, it passes through the optional first stage coalescer filter 64. The optional first stage coalescer filter 64, when used, is secured within the construction such that the gas is directed through the first stage coalescer filter 64 before the gas is directed through the media pack 190.

In particular the gas flow passes through the support grid 234 and into the layer 228 of fibrous media 224. The gas continues to flow downstream and through the layer 226, and then through the support grid 238. The fibrous media 224 helps pre-separate liquids, with any entrained solids, from the rest of the gas stream. The liquid flows out of the media 224 and either drips directly into the bowl 150, or drains along the drain surface 250 of the inner liner 246. The collected liquid flows along the sloped wall 176 and ultimately through the liquid flow outlet 62. This liquid material often is oil, and may be recycled to the crankcase to be reused.

The gas stream, and any liquid that is not coalesced by the optional first stage coalescer filter 64 continues on to the filter 66. Specifically, the gas flow travels from the open filter interior 192 through the media pack 190. The gas flow is prevented from bypassing this media due to the radial seals 214, 260. The media pack 190 removes selected additional liquid particles (by coalescing/drain) and selected solids from the gas stream. In the orientation shown in FIG. 4, the media 194 is vertically oriented, such that any further liquid that collects (coalesces or agglomerates) on the media and falls or drain by gravity downwardly toward the bowl 150. The filtered gas then exits through the gas flow outlet port 60. From there, the gases may be directed, for example, to the turbo 34 intake of engine 30 or elsewhere (as described). In general, from outlet port 60 gases can in some instances be vented to the atmosphere. Another instance is preferred that the gas circulation be closed, and thus the gases are circulated to an air intake or elsewhere. For the particular example described in the previous paragraph, the gases were described as potentially directed to the turbo intake.

It should be noted that secondary seals 120, 174 prevent unintended amounts of collected liquid, such as oil, from seeping between the filter element 70 and the housing 52.

The filter arrangement 50 is serviced as follows. The cover member 56 is removed from the body assembly 54 by releasing the latches 136. This permits the cover member 56 to be removed from the body assembly 54. When the cover member 56 is removed from the body assembly 54, the seal 164 between the body 55 and cover member 56 is released. Further, the seal 260 between the filter element 70 and the cover member 56 is released. This also provides access to the filter element 70, which includes the optional first stage coalescer filter 64 and the tubular construction of media 66. The end of the filter element 70 adjacent to the end cap 254 is grasped, and the filter element 70 is pulled in an axial direction from the interior 112 of the body 55. As the filter element 70 is pulled from the interior 112, the radial seal 214 is released. This step removes simultaneously both the first stage coalescer filter 64 and the second stage polishing filter 66. This filter element 70 may then be disposed of, such as by incineration.

A second, new, replacement filter element 70 is then provided. The replacement element 70 also includes the first stage coalescer filter 64 and the second stage polishing filter 66 in an analogous construction as the initial filter element 70. The replacement element 70 including both the first stage 64 and second stage 66 is inserted through the open end 144 of the body 55. The filter element 70 is oriented such that the sealing portion 210 of the end cap 202 is compressed between and against the sealing surface 128 and the outer liner 248 to form radial seal 214 therebetween. In some embodiments, the filter element 70 is also oriented such that the end cap 202 engages and abuts the end wall 114 of the body 55. Next, the cover member 56 is placed over the end of the filter element 70 and oriented such that the sealing portion 258 of the end cap 254 is compressed between and against the outer liner 248 and the sealing surface 166 of the cover member 56. This creates the radial seal 260. In some arrangements, the filter element 70 is also oriented such that the end cap 254 axially engages and abuts the stop 170 of the cover member 56.

With both seals 214 and 260 in place, the cover member 56 is then locked to the body assembly 54 by engaging the latches 136. This also helps to create the seal 164 between the cover member 56 and body 55.

B. Example Constructions and Systems

The filter arrangement 36 is useful on a 1.5 liter-16 liter engine, 50-1200 hp, turbo charged, or super charged, diesel, or natural gas. In one application, the engine is a 250-400 hp, V-8 engine. The engine has a piston displacement of at least 3 liters, typically 7-14 liters. It typically has 8-16 cfm of blow-by gases generated. Preferred filter arrangements 36 can handle blow-by gases from 1-20 cfm.

In other systems, the filter arrangement 36 is useful on engines with the following powers: 8 kw-450 kw (11-600 hp); 450-900 kw (600-1200 hp); and greater than 900 kw (>1200 hp). In general, as the power of the engine increases, the second stage media 194 will be increased in surface area. For example, for engine powers 8 kw-450 kw (11-600 hp), when pleated media is used, the length of the pleats will be about 4-5 inches; for engine powers 450-900 kw (600-1200 hp), the length of the pleats will be about 6-8 inches; and for engine powers greater than 900 kw (>1200 hp), there will typically be more than one filter arrangement 36 utilized.

It will be understood that a wide variety of specific configurations and applications are feasible, using techniques described herein. The following dimensions are typical examples:

| Structure | At least (in.) | No greater than (in.) | Typical (in.) |
|---|---|---|---|
| outer diameter of element 70 | 2 | 12 | 4-5 |
| inner diameter of element 70 | 0.5 | 10 | 1.5-2.5 |
| length of element 70 | 3 | 12 | 4-6 |
| diameter of media 224 | 0.5 | 10 | 2-2.5 |
| thickness of each layer 226, 228 | 0.05 | 1 | 0.1-0.3 |
| diameter of inlet 58 | 0.5 | 3 | 1-1.5 |

| Structure | At least (in.) | No greater than (in.) | Typical (in.) |
|---|---|---|---|
| diameter of gas flow outlet 60 | 0.5 | 3 | 1-1.5 |
| diameter of neck 88 | 0.5 | 3 | 1-1.5 |
| height of projection 116 | 0.01 | 0.25 | 0.05-0.1 |
| diameter of open end 144 | 3 | 14 | 4.5-5.5 |
| diameter of lid 57 | 3 | 14 | 4.5-5.5 |
| diameter of diaphragm 96 | 3 | 14 | 4.5-5 |
| diameter of inner wall 156 | 3 | 13 | 4.5-5 |
| diameter of outer wall 154 | 3 | 14 | 5-5.5 |
| diameter of liquid flow outlet 62 | 0.05 | 2 | 0.1-0.5 |
| height of projection 172 | 0.01 | 0.25 | 0.05-0.1 |
| length of housing 52 | 4 | 15 | 7-8 |

C. Example Materials

In this section, certain example materials useful for the embodiment of FIGS. 2-7 are described. A variety of materials may be used, other than those described herein.

The housing 50 can be plastic, such as carbon filled nylon.

The media 224 of the optional coalescer 64 is generally non-pleated, non-cylindrical, polyester fibrous media having an average fiber diameter of less than about 18 microns, typically about 12.5 microns and a percent solidity, free state, of no greater than about 1.05%. The media 224 has an upstream, and a downstream exposed surface area of at least 1 in.$^2$, no greater than about 7 in.$^2$, and typically about 3-4 in.$^2$ The material has an average fiber diameter of 1.5 denier (about 12.5 micron), and a solidity in a free state of at least 0.85%. It has a weight of, typically, greater than about 3.1 ounces per square yard. Typically, it has a weight less than 3.8 ounces per square yard. Typical weights are within the range of 3.1-3.8 ounces per square yard (105-129 grams per square meter). Typically, the media has a thickness at 0.002 psi compression (free thickness) of greater than about 0.32 inches. Typically, the media has a thickness at 0.002 psi compression (free thickness) of less than about 0.42 inches. Typical free thicknesses for the media are in the range of 0.32-0.42 inches (8.1-10.7 millimeters). The media has a typical permeability of no less than about 370 feet per minute (113 meters per minute).

It is noted that the media 224 of the optional coalescer 64 could be provided by a preferred bi-component fiber containing media, in general as described in detail herein below, in section VI.

The end caps 202, 254 can be a polymeric material. In some examples, the end caps 202, 254 is urethane, and more particularly, foamed polyurethane. One example foamed polyurethane is described in commonly assigned U.S. Pat. No. 5,669,949 for end cap 3, herein incorporated by reference. The material can be the following polyurethane, processed to an end product (soft urethane foam) having an "as molded" density of 10-22 pounds per cubic foot (lbs/ft$^3$) and which exhibits a softness such that a 25% deflection requires about a 10 psi pressure. In some embodiments, the "as molded" density varies from the 10-22 lbs/ft$^3$ range. The polyurethane comprises a material made with 135453R resin and I3050U isocyanate. The materials should be mixed in a mix ratio of 100 parts 135453 resin to 36.2 parts I3050U isocyanate (by weight). The specific gravity of the resin is 1.04 (8.7 lbs/gallon) and for the isocyanate it is 1.20 (10 lbs/gallon). The materials are typically mixed with a high dynamic shear mixer. The component temperatures should be 70-95° F. The mold temperatures should be 115-135° F.

The resin material I35453R has the following description:
(a) Average molecular weight
1) Base polyether polyol=500-15,000
2) Diols=60-10,000
3) Triols=500-15,000
(b) Average functionality
1) total system=1.5-3.2
(c) Hydroxyl number
1) total systems=100-300
(d) Catalysts
1) amine=Air Products 0.1-3.0 PPH
2) tin=Witco 0.01-0.5 PPH
(e) Surfactants
1) total system=0.1-2.0 PPH
(f) Water
1) total system=0.03-3.0 PPH
(g) Pigments/dyes
1) total system=1-5% carbon black
(h) Blowing agent
1) 0.1-6.0% HFC 134A.

The I3050U isocyanate description is as follows:
(a) NCO content—22.4-23.4 wt %
(b) Viscosity, cps at 25° C.=600-800
(c) Density=1.21 g/cm$^3$ at 25° C.
(d) Initial boiling pt.—190° C. at 5 mm Hg
(e) Vapor pressure=0.0002 Hg at 25° C.
(f) Appearance—colorless liquid
(g) Flash point (Densky-Martins closed cup)=200° C.

The materials I35453R and I3050U are available from BASF Corporation, Wyandotte, Mich. 48192.

The frame construction 222, inner liner 246, outer liner 248, and screens 234, 238 can be constructed of plastic, such as carbon filled nylon.

When pleated media is used the filter 66 is preferably constructed of an oleo-phobic material. One example is synthetic glass fiber filter medium, coated and corrugated to enhance performance in ambient air-oil mist conditions. When pleated, the media 194 has a face velocity of at least 0.1 ft/min., no greater than 5 ft/min., and typically about 0.3-0.6 ft./min. The pleat depth is no less than 0.5 in., no greater than 3 in., and typically about 0.75-2 in. The pleat length is at least 1 in., no greater than 15 in., and typically 3-6 in. The pleated media 194 has an upstream media surface area of at least 2 ft$^2$ and preferably about 3-5 ft$^2$. There are at least 30 pleats, no greater than about 150 pleats, and typically about 60-100 pleats. The synthetic glass fiber filter media may be coated with a low surface energy material, such as an aliphatic fluorocarbon material, available from 3M of St. Paul, Minn. Prior to coating and corrugating, the media has a weight of at least 80 pounds/3000 sq. ft; no greater than about 88 pounds/3000 sq. ft; typically in a range from about 80-88 pounds/3000 square feet (136.8±6.5 grams per square meter). When pleated, the media has a thickness of 0.027±0.004 inches (0.69±0.10 millimeters); a pore size of about 41-53 microns; a resin content of about 21-27%; a burst strength, wet off the machine of 13-23 psi (124±34 kPa); a burst strength wet after 5 minutes at 300° F. of 37±12 psi (255±83 kPa); a burst strength ratio of about 0.30-0.60; and a permeability of 33±6 feet per minute (10.1±1.8 meters per minute). When pleated, after corrugating and coating, the media has the following properties: corrugation depth of about 0.023-0.027 inches (0.58-0.69 millimeters); a wet tensile strength of about 6-10 pounds per inch (3.6±0.91 kilograms per inch); and a dry burst strength after corrugating of no less than 30 psi (207 kPa).

When pleated media is used for the filter 66, the ratio of the upstream surface area of the coalescer media 224 to the upstream surface area of the pleated media 194 is less than 25%, typically less than 10%, and in some instances, less than 1%. The ratio of the downstream surface area of the coalescer media 224 to the upstream surface area of the pleated media 194 is less than 25%, typically less than 10%, and in some instances, less than 1%.

In many typical arrangements according to the present disclosure, filter 66 will not be provided in a pleated form and will not comprise the materials characterized above. Rather preferred fibrous material as described herein below in Section VI will be used.

The housing 52 may be constructed of a molded plastic, such as glass filled nylon. The diaphragm construction 94 can be constructed of a deflectable material, such as rubber.

III. The Embodiments of FIGS. 10-15

Figure 10:
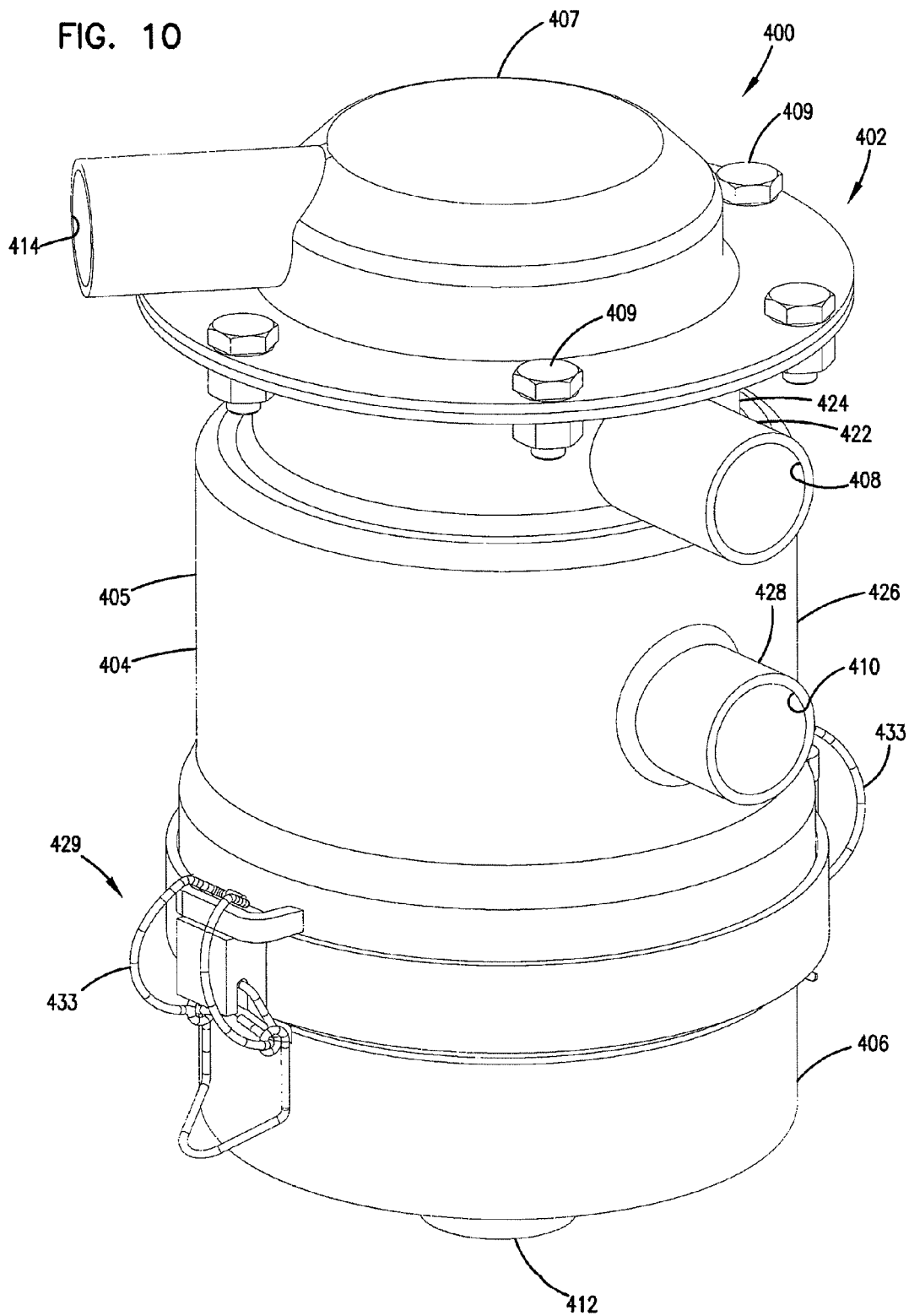
FIG. 10 is a schematic perspective view of another embodiment of a filter arrangement, constructed according to principles of this disclosure.
Figure 11:
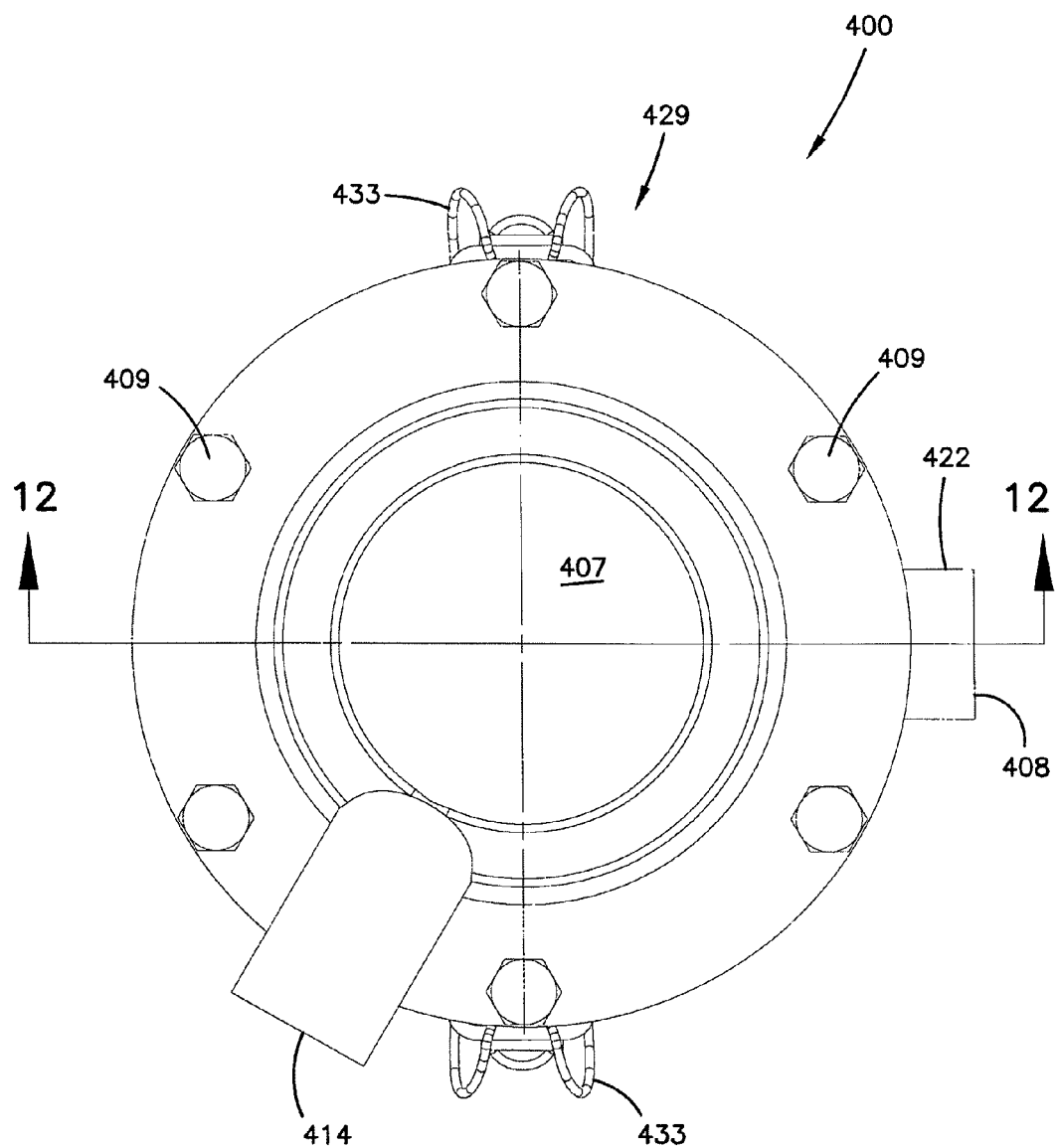
FIG. 11 is a top plan view of the filter arrangement depicted in FIG. 10.
Figure 12:
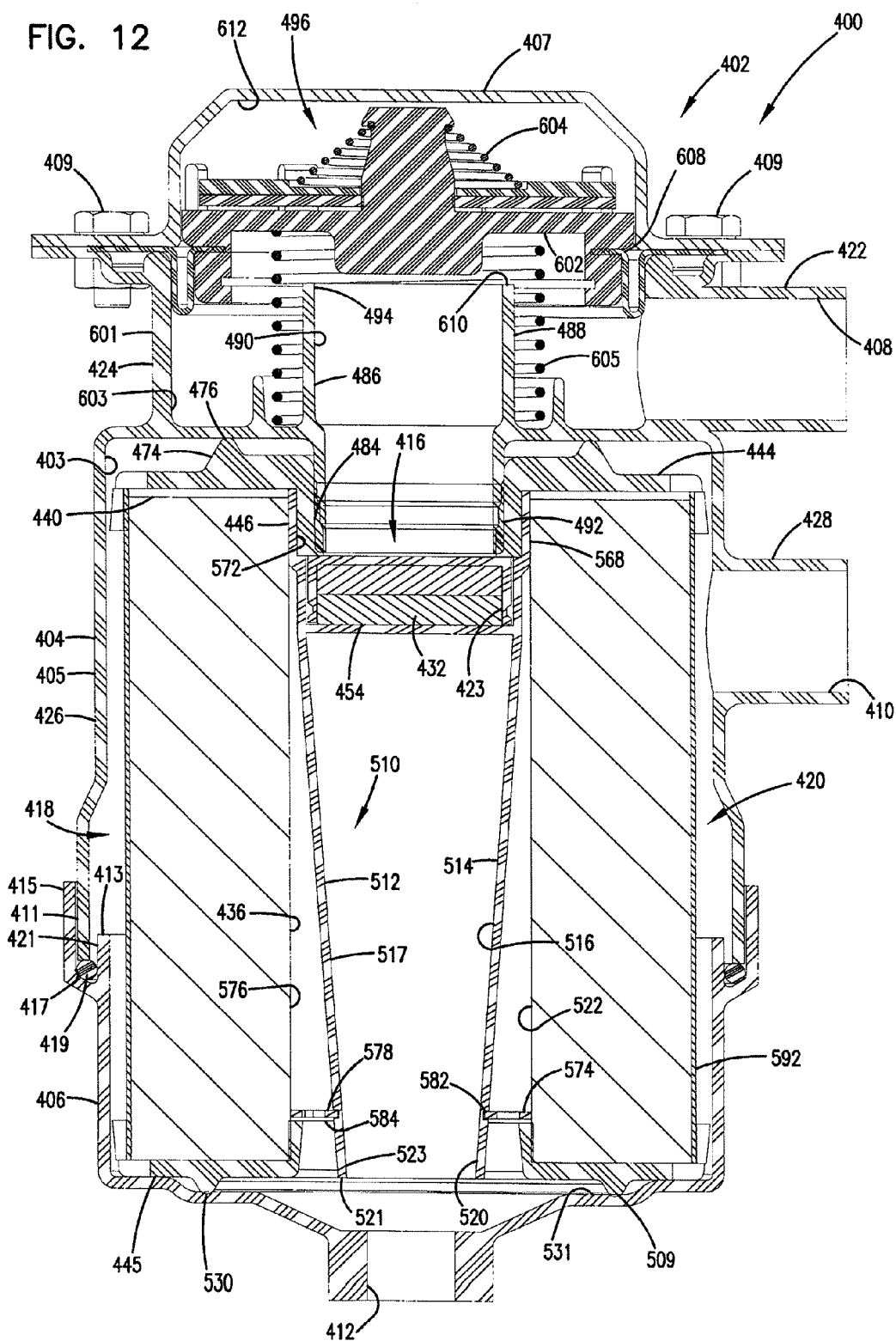
FIG. 12 is a schematic cross-sectional view of the filter arrangement depicted in FIGS. 10 and 11, and taken along the line 12-12 of FIG. 11.

Another alternative embodiment of a coalescer filter and gas cleaner arrangement is depicted in FIGS. 10-12 at 400. The gas cleaner filter arrangement 400 includes a housing 402. The depicted housing 402 has a two-piece construction. More specifically, housing 402 comprises a body assembly 404 and a removable cover member 406. The body assembly 404 includes body 405 and lid 407.

Housing 402 includes the following four ports: gas flow inlet port 405; gas flow outlet port 410; port 412; and gas flow bypass outlet port 414. In general, and in reference now to FIG. 12, the gas cleaner filter arrangement 400 includes optional first stage coalescer filter 416 and second stage filter media 418. In use in the arrangement shown, the port 412 acts as a liquid flow outlet port or liquid drain 412. In the arrangement shown, a liquid entrained gas stream is directed through the gas flow inlet port 408 and then through the optional first stage coalescer filter 416. A portion of the liquid phase would be coalesced and removed from the gaseous stream by the optional first stage coalescer filter 416. The liquid that is coalesced within the optional first stage coalescer filter 416 drains and exits the housing 402 through the liquid flow outlet port 412. The gas phase is directed from a flow passageway 423 and the optional first stage coalescer 416 through the filter media 418. The media construction 418 provides further coalescing/drainage of liquid particles removes at least a portion of solid particulates from the gas stream, and the cleaned gas stream is then directed outwardly from the housing 402 through the gas flow outlet port 410.

Figure 13:
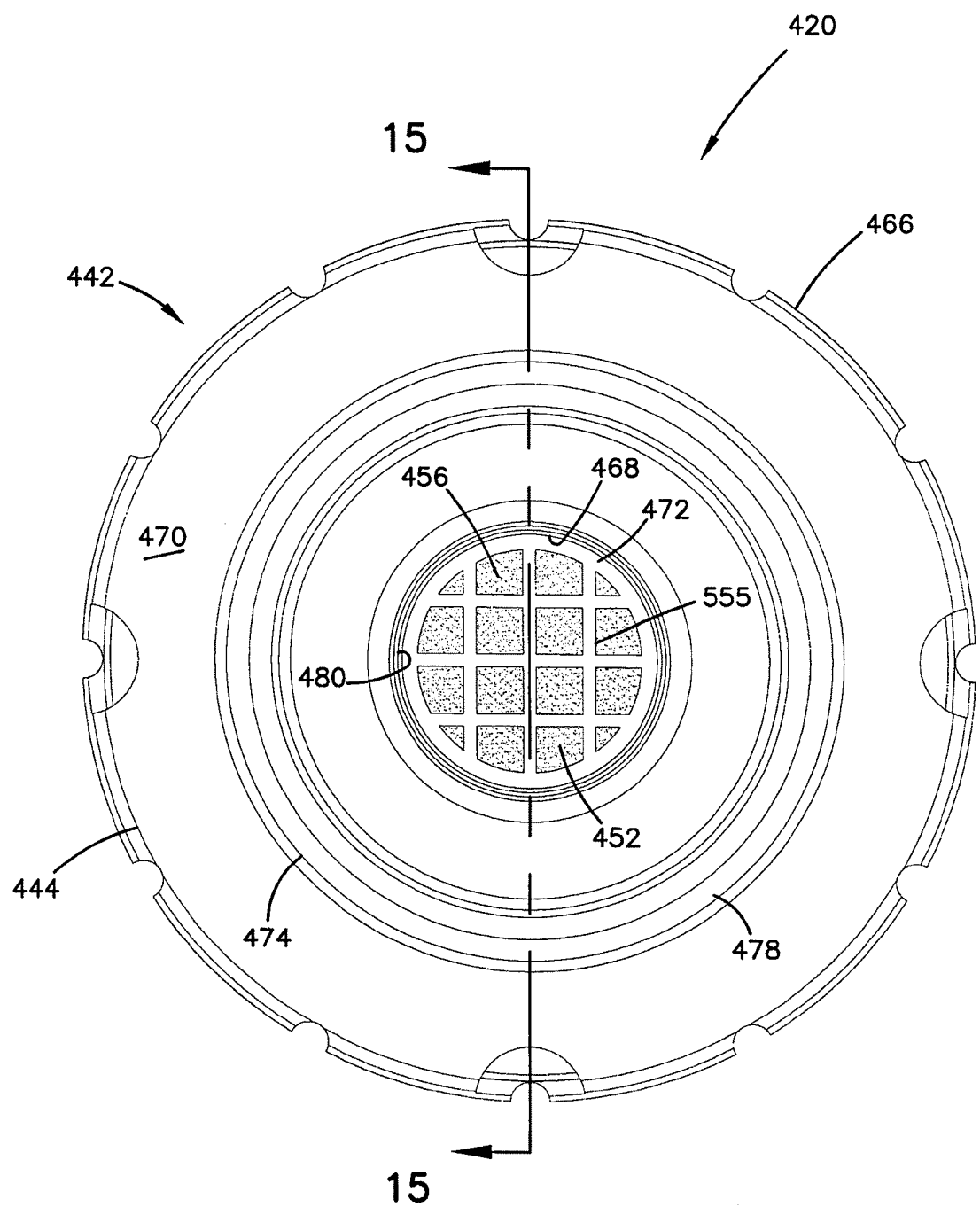
FIG. 13 is an end view of one embodiment of a filter element utilized in the filter arrangement of FIGS. 10-12.
Figure 14:
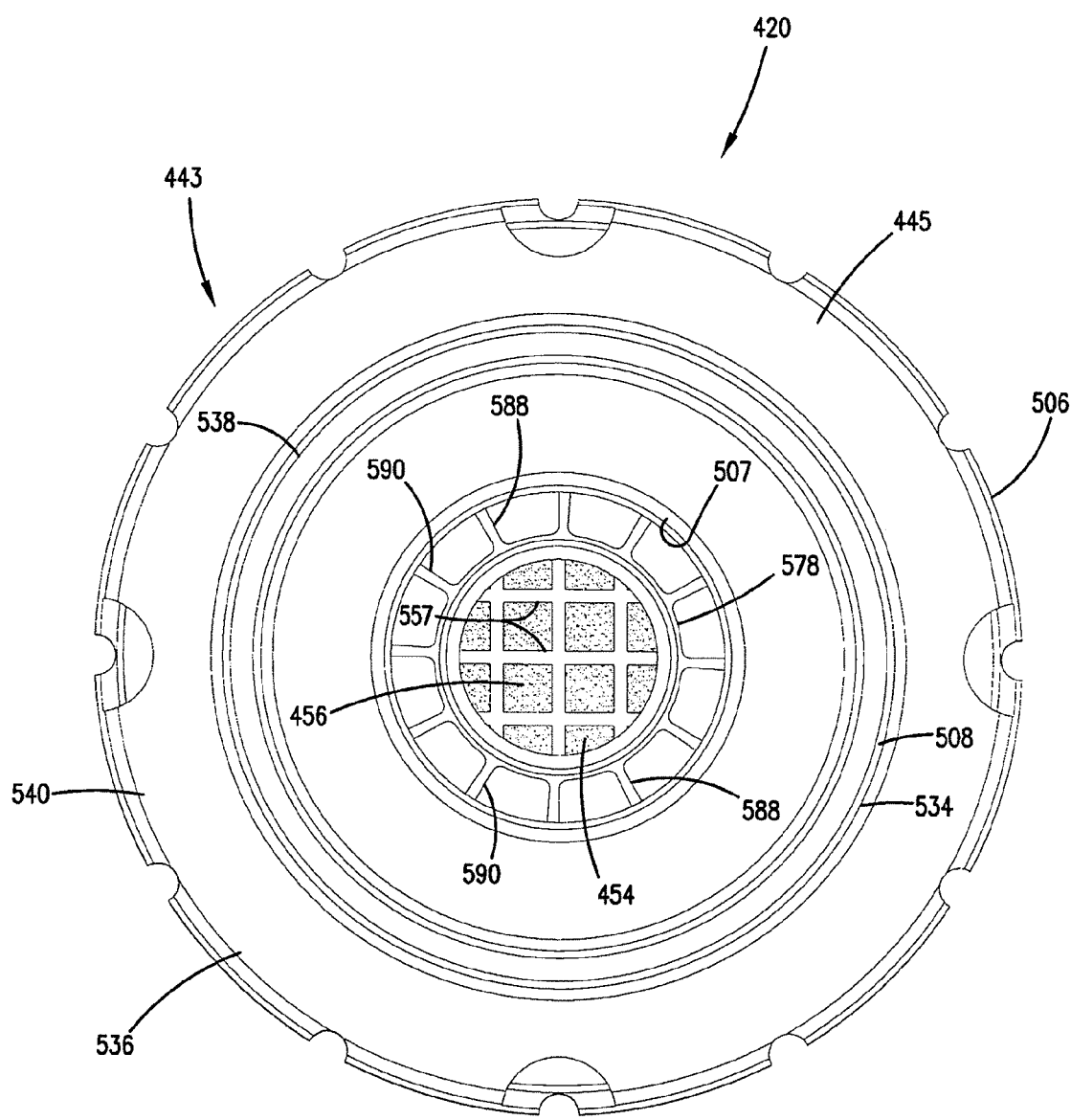
FIG. 14 is an opposite end view of the filter element depicted in FIG. 13.
Figure 15:
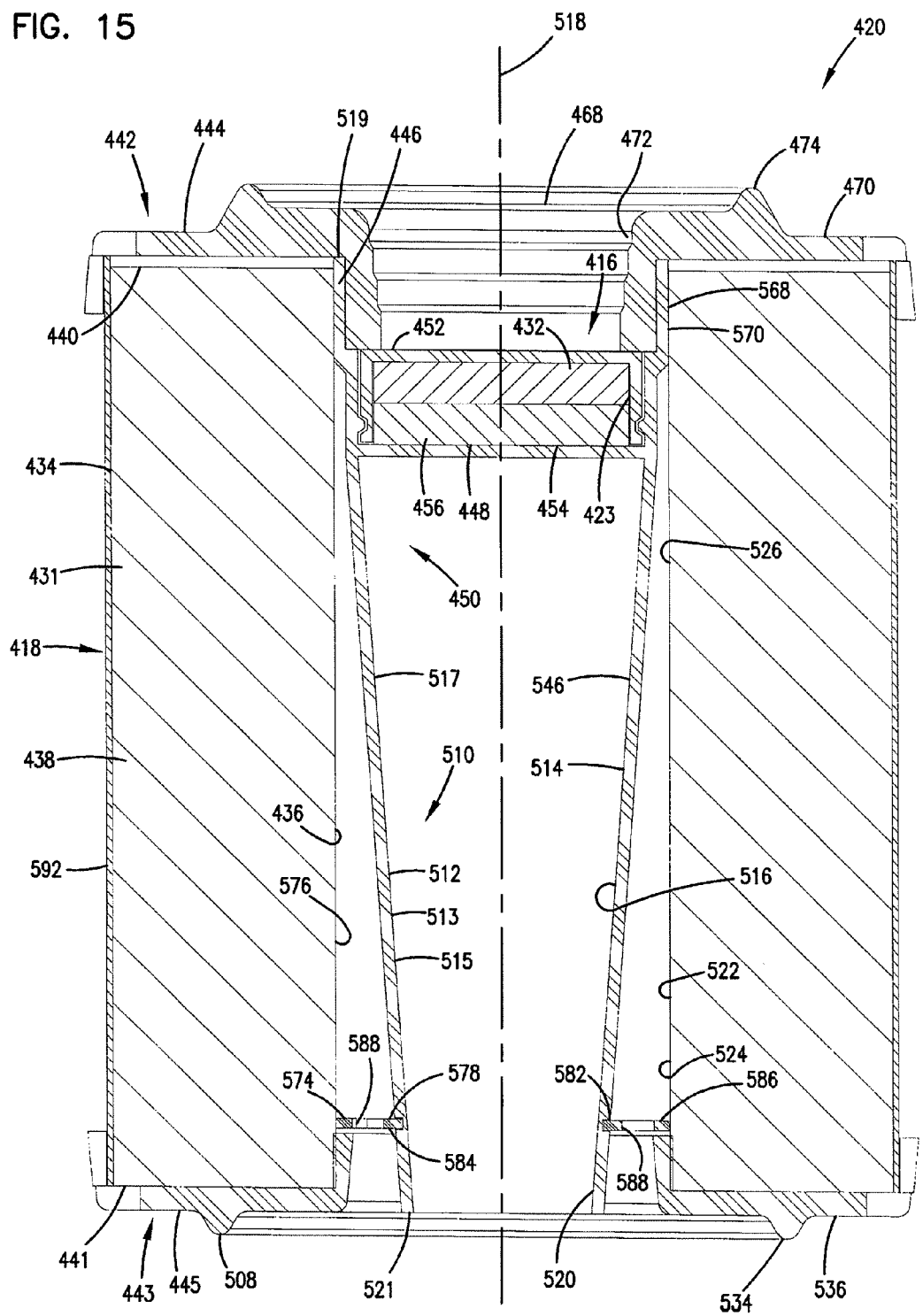
FIG. 15 is a schematic cross-sectional view of the filter element depicted in FIGS. 13 and 14, the cross section being taken along the line 15-15 of FIG. 13.

As with the embodiment depicted in FIG. 5, the optional first stage coalescer filter 416 and the media 418 are a single, unitary construction forming a filter arrangement or element 420 (FIGS. 13-15). In typical designs, the filter element 420 is removable and replaceable from the housing 402. As with the embodiment of FIG. 5, "unitary" means that the optional first stage coalescer filter 416 and second stage media 418 cannot be separated without destroying a portion of the element 420. In typical embodiments, the first and second end caps 444, 445 are part of the unitary construction.

In reference again to FIGS. 10 and 12, for the body assembly 404 depicted, there is an inlet tube construction 422, a valve housing 424, a canister portion 426, and an outlet tube construction 428. In the embodiment shown, each of the inlet tube construction 422, valve housing 424, canister portion 426, and outlet tube construction 428 comprise a portion of the body 405. Together with the lid 407, the body 405 and the lid 407 are part of the body assembly 404. The lid 407, in the embodiment depicted, is secured to the body 405 through selectively removable mechanical engagement, such as a bolt arrangement 409. The bolt arrangement 409 provides selective access to a regulator valve assembly 496.

The filter element 420 is constructed and arranged to be removably mountable within the housing 402. That is, the filter element 420 and the housing 402 are designed such that the housing 402 can be selectively opened in order to access the filter element 420. The filter element 420 is designed to be selectively mountable and removable from within an interior 403 of the housing 402. When the filter element 420 is oriented as shown in FIG. 12, with all of the seals (to be described below) in place, the filter element 420 is considered to be operably installed within the housing 402.

As mentioned above, the housing 402 is designed to be selectively openable in order to access the filter element 420. In the particular embodiment illustrated, the cover member 406 is secured to the body 405 through a latch arrangement 429. The latch arrangement 429 preferably selectively holds the cover member 406 tightly and securely to and against the body 405, when the latch arrangement 429 is in a locked state. In the one depicted, the latch arrangement 429 includes at least two latches 433, and in this embodiment, first and second wire latches 433.

In reference to FIG. 12, note that the body 405 and cover member 406 include a seal arrangement 421. In particular, note that the cover 406 includes a pair of opposing flanges 413, 415 defining a receiving slot 417 therebetween. The body 405 includes a flange 411 that fits in the slot 417. Typical such embodiments also include an O-ring seal member 419 seated within the slot 417.

FIG. 15 depicts the filter element 420 as it would appear in an uninstalled state, that is, when it is not mounted within the housing 402. FIG. 13 shows an end view of the filter element 420, while FIG. 14 shows an opposite end view of the filter element 420. In general, filter element 420 includes regions 431, 432 of filter media. In the filter element 420 depicted in the drawings, the filter media 431 includes a tubular extension 434 that defines a tubular open filter interior 436. In certain constructions, the tubular extension of media 434 is configured to have a generally cylindrical shape, defining a tubular (for example circular, although alternatives are possible) cross-section. The region of media 431 can be many types of media 438. However, it preferably includes non-pleated media as described in Section VI. The region of media 431, when installed in the filter arrangement 400, preferably acts to provide selected coalescing/drainage of liquid particles and selected removal of solid particulates before the gas stream leaves housing 402.

In the illustrated embodiment, the media 438 has a first end 440 and an opposite second end 441. The length of the media 438, in typical embodiments, extends between the first end 440 and the second end 441. In the filter element 420 shown, at the first end 440, is a first end cap arrangement 442. In the particular one shown, the first end cap arrangement 442 includes an end cap 444 and an optional rigid, pre-formed insert 446 molded therein. In such constructions, the first end cap arrangement 442 can be a single, unitary structure. As will be described further below, the pre-formed insert 446 includes a frame construction 450, which holds the optional first stage coalescer filter 416 in operable assembly.

Still in reference to FIG. 15, at the second end 441 of the media 438, is a second end cap arrangement 443. The second end cap arrangement 443 includes at least a second end cap 445.

As mentioned above, the filter element 420 includes at least the second and first regions of media 431, 432. In the arrangement, the second region of media 431 can be pleated media, and/or it can be a wrapped or formed media. Preferably it is a media as described in Section VI below. The optional first region of media 432, is oriented in extension across the tubular extension 434 of the second region of media 431 to be in gas flow communication with the open filter interior 436. By the phrase "oriented in extension across the tubular extension", it is meant that the optional first region of media 432 does not radially overlap the second region of media 431 to itself form a tubular extension; rather, the optional first region of media 432 extends across and covers the end cap aperture 445. The optional first region of media 432 may be itself embedded within the end cap 444 or be oriented adjacent to but spaced from the end cap 444 in a direction toward the end cap 445. The optional first region of media 432 is not necessarily contained within a single plane, but in typical embodiments, the optional first region of media 432 is a non-tubular, non-cylindrical, generally panel construction 448. By "panel construction" it is meant that the first region of media 432 permits gas flow to maintain a generally straight path therethrough. That is, the gas flow is not required to turn a corner as it flows from an upstream face 452 to a downstream face 454.

Figure 15A:
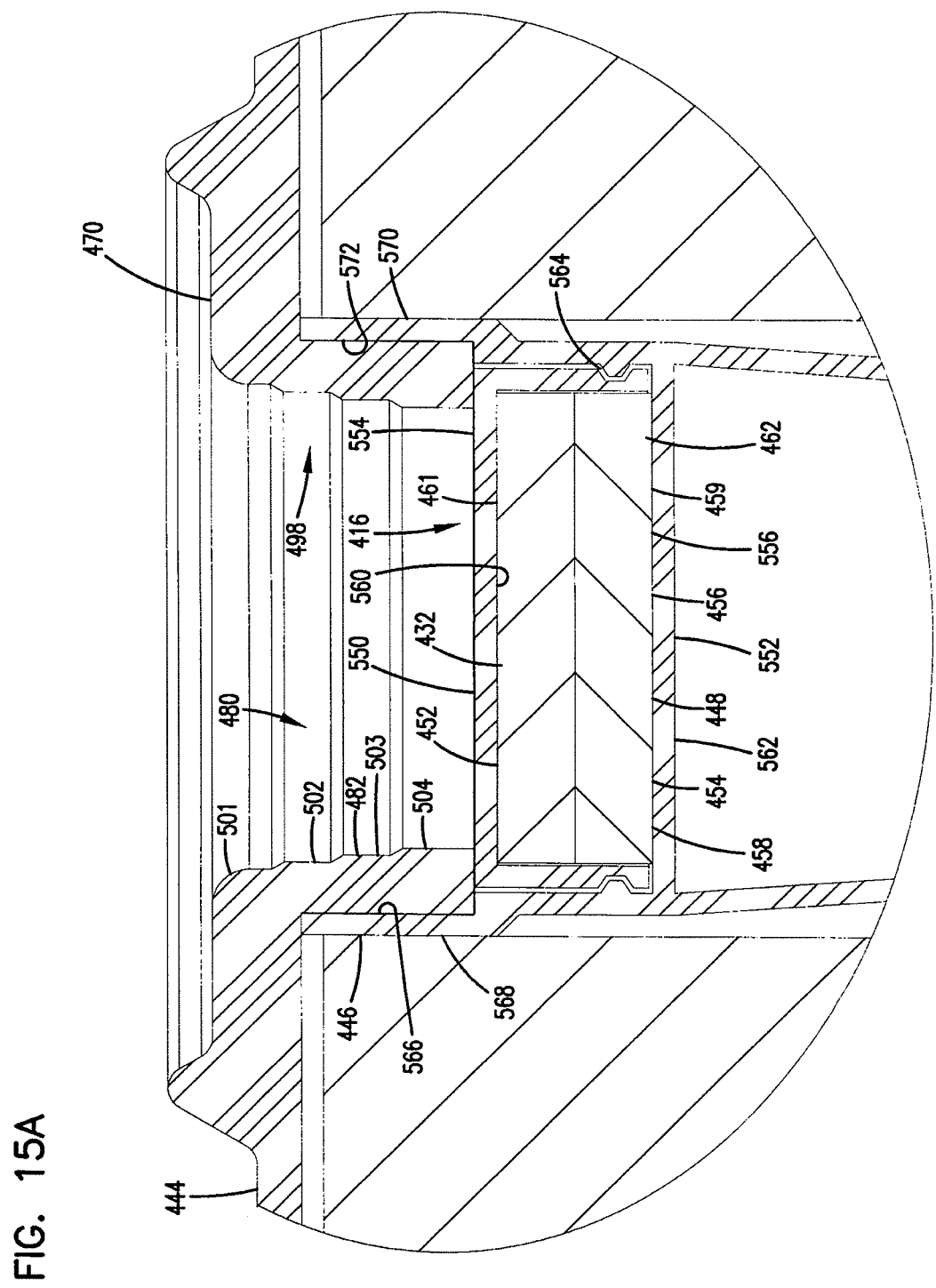
FIG. 15A is an enlarged, fragmented, schematic cross-sectional view of a portion of the filter element depicted in FIG. 15.

In some embodiments, and in reference to FIG. 15A, the optional first region of media 432 also corresponds to the first stage coalescer filter 416. In typical embodiments, the optional first region of media 432 includes fibrous media 456, although it could comprise a preferred media as described in Section VI. In certain embodiments, the media 456 includes at least one layer, and typically, a plurality of layers 458 of a fibrous bundle of non-woven, non-pleated, non-open tubular, coalescing depth media 459. In the embodiments shown in FIGS. 12 and 15, there are two layers 461, 462 of fibrous depth media 459. Useable materials for the fibrous media 456 are described above in connection with media 224 of FIG. 5.

Attention is directed to FIG. 13, where the first end cap 444 is shown in plan view. In some embodiments, the end cap 444 includes a ring 466 of a molded, polymeric material. The ring 466 defines a center aperture 468 that, in the embodiment illustrated, is centered in the ring 466. In other words, the aperture 468 has a center of symmetry that is the same as the center of symmetry of the ring 466. In the particular embodiment illustrated, the center aperture 468 is circular. The aperture 468 functions as a gas stream inlet aperture. The aperture 468 is shown aligned (either overlapping or coaxial with) the flow passageway 423 of the first stage coalescer filter 416.

The end cap 444 includes an axial portion 470 and an annular or radial portion 472. The aperture 468 provides for gas flow communication with the open filter interior 436. The axial portion 470 of the end cap 444 includes at least one continuous projection 474. In some embodiments, the continuous projection 474 helps to form a secondary seal 476 (FIG. 12) with the housing 402, when the filter element 420 is operably installed within the housing interior 403. In the particular embodiment illustrated in FIG. 13, the continuous projection 474 forms a circular ring 478.

The radial portion 472 of the end cap 444 forms an annular sealing portion 480. When the filter element 420 is operably assembled within the housing 402, the annular sealing portion 480 forms a seal member 482. In the embodiment shown in FIG. 13, the seal member 482 is along the inner annular surface of the ring 466, to circumscribe the aperture 468.

When the filter element 420 is operably installed within the housing 402, the seal member 482 forms a seal 484 (in this instance a radial seal) with the housing 402. In particular, in the arrangement shown in FIG. 12, the body 405 of the housing 402 includes an internal tube 486. The tube 486 includes a rigid wall 488 that circumscribes and defines a gas flow aperture 490. When constructed as shown in FIG. 12, the wall 488 has a sealing portion 492 that is designed to extend through the aperture 468 of the end cap 444 and into the open filter interior 436. The wall 488 also has an end portion 494 that may, in certain instances, interact with valve assembly 496. The valve assembly 496, its operation, and its interaction with the wall 488 are discussed in further detail below.

In FIG. 12, it can be seen that the radial seal 484 is formed against the sealing portion 492 of the tube 486. In some embodiments, the radial seal 484 is formed by compression of the material of the first end cap 444 between and against the sealing portion 492 of the tube 486 and the pre-formed insert 446 embedded within the end cap 444. In this context, by "between and against" it is meant that the material of the first end cap 444 extends transversely the distance between the sealing portion 492 of the tube 486 and the pre-formed insert 446, and is compressed in dimension due to the rigidity of portion 492 and insert 446.

In reference now to FIG. 15A, the annular sealing portion 480, in the particular embodiment illustrated, includes a stepped construction 498, although alternatives are possible. The stepped construction 498 helps with the insertion and formation of the radial seal 484 between the end cap arrangement 442 and the sealing portion 492 of the housing 402. In the embodiment illustrated, the stepped construction 498 includes a plurality of regions of decreasing diameters, extending from the axial portion 470 of end cap 444 to the upstream face 452 of the fibrous media 456. In FIG. 15A, the stepped construction 498 includes a first region of largest diameter 501, adjacent to a second region 502 of a diameter smaller than the first region 501, adjacent to a third region 503 of a diameter smaller than that of the second region 502, adjacent to a fourth region 504 smaller than that of the third region 503. This stepped construction 498 of decreasing diameters results in sealing portion 480 that helps with the insertion of the filter element 420 into the housing 402 and the formation of the radial seal 484.

The sealing portion 480 of the end cap 444 is, for example, made from a compressible material, such that there is radial compression of the sealing portion 480 against the sealing portion 492 of the tube 486 of the housing 402. In some examples, end caps 444 comprise a soft, polyurethane foam having an as-molded density of about 10-22 pounds per cubic foot. One usable material is described above in connection with the sealing portion 410; another usable material is described further below.

Referring again to FIG. 12, the filter arrangement 400 shown includes a flow construction arrangement 510 oriented to direct fluid, such as coalesced liquid, from the optional first region of media 432 toward the liquid flow outlet 412. In general, the flow construction arrangement 510 includes a tube 512 formed by a section 513 of impervious, continuous, uninterrupted wall 514 surrounding and defining an open, fluid passage 516. In certain embodiments, the tube 512 extends from the downstream face 454 of the first stage coalescer filter 416 at least partially in a direction toward the second end cap 445. In some embodiments, the tube 512 extends a complete distance between the downstream face 454 and the second end cap 445. In the particular arrangement depicted, the tube 512 forms an aperture 520, preferably a fluid exit aperture 523, at the end 521 of the wall 514 adjacent to the second end cap 445. In this manner, in this particular arrangement, liquid that is coalesced by the first stage coalescer filter 416 is allowed to collect along the interior 517 of the tube 512 and drip by gravity to the liquid flow outlet port 412. Alternate drain arrangements are also usable. While in the depicted embodiment, the entire wall 514 includes the imperforate section 513, in other embodiments, only portions of the wall 514 will be imperforate.

In the embodiment of FIG. 8, the flow construction arrangement 284 was depicted in the drawing as being generally straight, and unangled. In the embodiment of FIGS. 12 and 15, the flow construction arrangement 510 is depicted as a conical section 515 having a sloped or tapered wall 514. In certain constructions, the angle of taper on the wall 514 will be adjusted depending upon the overall length of the element 420. That is, in some constructions, the size of the aperture 468 generally remains fixed. As the length of the media 438 becomes greater, the length of the overall element 420 becomes greater, and the angle or taper of the wall 514 decreases. In certain arrangements, the angle of taper, as measured from a longitudinal axis 518 (FIG. 15) passing through the symmetrical center of the element 420, is at least 1° extending from end 519 (adjacent to the coalescer filter 416) to end 521. In some arrangements, the angle of taper can be 2-15°, and typically less than 45°. The taper or angle on the wall 514 helps to direct the coalesced liquid in the direction of the fluid exit aperture 520 and ultimately through the liquid flow outlet port 412.

After passing through the first stage coalescer filter 416, the gas flows through the fluid passageway 516, out through exit aperture 520, and then into a gas flow plenum 522. The gas flow plenum 522 is formed between the wall 514 of the tube 512 and the media 438. The taper on the wall 514 causes the gas flow plenum 522 to be angled between a volume 524 adjacent to the second end cap 445 and a volume 526 adjacent to the first end cap 444 that is smaller than volume 524.

In reference now to FIG. 14, the depicted second end cap 445 includes a ring 506 defining a center aperture 507. The aperture 507 allows for the passage of liquid collected by the optional first stage coalescer filter 416 to exit the filter element 420, in the particular system depicted in FIG. 12. The end cap 445 supports a sealing arrangement 508 for forming a seal 509 (FIG. 12) with the housing 402. In the embodiment illustrated in FIG. 12, the particular seal 509 depicted is an axial seal 530 formed between the filter element 420 and an inner sealing surface 531 of the cover member 406. In some embodiments, the sealing arrangement 508 includes a projection 534 extending or projecting in an axial direction from a generally flat, planar portion 536 of the second end cap 445. In certain embodiments, the projection 534 forms a continuous ring 538. Some constructions include the end cap 445 and the projection 534 as a single, unitary, molded construction 540. In some embodiments, the end cap construction 540 is made from a polymeric material, preferably, a compressible polymeric material such as polyurethane. In some embodiments, the second end cap 445 is made from the same material as the first end cap 444. The axial seal 530 helps to prevent gas from the inlet port 408 from bypassing the first stage coalescer filter 416 and the second stage construction of filter media 418. The axial seal 530 also helps to prevent the seepage of liquid such as oil from passing to the downstream side of the second stage filter media 418.

As mentioned above, the first end cap arrangement 442 includes pre-formed insert 446. In the embodiment depicted in FIGS. 12 and 15, the pre-formed insert 446 includes frame construction 450 for holding and encapsulating the fibrous media 456. The frame construction 450 is now further described. In reference to FIG. 15, the particular frame construction 450 depicted is a multi-piece construction 546. In the embodiment shown in FIG. 15A, the multi-piece construction 546 includes at least a first frame piece 550 and a second frame piece 552. The first frame piece 550 includes a support grid 554 in covering relation to the upstream flow face 452 of the fibrous media 456. In certain examples, the support grid 554 is a porous, mesh screen 555 (FIG. 13) that permits gas flow, including gas entrained with liquid, to flow therethrough and across the coalescer media 456. The screen 555 also provides structural support to the fibrous media 456.

Similarly, the second frame piece 552 includes a support grid 556 supporting and in covering relation to the downstream flow face 454 of the fibrous media 456. The support grid 556 shown includes a porous, mesh screen 557 (FIG. 14) and provides structural support for the fibrous media 456 while permitting gas and coalesced liquid to pass therethrough and into the fluid passageway 516 of the flow construction arrangement 510.

In the arrangement shown, the first frame piece 550 and the second frame piece 552 are oriented adjacent to each other to form a retaining pocket 560 between the screen 555 and the screen 557 to form a housing 562 that holds or encapsulates the fibrous media 456. In some embodiments, the first frame piece 550 and the second frame piece 552 mechanically engage, for example, through interlock structure such as a snap engagement 564.

In some embodiments, the pre-formed insert 446 forming the frame construction 450 is molded or embedded within the polymeric end cap 444 along an inner annular region 566 of ring 568. Ring 568, in the embodiment depicted in FIGS. 12 and 15, is integral with and the same piece as the second frame piece 552. The ring 568 generally comprises a surrounding wall 570 in projection or extending from screen 555 to the first axial end 440 of the media 438. As can be seen in FIG. 15A, the wall 570 forms a rigid backstop to the compression of the end cap material in the sealing portion 480. That is, in preferred constructions, the radial seal 484 is formed by compression of the sealing portion 480 between and against the backstop 572 and the sealing portion 492 of the wall 488.

As also can be appreciated from reviewing FIGS. 12, 15 and 15A, some embodiments include the tube 512 of the flow construction arrangement 510 as an integral, unitary part of the second frame piece 552. As such, in the embodiment illustrated in FIGS. 12 and 15, the particular second frame piece 552 shown, extends from the end 440, which forms the backstop 472, along the length of the media 438, to the end 521 forming the exit aperture 520.

Still in reference to FIGS. 12 and 15, some frame constructions also include a support ring or frame 574. The support frame 574 helps to center the frame construction 450 and to hold the frame construction 450 evenly within the open filter interior 436. The support frame 574 can be a variety of arrangements and constructions that provide for structural rigidity between the tube 512 and an inner perimeter 576 of the media 438. In the particular one depicted in FIGS. 12, 14 and 15, the support frame 574 includes a ring construction 578. The ring construction 578 depicted mechanically engages the wall 514 adjacent to the end 521, such as by a snap engagement 582. The ring construction 578 depicted includes at least an inner ring 584, which engages the wall 514, and an outer ring 586, which may touch or be close to the inner perimeter 576 of the second stage tubular construction of filter media 418. The inner ring 584 and outer ring 586 define a plurality of gas flow apertures 588 therebetween, separated by a plurality of spokes or ribs 590. The ribs 590 provide for structural support and integrity of the ring construction 578. The gas flow apertures 588 allow for the passage of gas from the first stage coalescer filter 416 to the second stage filter media 418. That is, after the gas flow has passed through the first stage coalescer filter 416 and through the fluid passage 516, it flows through the fluid exit aperture 520, turns a corner (about 180°) around the end 521 of the wall 514 and flows through the plural apertures 588 into the gas flow plenum 522. From there, the gas flows through the tubular extension of media 434.

In certain embodiments, the filter element 420 will also include an outer support 592, such as a liner 594. In some arrangements, the support 592 will extend between the first and second end caps 444, 445, and help to hold or provide support to the media 438. In some embodiments, the liner 594 includes expanded metal. In certain arrangements, the liner 594, as well as the other parts of the element 420, will be non-metallic (at least 98% non-metallic, and preferably 100% non-metallic material). In some embodiments, instead of a liner 594, the media 438 will include a support band or roving. In still other arrangements, support to the media (inner and/or outer) can be avoided, if the media has sufficient structural integrity.

As mentioned above, preferred filter arrangements 400 include valve assembly 496. In the embodiment illustrated in FIG. 12, the valve assembly 496 provides both a regulator valve function and a bypass valve function. The regulator valve function is first described. The valve housing 424 includes an outer surrounding wall 601 defining an open interior 603, where the gas to be treated, which flows from the engine crank case through the inlet port 408, is allowed to flow and collect before passing into the filter element 420. In the illustrated valve assembly 496, there is a diaphragm 602 and a biasing mechanism, such as spring 605. In certain embodiments, the diaphragm 602 is generally circular that is held by and rests upon a shelf 608. The shelf 608 is supported between the lid 407 and valve housing 424. Note that in the embodiment illustrated, there is a gap 610 between the diaphragm 602 and the end portion 494 of the tube 486. The gap 610 allows for gas flow from the interior 603 of the valve housing 424 and into the gas flow aperture 490 of the tube 486. During operation, the spring 605 and the diaphragm 602 regulate flow into the tube 486.

The valve construction 496 also includes a bypass valve function. As the media in the filter element 420 becomes occluded and restriction increases to an unacceptably high level, pressures within the interior 603 of the valve housing 424 increase. This applies pressure against the diaphragm 602 and against the spring 604, until the gas is allowed to flow into an interior volume 612 defined by the lid 407. The gas then flows through the gas flow bypass outlet port 414 (FIG. 10).

Example Operation and Service

In operation, the depicted filter arrangement 400 works as follows. Blow-by gases from an engine crankcase are taken in through the gas flow inlet port 408. The gases pass into the interior 603 of the valve housing 424. The valve assembly 496 permits passage of the gas and into the gas flow aperture 490. From there, the gas passes through the first stage coalescer filter 416.

The gas flow passes through the upstream face 452, through the optional fibrous media 456, and out through the downstream face 454. The optional fibrous media 456 separates a portion of liquids from the rest of the gas stream. The collected liquids flow out of the media 456 and, in the depicted embodiment, either drips directly into the liquid flow outlet port 412, or drains along the wall 514 of the flow construction arrangement 510. After passing through the liquid flow outlet port 412, the liquid, which is often oil, may be directed back into the crankcase for reuse.

The gas stream including liquid particles not coalesced and drained by the optional first stage coalescer filter 416 flows through the fluid passage 516, through the exit aperture 520, around the end 521 of the wall 514 (making about a 180° turn)

and into the gas flow plenum 522. From the gas flow plenum 522, the gas flows through the filter media 418, which selectively removes by coalescing/drainage additional liquid particles and also selectively removes solid particles from the gas stream. The gas flow is prevented from bypassing the second stage media 418 due to the radial seal 484 and axial seals 530, 476. The cleaned gas then flows downstream from the second stage filter media 418 out through the gas flow outlet port 410. From there, the gases may be directed to the turbo of the engine.

The filter arrangement 400 is serviced as follows. The cover member 406 is removed from the body assembly 404 by disengaging the latches 433. When the cover member 406 is removed from the body assembly 404, the axial seal 530 is released. The filter element 420 is exposed, projecting out of the body 405. The filter element 420 can then be grasped and pulled from the body 405. This releases the radial seal 484. Removing the filter element 420, of course, removes both the option first stage coalescer filter 416 and the media construction 418. The entire filter element 420 may be disposed. In many embodiments, the filter element 420 is constructed of at least 99% non-metallic materials, such that the filter element 420 is incineratable.

A second, new filter element 420 may than be installed. The new filter element 420 is installed within the housing 402 by putting the element 420 through the opening exposed by the removed cover member 406. The aperture 468 of the end cap 444 is oriented around the inlet tube 486, and slid laterally relative to the body 405 until the radial seal 484 is in place. Often, this is also when the projection 474 axially abuts the body interior 405 and forms an axial seal 476.

The cover 406 is than oriented over the exposed end of the filter element 420. The latches 433 are engaged, to operably secure the cover member 406 to the body 405. This also axially compresses the cover 406 against the element 420, and the axial seal 530 is formed.

IV. The Embodiment of FIGS. 16-21

An alternative embodiment of a pre-formed insert is shown in FIGS. 16-20, generally at 650. The insert 650 is usable in the filter element 420 in place of the insert 446. The insert 650 lends itself to convenient manufacturing techniques.

The insert 650 shown includes a frame construction 652; a flow construction arrangement 654; and a support ring or frame 656. These parts function analogously to the frame construction 450, flow construction arrangement 510, and support frame 574 described in connection with FIG. 15.

The flow construction arrangement 654 includes a tube 660 formed by uninterrupted wall 662 surrounding and defining an open, fluid passage 664. The wall 662 includes a wall section 663 that is impervious. In the depicted embodiment, the entire wall 662 includes impervious wall section 663. In other embodiments, the wall 662 may include sections that are permeable to fluid. The wall 662 has an interior surface 666, which permits coalesced liquid to slide and drip to a liquid outlet port. The wall 662 defines an exit aperture 668, at an end 670 of the tube 660. In many applications, the exit aperture 668 allows both gas and liquid to exit therethrough. For example, in preferred applications, the exit aperture 668 allows the collected liquid to exit the tube 660 and flow into an appropriate liquid outlet port.

As with the embodiment of FIGS. 12 and 15, the wall 662, in some arrangements is a conical section 667, being sloped or tapered from inlet end 663 of the wall 662 to exit end 670. That is, in such embodiments, when the tube 660 has a circular cross-section, the diameter at the inlet end 663 is larger than the diameter at the outlet end 670. In some arrangements, the diameter at the inlet end 663 will be on the order of at least 0.5%, no greater than 25%, and typically 1-10% larger than the diameter at the end 670.

Figure 16:
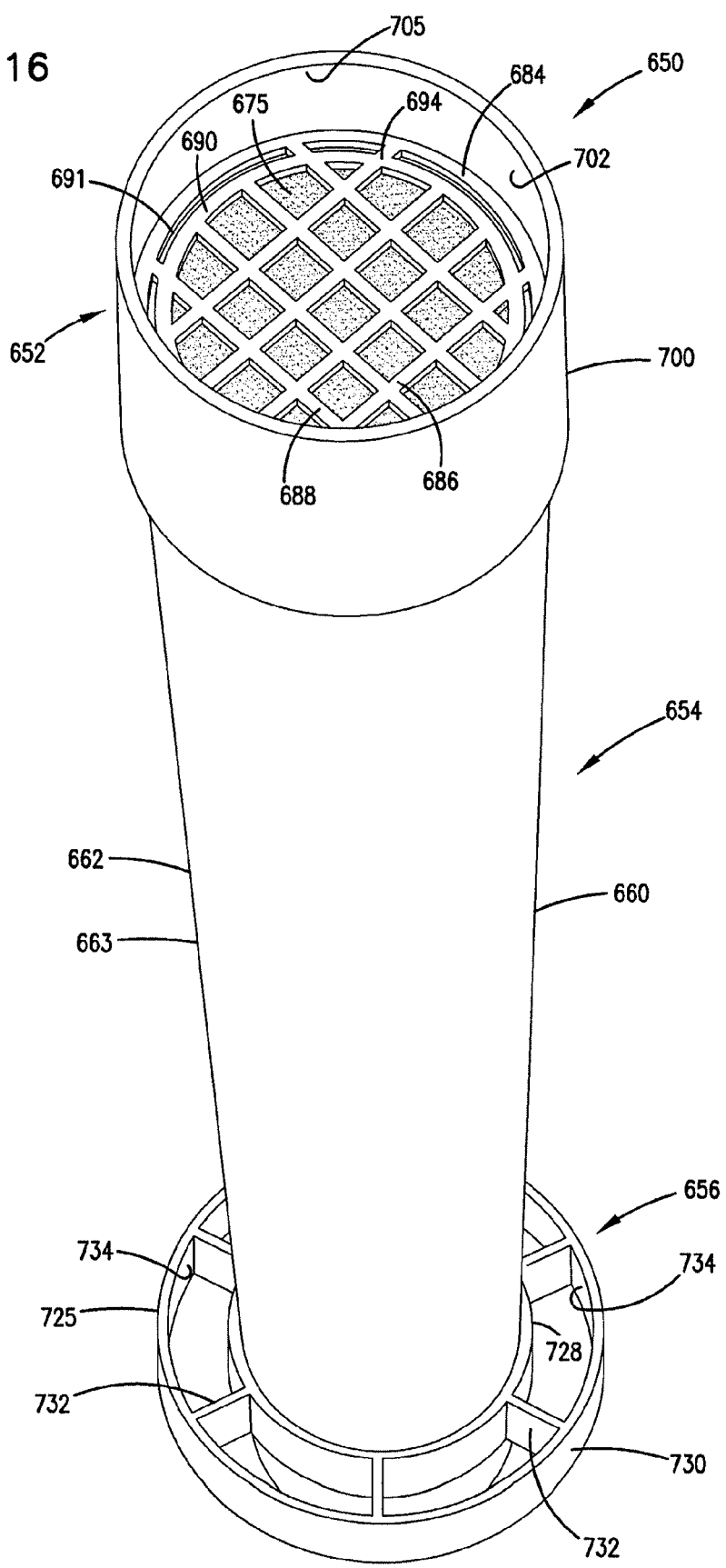
FIG. 16 is a schematic perspective view of an alternative embodiment of a pre-formed insert that may be utilized within the filter element depicted in FIGS. 13-15.
Figure 19:
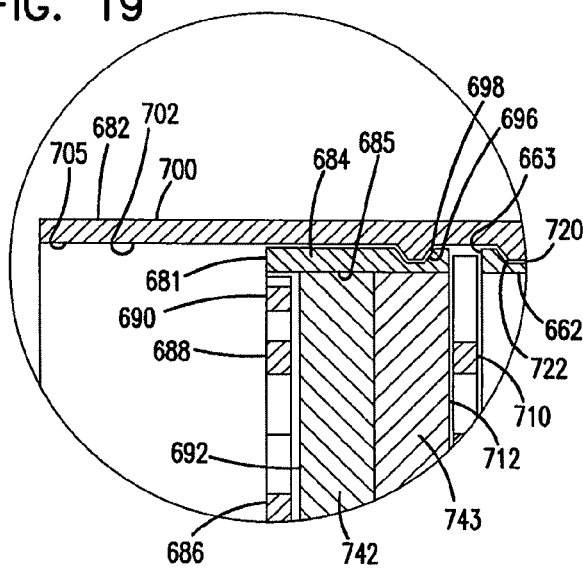
FIG. 19 is an enlarged, schematic cross-sectional view of a portion of the pre-formed insert shown in FIG. 18.
Figure 18:
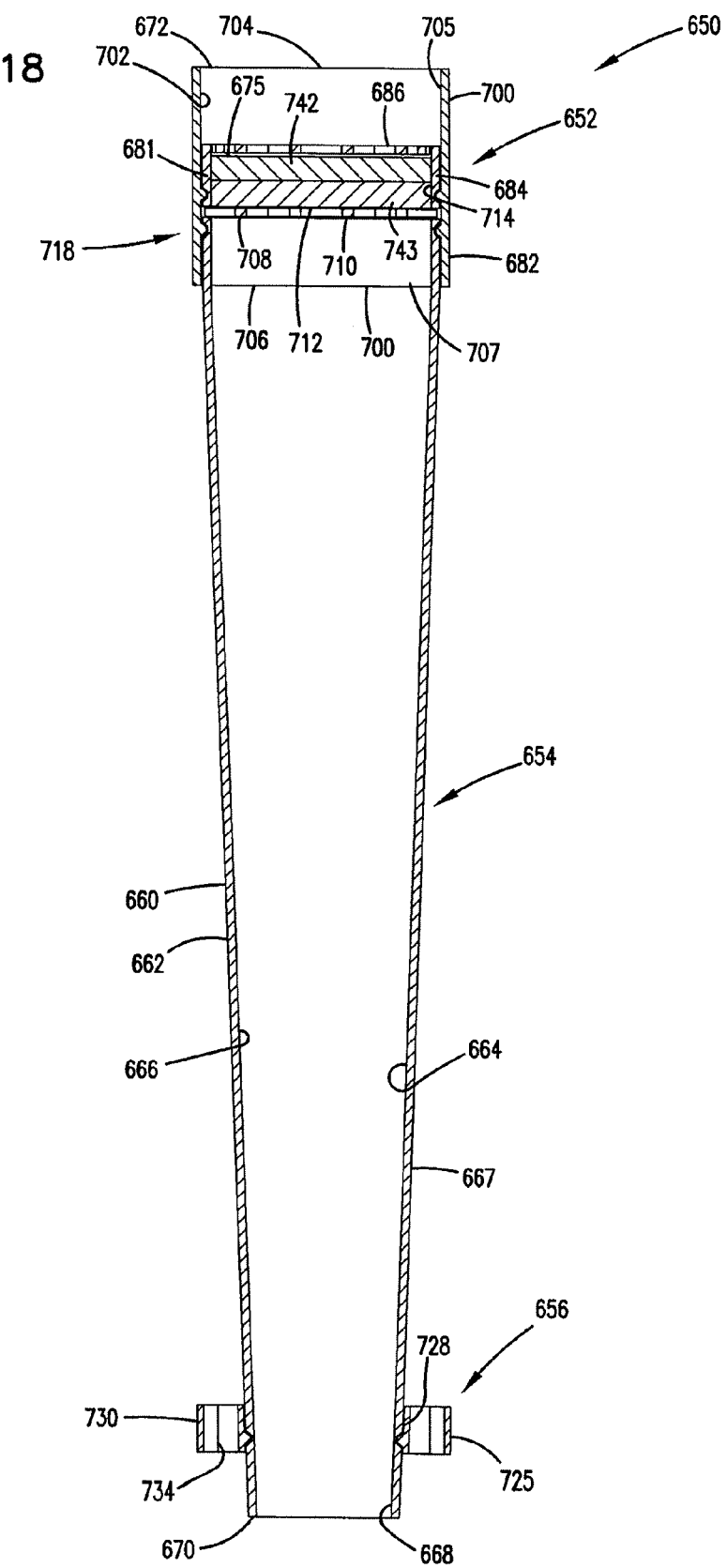
FIG. 18 is a schematic cross-sectional view of the pre-formed insert depicted in FIGS. 16 and 17, the cross section being taken along the line 18-18 of FIG. 17.

Still in reference to FIGS. 16 and 18, the frame construction 652 shown is provided for holding and encapsulating optional coalescing media 675. The frame construction 652 in this embodiment, is different from the frame construction 450 described above. In this particular embodiment, there is a first frame piece 681 and a second frame piece 682. The first frame piece has a wall or an outer annular rim 684 defining an inner volume 685 (FIG. 19). Axially spanning across one end of the rim 681 and integral with the wall 684 is a support grid 686, for example in the form of a porous, mesh screen 688. The screen 688 provides structural support to the optional media 675 and permits gas flow to reach the media 675.

Figure 17:
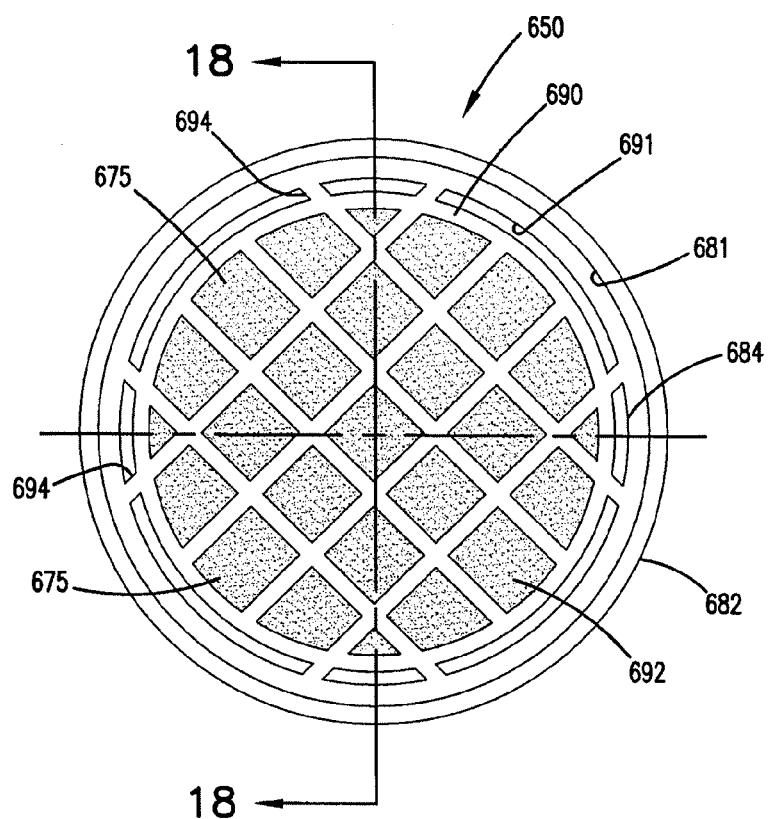
FIG. 17 is a schematic end view of the pre-formed insert depicted in FIG. 16.

The first frame piece 681 also includes an inner rim 690, spaced adjacent to the outer rim 684. The inner rim 690 helps to prevent the flow of polyurethane end cap material from blocking the upstream face 692 of the media 675. (Example molding techniques, and the function of the rim 690, are described further below.) As can be seen in FIGS. 16 and 17, the inner rim 690 is connected to the outer rim 684 with a plurality of ribs 694. The rim 690 is spaced, for example, no greater than 5 millimeters from the outer rim 684 to form end cap material (e.g. polyurethane) flow passages 691 therebetween.

The wall or rim 684 shown defines a recess 696 (FIG. 19) for engaging and receiving a mating detent 698. The detent 698 is part of the second frame piece 682, in the particular embodiment illustrated. The detent 698, recess 696 provides for convenient, quick assembly and permits the first and second frame pieces 681, 682 to be snapped together. Of course, many other embodiments of mechanical engagement between the first and second frame pieces 681, 682 are contemplated.

The second frame piece 682 includes an annular wall 700 surrounding and defining an open volume 702. In the particular embodiment illustrated, the wall 700 has a generally circular cross-section, which may be constant (to form a cylinder) or somewhat tapered to conform to the optional taper of the wall 662. The second frame piece wall 700 includes first and second opposite ends, 704, 706. In the embodiment illustrated, the end 704 generally corresponds to an inlet end 672.

Second frame piece 662 also includes a support grid 708 spanning the open volume 702 and integral with the wall 700. The grid 708 shown comprises a screen 710. The screen 710 provides structural support to the coalescing media 675 and engages and holds the downstream face 712 of the optional media 675.

The first and second frame pieces 681, 682 form an interior volume or retaining pocket 714 to hold, entrap, and encapsulate the optional coalescing media 675. When used, the media 675 is typically mechanically compressed within the pocket 714, such that the grid 686 engages the upstream face 692 and the grid 708 engages the downstream face 712. As described above, the wall 700 includes a plurality of projections or detents 678 extending or projecting internally into the volume 702 to engage or snap into the recess 696.

The second frame piece 682 also includes mechanical engagement structure to securably attach to the wall 662 of the tube 660. In particular, the second frame piece and the tube 660 also includes mechanical engagement structure, such as a detent/recess engagement 718. In the particular way shown in FIG. 19, the wall 700 includes a second plurality of projections 720 extending or projecting into the interior volume 702, while the wall 662 has a recess 722 sized to receive the detents or projections 720. In this manner, the second frame piece 682 easily snaps and interlocks with the tube 660.

Still in reference to FIGS. 16 and 18, such frame constructions 652 can also include support ring or frame 656. The support frame 656 is analogous to the support frame 574, described above. As such, the support frame 656 helps to center the frame construction 652 and hold it evenly within an open filter interior. The support frame 656, in the one depicted, includes a ring construction 725 having at least an inner ring (728) and an outer ring 730. The inner ring 728 and the outer ring 730 are shown joined by a plurality of spokes or ribs 732. Between the inner rings 728 and outer ring 730, the ring construction 725 defines a plurality of gas flow passageways 734.

Figure 20:
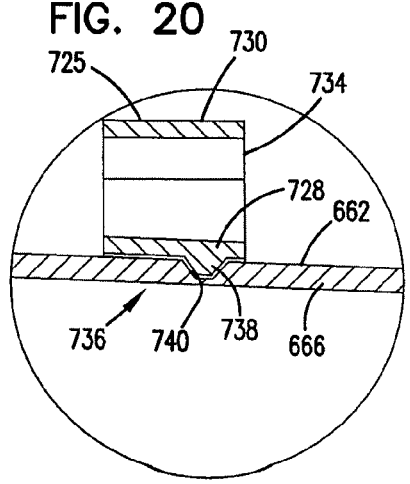
FIG. 20 is an enlarged, schematic, cross-sectional view of another portion of the pre-formed insert depicted in FIG. 18.

Attention is directed to FIG. 20. The ring construction 725 and the tube 660 are constructed and arranged to permit convenient manufacturing and assembly. In particular, the ring construction 725 and the tube 660 are configured to be secured together, such as by a mechanical engagement arrangement 736. The mechanical engagement arrangement 736 is analogous to those detent/recess arrangements described above. In particular, the inner ring 728 includes a plurality of projections or detents 738 extending radially internally of the ring 728. The wall 662 defines a recess 740 to accommodate the projections 738. In this manner, the support frame 656 can conveniently and mechanically engage or snap into place with structural integrity with the wall 662 of the tube 660.

The preformed insert 660 may be assembled as follows. The tube 660, the ring construction 725, and the first and second frame pieces 681, 682 are provided, for example through injection molding techniques. The optional media 675 is provided and includes more than one layer; as shown in FIG. 18, the media 675 is two layers 742, 743 of depth media.

The second frame piece 682 is oriented with respect to the tube 660, such that the opening 707 defined by the wall 700 at the second end 706 is placed over an open end 663 of (FIG. 19) of the wall 662 of the tube 660. The second frame piece 682 and the tube 660 are mechanically secured together through, for example, the mechanical engagement 718 of the projection 720 and recess 722. The two layers 742, 743 of media 675 are oriented over the screen 710 of the second frame piece 682. After the optional depth media 675 is placed within the volume or pocket 714, the first frame piece 681 is secured in position. In particular, the outer rim 684 is radially aligned with and inserted through the open end 705 defined by the wall 700 at the first end 704. The first frame piece 681 moves with respect to the second frame piece 682 along the interior of the wall 700, until the first and second frame pieces 681, 682 are secured together in mechanical engagement through the detent 698 and recess 696 arrangement.

It should be noted that the first and second frame pieces 681, 682 can be secured together with the optional fibrous bundle of media 675 trapped therebetween before the second frame piece 682 is secured to the tube 660.

The ring construction 725 is secured to the tube 660 by sliding the end 670 of the tube through the interior of the inner ring 728 and snapping the pieces together through the mechanical engagement arrangement 736. Of course, the ring 725 and the tube 660 may be secured together at any point during the assembly process.

In some arrangements, the assembled pre-formed insert 650 may then be secured to the remaining portions of the filter element 420 through, for example, molding techniques that are described further below.

Figure 21:
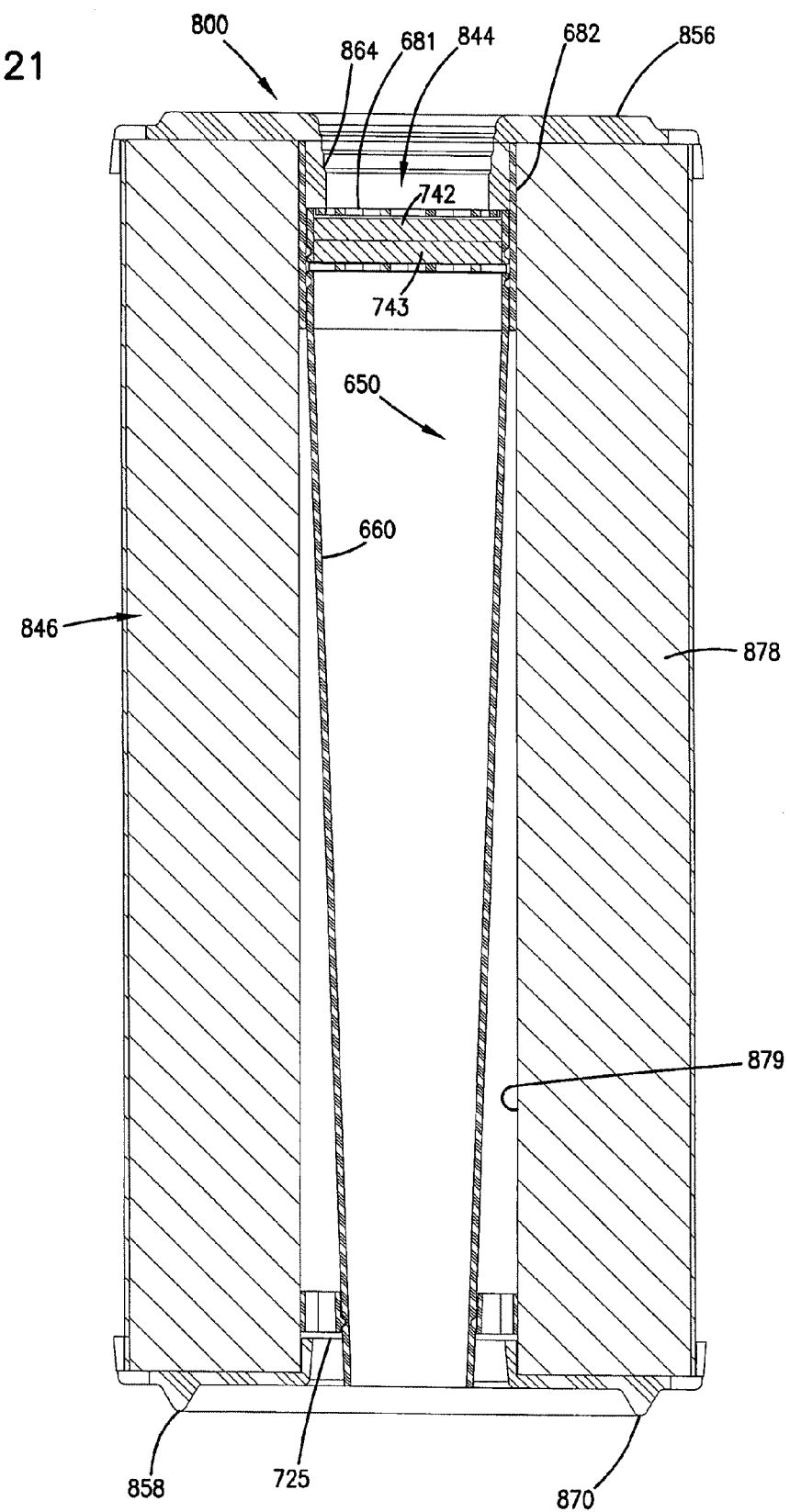
FIG. 21 is a schematic cross-sectional view of another embodiment of a filter element constructed according to principles of this disclosure, and utilizing the pre-formed insert of FIGS. 16-20.

In FIG. 21, a filter element 800 is shown in cross-section with the insert 650 installed therein. It should be understood that, other than the insert 650, the filter element 800 is constructed identically to the filter element 420. As such, the element 800 includes the optional first stage coalescer filter media 844, the filter media construction 846, a first end cap 856, and an opposite, second end cap 858. Because the element 800 includes the insert construction 650, it includes tube 660, media 675, first frame piece 681, second frame piece 682, ring construction 725, and two layers of depth media 742, 743, each as described above.

Also as described above with respect to the filter element 420, the end cap 856 includes an inner, annular sealing portion 864, which forms a seal, for example a radial seal with portions of an inlet tube. The end cap 858 is also configured analogously to the end cap 445 of FIG. 15, including a projection 870, which forms a seal, for example an axial seal with a service cover. The media construction 846 includes media 878 such as formed media or pleated media or other media extending between the end caps 856, 858. The media 878 defines an open tubular interior 879. The media 878 is preferably as characterized in Section VI.

V. Molding Techniques

Figure 22:
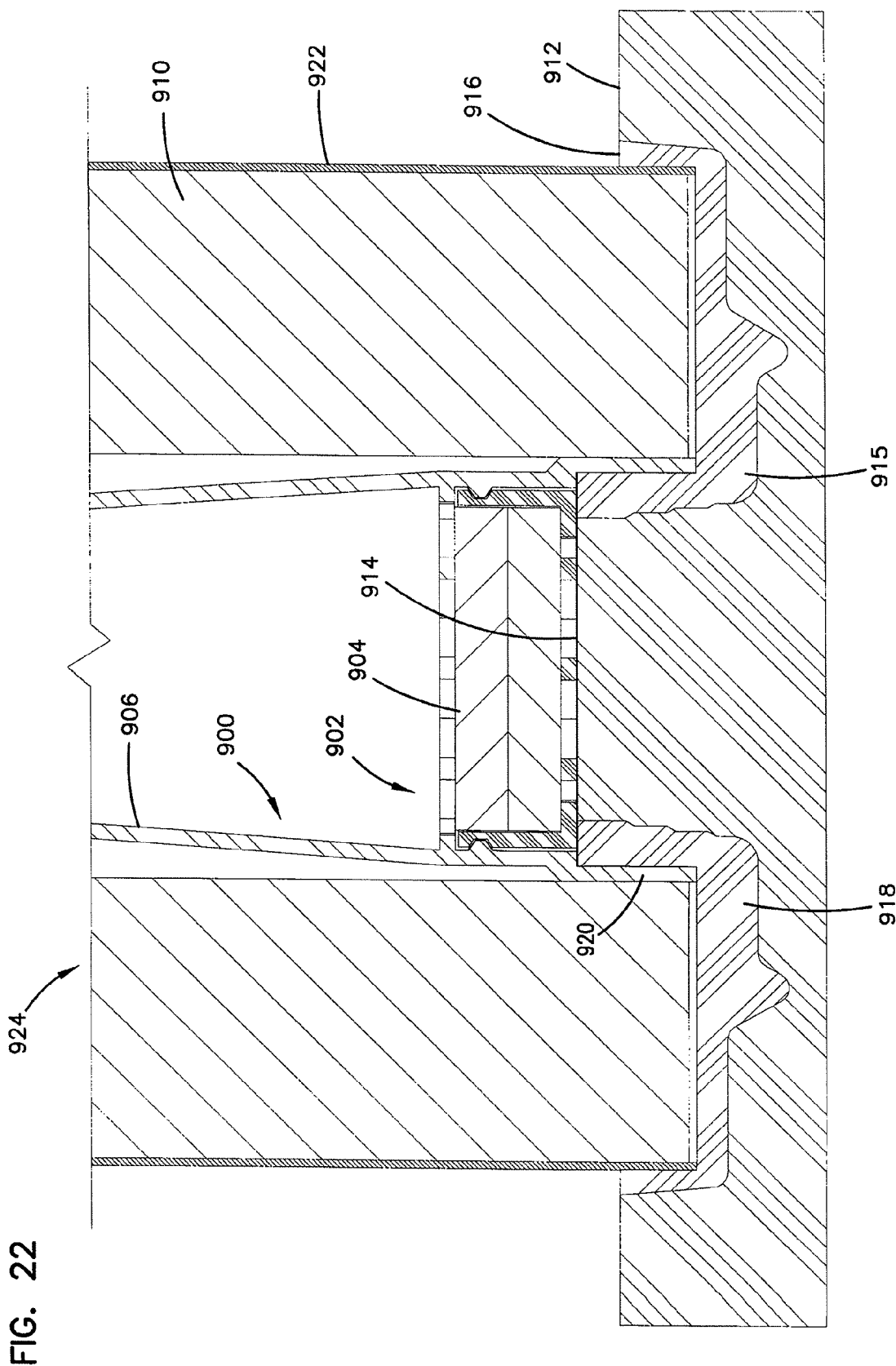
FIG. 22 is a schematic, cross-sectional view of one embodiment of a molding technique for constructing filter elements according to this disclosure.
Figure 23:
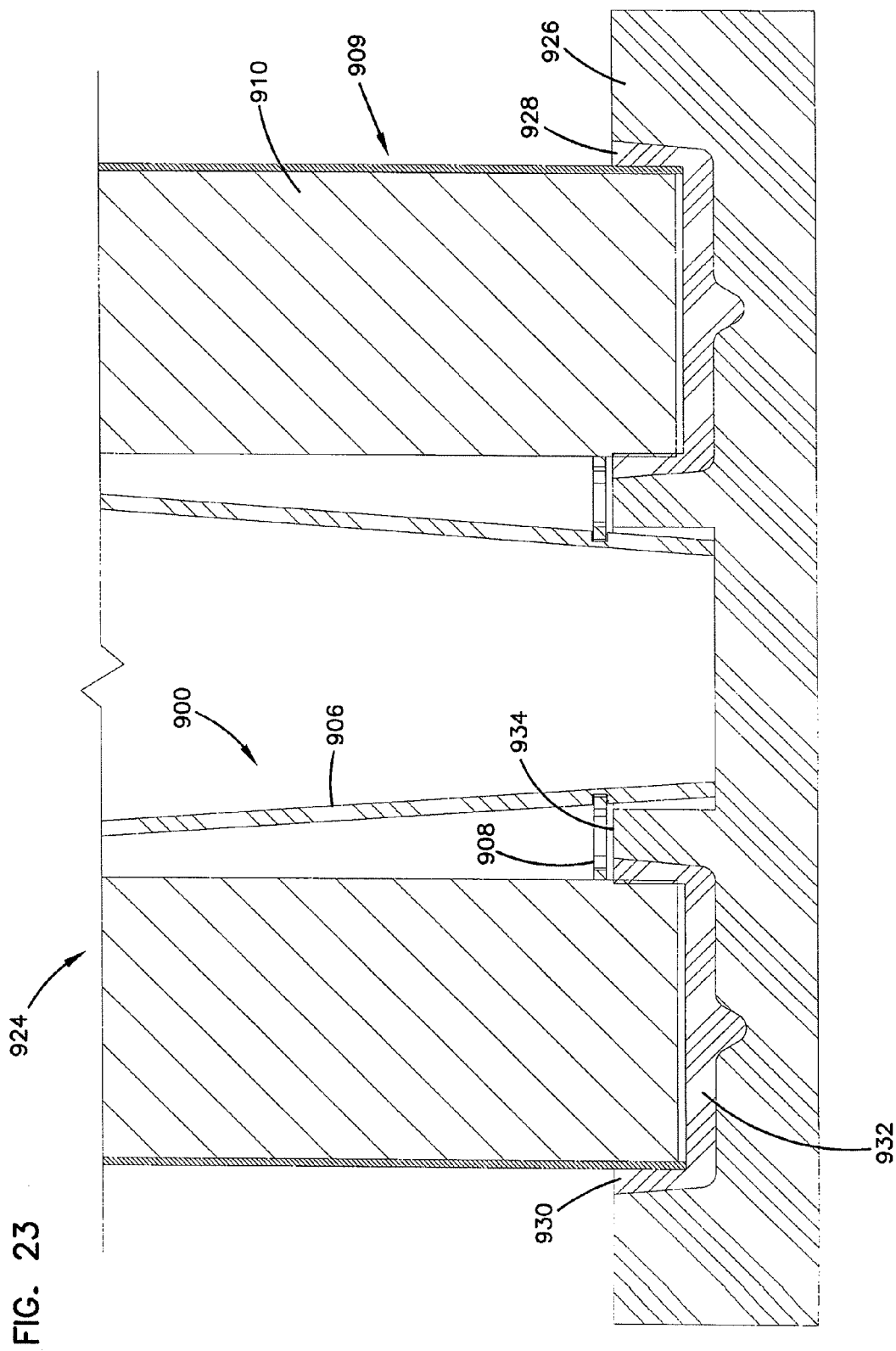
FIG. 23 is a schematic, cross-sectional view of one embodiment of a molding technique for constructing filter elements according to this disclosure.

Attention is now directed to FIGS. 22 and 23, which depict an example molding technique that is usable to manufacture filter elements described herein. In many arrangements, the insert construction (such as preformed insert 446 and preformed insert 650) when used is assembled in advance, according to techniques described above. The preformed insert depicted in FIGS. 22 and 23 is shown generally at 900. The preformed insert 900 includes a frame construction 902 for holding optional coalescer media 904. The preformed insert 900 also includes a tube or tapered wall 906 and a ring construction 908.

The media stage 909, such as media 910 is provided and formed in a tubular form, in this instance, around the preformed insert 900. The media 910 with the insert 900 is oriented over a mold 912. Note that the mold 912 includes a platform or mount 914. The frame construction 902 rests upon the mount 914. Molten material for forming the end cap, such as polyurethane foam, is poured into the mold 912 in the volume 916. The molten end cap material 915 is formed in the negative shape of the mold 912. The end cap material 915 rises as it cures and is allowed to penetrate the region 691 between, for example, the rim 690 and the outer rim 684 in the arrangement depicted in FIG. 17. This permits the end cap material 915 to secure the optional coalescer media 904 to the resulting end cap 918. The ends of the media 910 are also then secured to the resulting end cap 918 by being potted or molded into the end cap material 915. As can also be seen in FIG. 22, the backstop 920 of the frame construction 902 also becomes molded within the end cap 918. If desired, an outer liner 922 is placed around the outer perimeter of the second stage media and is molded with the end cap material 915.

After the end cap 918 is formed, the assembly 924 is inverted and placed into a mold 926. End cap material 928, such as polyurethane foam, rests in the volume 930. As the end cap material 928 cures, the ends of the media 910 are molded and fixed in place in the end cap material 928 to end up being potted within a resulting end cap 932. Note that the ring construction 908 is oriented in a position spaced from the mold 926 and with a mold plug 934 adjacent thereto, such that the ring construction 908 does not become blocked with end cap material 928.

VI. General Media Formulations and Formation

Preferred crankcase ventilation filters of the type characterized herein include at least one media stage comprising wet laid media. The wet laid media is formed in a sheet form using wet laid processing, and is then positioned on/in the filter cartridge. Typically the wet laid media sheet is at least used as a media stage stacked, wrapped or coiled, usually in multiple layers, for example in a tubular form, in a serviceable cartridge. In use, the serviceable cartridge would be positioned with the media stage oriented for convenient drainage vertically. For example, if the media is in a tubular form, the media would typically be oriented with a central longitudinal axis extending generally vertically.

As indicated, multiple layers, from multiple wrappings or coiling, can be used. A gradient can be provided in a media stage, by first applying one or more layers of wet laid media of first type and then applying one or more layers of a media (typically a wet laid media) of a different, second, type. Typically when a gradient is provided, the gradient involves use of two media types which are selected for differences in efficiency. This is discussed further below.

Herein, it is important to distinguish between the definition of the media sheet used to form the media stage, and the definitions of the overall media stage itself. Herein the term "wet laid sheet," "media sheet" or variants thereof, is used to refer to the sheet material that is used to form the media stage in a filter, as opposed to the overall definition of the total media stage in the filter. This will be apparent from certain of the following descriptions.

Secondly, it is important to understand that a media stage can be primarily for coalescing/drainage, for both coalescing/drainage and particulate filtration, or primarily for particulate filtration. Media stages of the type of primary concern herein, are at least used for coalescing/drainage, although they typically also have particulate removal function and may comprise a portion of an overall media stage that provides for both coalescing/drainage and desired efficiency of solid particulate removal.

In the example arrangement described above, an optional first stage and a second stage were described in the depicted arrangements. Wet laid media according to the present descriptions can be utilized in either stage. However typically the media would be utilized in a stage which forms, in the arrangements shown, the tubular media stages. In some instances when materials according to the present disclosure are used, the first stage of media, characterized as the optional first stage hereinabove in connection with the figures, can be avoided entirely, to advantage.

The media composition of the wet laid sheets used to form a stage in a CCV (crankcase ventilation) filter for coalescing/drainage is typically as follows:

1. It is provided in a form having a calculated pore size (X-Y direction) of at least 10 micron, usually at least 12 micron. The pore size is typically no greater than 60 micron, for example within the range of 12-50 micron, typically 15-45 micron.
2. It is formulated to have a DOP % efficiency (at 10.5 fpm for 0.3 micron particles), within the range of 3-18%, typically 5-15%.
3. It comprises at least 30% by weight, typically at least 40% by weight, often at least 45% by weight and usually within the range of 45-70% by weight, based on total weight of filter material within the sheet, bi-component fiber material in accord with the general description provided herein.
4. It comprises 30 to 70% (typically 30-55%), by weight, based on total weight of fiber material within the sheet, of secondary fiber material having average largest cross-sectional dimensions (average diameters is round) of at least 1 micron, for example within the range of 1 to 20 micron. In some instances it will be 8-15 micron. The average lengths are typically 1 to 20 mm, often 1-10 mm, as defined. This secondary fiber material can be a mix of fibers. Typically polyester and/or glass fibers are used, although alternatives are possible.
5. Typically and preferably the fiber sheet (and resulting media stage) includes no added binder other than the binder material contained within the bi-component fibers. If an added resin or binder is present, preferably it is present at no more than about 7% by weight of the total fiber weight, and more preferably no more than 3% by weight of the total fiber weight.
6. Typically and preferably the wet laid media is made to a basis weight of at least 20 lbs. per 3,000 square feet (9 kg/278.7 sq. m.), and typically not more than 120 lbs. per 3,000 square feet (54.5 kg/278.7 sq. m.). Usually it will be selected within the range of 40-100 lbs. per 3,000 sq. ft. (18 kg-45.4 kg/278.7 sq. m).
7. Typically and preferably the wet laid media is made to a Frazier permeability (feet per minute) of 40-500 feet per minute (12-153 meters/min.), typically 100 feet per minute (30 meters/min.). For the basis weights on the order of about 40 lbs/3,000 square feet-100 lbs./3,000 square feet (18-45.4 kg/278.7 sq. meters), typical permeabilities would be about 200-400 feet per minute (60-120 meters/min.).
8. The thickness of the wet laid media sheet(s) used to later form the described media stage in the crankcase ventilation filter at 0.125 psi (8.6 millibars) will typically be at least 0.01 inches (0.25 mm) often on the order of about 0.018 inch to 0.06 inch (0.45-1.53 mm); typically 0.018-0.03 inch (0.45-0.76 mm).

Media in accord with the general definitions provided herein, including a mix of bi-component fiber and other fiber, can be used as any media stage in a crankcase ventilation filter as generally described above in connection with the figures. Typically and preferably it will be utilized to form the tubular stage. When used in this manner, it will typically be wrapped around a center core of the filter structure, in multiple layers, for example often at least 20 layers, and typically 20-70 layers, although alternatives are possible. Typically the total depth of the wrapping will be about 0.25-2 inches (6-51 mm), usually 0.5-1.5 (12.7-38.1 mm) inches depending on the overall efficiency desired. The overall efficiency can be calculated based upon the number of layers and the efficiency of each layer. For example the efficiency at 10.5 feet per minute (3.2 m/min) for 0.3 micron DOP particles for media stage comprising two layers of wet laid media each having an efficiency of 12% would be 22.6%, i.e., 12%+0.12×88.

Typically enough media sheets would be used in the final media stage to provide the media stage with overall efficiency measured in this way of at least 85%, typically 90% or greater. In some instances it would be preferred to have the efficiency at 95% or more. In the context the term "final media stage" refers to a stage resulting from wraps or coils of the sheet(s) of wet laid media.

A. The Preferred Calculated Pore Size

Many types of crankcase ventilation filters of the type of general concern to the present disclosure, typically have a tubular (cylindrical or otherwise) media stage having a height within the range of 101 to 305 mm (4-12 inches).

This media performs two important functions:
1. It provides for some coalescing and drainage of oil particles carried in the crankcase ventilation gases being filtered; and 2. It provides for selected filtration of other particulates in the gas stream.

In general, if the pore size is too low:
a. Drainage of coalesced oil particles by gravity, downwardly through (and from) the media, can be difficult or slowed, which leads to an increase of re-entrainment of the oil into the gas stream; and
b. Unacceptable levels of restriction are provided to the crankcase gas flow through the media.

In general, if the porosity is too high:
a. Oil particles are less likely to collect and coalesce; and
b. A large number of layers, and thus media thickness, will be necessary to achieve an acceptable overall level of efficiency for the media pack.

It has been found that for crankcase ventilation filters, a calculated pore size within the range of 12 to 50 micron is generally useful. Typically the pore size is within the range of 15 to 45 micron. Often the portion of the media which first receives gas flow with entrained liquid for designs characterized in the drawings, the portion adjacent the inner surface of tubular media construction, through a depth of at least 0.25 inch (6.4 mm), has an average pore size of at least 20 microns. This is because in this region, a larger first percentage of the coalescing/drainage will occur. In outer layers, in which less coalescing drainage occur, a smaller pore size for more efficient filtering of solid particles, may be desirable in some instances.

The term X-Y pore size and variants thereof when used herein, is meant to refer to the theoretical distance between fibers in a filtration media. X-Y refers to the surface direction versus the Z direction which is the media thickness. The calculation assumes that all the fibers in the media are lined parallel to the surface of the media, equally spaced, and ordered as a square when viewed in cross-section perpendicular to the length of the fibers. The X-Y pore size is a distance between the fiber surface on the opposite corners of the square. If the media is composed of fibers of various diameters, the $d^2$ mean of the fiber is used as the diameter. The $d^2$ mean is the square root of the average of the diameters squared.

It has been found that it is useful to have calculated pore sizes on the higher end of the preferred range, typically 30 to 50 micron, when the media stage at issue has a total vertical height, in the crankcase ventilation filter of less than 7 inches (178 mm); and, pore sizes on the smaller end, about 15 to 30 micron, are sometimes useful when the filter cartridge has a height on the larger end, typically 7-12 inches (178-305 mm). A reason for this is that taller filter stages provide for a higher liquid head, during coalescing, which can force coalesced liquid flow, under gravity, downwardly through smaller pores, during drainage. The smaller pores, of course, allow for higher efficiency and fewer layers.

Of course in a typical operation in which the same media stage is being constructed for use in a variety of filter sizes, typically for at least a portion of the wet laid media used for the coalescing/drainage in initial separation, an average pore size of about 30-50 microns will be useful.

B. Solidity

Solidity is the volume fraction of media occupied by the fibers. It is the ratio of the fibers volume per unit mass divided by the media's volume per unit mass.

Typical wet laid materials preferred for use in media stages according to the present disclosure, especially as the tubular media stage in arrangements such as those described above in connection with the figures, have a percent solidity at 0.125 psi (8.6 millibars) of under 10%, and typically under 8%, for example 6-7%.

C. Thickness

The thickness of media utilized to make media packs according to the present disclosure, is typically measured using a dial comparator such as an Ames #3W (BCA Melrose MA) equipped with a round pressure foot, one square inch. A total of 2 ounces (56.7 g) of weight is applied across the pressure foot.

Typical wet laid media sheets useable to be wrapped or stacked to form media arrangements according to the present disclosure, have a thickness of at least 0.01 inches (0.25 mm) at 0.125 psi (8.6 millibars), up to about 0.06 inches (1.53 mm), again at 0.125 psi (8.6 millibars). Usually, the thickness will be 0.018-0.03 inch (0.44-0.76 mm) under similar conditions.

Compressibility is a comparison of two thickness measurements made using the dial comparator, with compressibility being the relative loss of thickness from a 2 ounce (56.7 g) to a 9 ounce (255.2 g) total weight (0.125 psi-0.563 psi or 8.6 millibars-38.8 millibars). Typical wet laid media (at about 40 lbs/3,000 square feet (18 kg/278.7 sq. m) basis weight) useable in wrappings according to the present disclosure, exhibit a compressibility (percent change from 0.125 psi to 0.563 psi or 8.6 millibars-38.8 millibars) of no greater than 20%, and typically 12-16%.

D. Preferred DOP Efficiency at 10.5 ft/Minute for 0.3 Micron Particles

The preferred efficiency stated, is desirable for layers or sheets of wet laid media to be used to generate crankcase ventilation filters. This requirement indicates that a number of layers of the wet laid media will typically be required, in order to generate an overall desirable efficiency for the media stage of typically at least 85% or often 90% or greater, in some instances 95% or greater.

The reason a relatively low efficiency is provided in any given layer, is that it facilitates coalescing and drainage and overall function.

In general, DOP efficiency is a fractional efficiency of a 0.3 micron DOP particle (dioctyl phthalate) challenging the media at 10 fpm. A TSI model 3160 Bench (TSI Incorporated, St. Paul, Minn.) can be used to evaluate this property. Model dispersed particles of DOP are sized and neutralized prior to challenging the media.

E. Physical Properties of the Wet Laid Media

Typical wet laid air filtration media accomplishes strength through utilization of added binders. However this comprises the efficiency and permeability, and increases solidity. Thus, as indicated above, the wet laid media sheets and stages according to preferred definitions herein typically include no added binders, or if binder is present it is at a level of no greater than 7% of total fiber weight, typically no greater than 3% of total fiber weight.

Four strength properties generally define media gradings: stiffness, tensile, resistance to compression and tensile after fold. In general, utilization of bi-component fibers and avoidance of polymeric binders leads to a lower stiffness with a given or similar resistance to compression and also to good tensile and tensile after fold. Tensile strength after folding is important, for media handling and preparation of filter cartridges of the type used in many crankcase ventilation filters.

Machine direction tensile is the breaking strength of a thin strip of media evaluated in the machine direction (MD). Reference is to Tappi 494. Machine direction tensile after fold is conducted after folding a sample 180° relative to the machine direction. Tensile is a function of test conditions as follows: sample width, 1 inch (25.4 mm); sample length, 4 inch gap (101.6 mm); fold—1 inch (25.4 mm) wide sample 180° over a 0.125 inch (3.2 mm) diameter rod, remove the rod and place a 10 lb. weight (4.54 kg) on the sample for 5 minutes. Evaluate tensile; pull rate—2 inches/minute (50.8 mm/minute).

F. The Media Composition

1. The Bi-Component Fiber Constituent.

As indicated above, it is preferred that the fiber composition of the media include 30 to 70%, by weight, of bi-component fiber material. A major advantage of using bi-component fibers in the media, is effective utilization of fiber size while maintaining a relatively low solidity. With the bi-component fibers, this can be achieved while still accomplishing a sufficiently high strength media for handling installation in crankcase ventilation filters.

The bi-component fibers generally comprise two polymeric components formed together, as the fiber. Various combinations of polymers for the bi-component fiber may be useful, but it is important that the first polymer component melt at a temperature lower than the melting temperature of the second polymer component and typically below 205° C. Further, the bi-component fibers are integrally mixed and evenly dispersed with the other fibers, in forming the wet laid media. Melting of the first polymer component of the bi-component fiber is necessary to allow the bi-component fibers to form a tacky skeletal structure, which upon cooling, captures and binds many of the other fibers, as well as other bi-component fibers.

Although alternatives are possible, typically the bi-component fibers will be formed in a sheath core form, with a sheath comprising the lower melting point polymer and the core forming the higher melting point.

In the sheath-core structure, the low melting point (e.g., about 80 to 205° C.) thermoplastic is typically extruded around a fiber of the higher melting point material (e.g., about 120 to 260° C.). In use, the bi-component fibers typically have a average largest cross-sectional dimension (average fiber diameter if round) of about 5 to 50 micrometer often about 10 to 20 micrometer and typically in a fiber form generally have an average length of at least 1 mm, and not greater than 30 mm, usually no more than 20 mm, typically 1-10 mm. By "largest" in this context, reference is meant to the thickest cross-section dimension of the fibers.

Such fibers can be made from a variety of thermoplastic materials including polyolefins (such as polyethylenes, polypropylenes), polyesters (such as polyethylene terephthalate, polybutylene terephthalate, PCT), nylons including nylon 6, nylon 6, 6, nylon 6, 12, etc. Any thermoplastic that can have an appropriate melting point can be used in the low melting component of the bi-component fiber while higher melting polymers can be used in the higher melting "core" portion of the fiber. The cross-sectional structure of such fibers can be a "side-by-side" or "sheath-core" structure or other structures that provide the same thermal bonding function. One could also use lobed fibers where the tips have lower melting point polymer. The value of the bi-component fiber is that the relatively low molecular weight resin can melt under sheet, media, or filter forming conditions to act to bind the bi-component fiber, and other fibers present in the sheet, media, or filter making material into a mechanically stable sheet, media, or filter.

Typically, the polymers of the bi-component (core/shell or sheath and side-by-side) fibers are made up of different thermoplastic materials, such as for example, polyolefin/polyester (sheath/core) bi-component fibers whereby the polyolefin, e.g. polyethylene sheath, melts at a temperature lower than the core, e.g. polyester. Typical thermoplastic polymers include polyolefins, e.g. polyethylene, polypropylene, polybutylene, and copolymers thereof, polytetrafluoroethylene, polyesters, e.g. polyethylene terephthalate, polyvinyl acetate, polyvinyl chloride acetate, polyvinyl butyral, acrylic resins, e.g. polyacrylate, and polymethylacrylate, polymethylmethacrylate, polyamides, namely nylon, polyvinyl chloride, polyvinylidene chloride, polystyrene, polyvinyl alcohol, polyurethanes, cellulosic resins, namely cellulosic nitrate, cellulosic acetate, cellulosic acetate butyrate, ethyl cellulose, etc., copolymers of any of the above materials, e.g. ethylene-vinyl acetate copolymers, ethylene-acrylic acid copolymers, styrene-butadiene block copolymers, Kraton rubbers and the like. Particularly preferred in the present invention is a bi-component fiber known as 271P available from DuPont. Others fibers include FIT 201, Kuraray N720 and the Nichimen 4080 and similar materials. All of these demonstrate the characteristics of cross-linking the sheath polymer upon completion of first melt. This is important for liquid applications where the application temperature is typically above the sheath melt temperature. If the sheath does not fully crystallize then the sheath polymer will remelt in application and coat or damage downstream equipment and components.

An example of a useable bi-component fiber for forming wet laid media sheets for use in CCV media is Dupont polyester bi-component 271P, typically cut to a length of about 6 mm.

2. The Secondary Fiber Materials.

The bi-component fibers provide a matrix for the crankcase ventilation filter media. The additional fibers or secondary fibers, sufficiently fill the matrix to provide the desirable properties for coalescing and efficiency.

The secondary fibers can be polymeric fibers, glass fibers, metal fibers, ceramic fibers or a mixture of any of these. Typically glass fibers, polymeric fibers or a mixture are used.

Glass fibers useable in filter media of the present invention include glass types known by the designations: A, C, D, E, Zero Boron E, ECR, AR, R, S, S-2, N, and the like, and generally, any glass that can be made into fibers either by drawing processes used for making reinforcement fibers or spinning processes used for making thermal insulation fibers.

Non-woven media of the invention can contain secondary fibers made from a number of both hydrophilic, hydrophobic, oleophilic, and oleophobic fibers. These fibers cooperate with the glass fiber and the bi-component fiber to form a mechanically stable, but strong, permeable filtration media that can withstand the mechanical stress of the passage of fluid materials and can maintain the loading of particulate during use. Secondary fibers are typically monocomponent fibers with average largest cross-sectional dimension (diameters if round) that can range from about 0.1 on up, typically 1 micron or greater, often 8-15 microns and can be made from a variety of materials including naturally occurring cotton, linen, wool, various cellulosic and proteinaceous natural fibers, synthetic fibers including rayon, acrylic, aramide, nylon, polyolefin, polyester fibers. One type of secondary fiber is a binder fiber that cooperates with other components to bind the materials into a sheet. Another type of secondary fiber is a structural fiber that cooperates with other components to increase the tensile and burst strength the materials in dry and wet conditions. Additionally, the binder fiber can include fibers made from such polymers as polyvinyl chloride, polyvinyl alcohol. Secondary fibers can also include inorganic fibers such as carbon/graphite fiber, metal fiber, ceramic fiber and combinations thereof.

The secondary thermoplastic fibers include, but are not limited to, polyester fibers, polyamide fibers, polypropylene fibers, copolyetherester fibers, polyethylene terephthalate fibers, polybutylene terephthalate fibers, polyetherketoneketone (PEKK) fibers, polyetheretherketone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46) including cellulosic fibers, polyvinyl acetate, polyvinyl alcohol fibers (including various hydrolysis of polyvinyl alcohol such as 88% hydrolyzed, 95% hydrolyzed, 98% hydrolyzed and 99.5% hydrolyzed polymers), cotton, viscose rayon, thermoplastic such as polyester, polypropylene, polyethylene, etc., polyvinyl acetate, polylactic acid, and other common fiber types.

Mixtures of the fibers can be used, to obtain certain desired efficiencies and other parameters.

The sheet media of the invention are typically made using papermaking processes. Such wet laid processes are particularly useful and many of the fiber components are designed for aqueous dispersion processing. However, the media of the invention can be made by air laid processes that use similar components adapted for air laid processing. The machines used in wet laid sheet making include hand laid sheet equipment, Fourdrinier papermaking machines, cylindrical papermaking machines, inclined papermaking machines, combination papermaking machines and other machines that can take a properly mixed paper, form a layer or layers of the furnish components, remove the fluid aqueous components to form a wet sheet. A fiber slurry containing the materials are typically mixed to form a relatively uniform fiber slurry. The fiber slurry is then subjected to a wet laid papermaking process. Once the slurry is formed into a wet laid sheet, the wet laid sheet can then be dried, cured or otherwise processed to form a dry permeable, but real sheet, media, or filter. For a commercial scale process, the bi-component mats of the invention are generally processed through the use of papermaking-type machines such as commercially available Fourdrinier, wire cylinder, Stevens Former, Roto Former, Inver Former, Venti Former, and inclined Delta Former machines. Preferably, an inclined Delta Former machine is utilized. A bi-component mat of the invention can be prepared by forming pulp and glass fiber slurries and combining the slurries in mixing tanks, for example. The amount of water used in the process may vary depending upon the size of the equipment used. The furnish may be passed into a conventional head box where it is dewatered and deposited onto a moving wire screen where it is dewatered by suction or vacuum to form a non-woven bi-component web.

The binder in the bi-component fibers is activated by passing the matt through a heating step. The resulting material can then be collected in a large roll if desired.

3. Surface Treatments of the Fibers.

Modification of the surface characters of the fibers, increase in the contact angle, can enhance drainage capability of filtration media and thus the formed elements of the filter (with respect to pressure drop and mass efficiency). A method of modifying the surface of the fibers is to apply a surface treatment such as a flouro chemical or silicone containing material, typically up to 5% by weight of the media.

The surface treatment agent can be applied during manufacture of the fibers, during manufacture of the media or after manufacture of the media post-treatment, or after provision of the media pack. Numerous treatment materials are available such as flourochemicals or silicone containing chemicals that increase contact angle. An example is the DuPont Zonyl™ flourochemicals, such as #8195.

In the following section, examples of materials are used.

4. Example Materials.

(a) Example A.

Example A is a sheet material useable for example, as a media phase in a crankcase ventilation filter, in which the media phase is required to provide for both good coalescing/drainage and also which can be used in layers to provide useable efficiencies of overall filtration. The material will drain well and effectively, for example when used as a tubular media construction having a height of 4 inches-12 inches (100-300.5 mm). The media can be provided in multiple wrappings, to generate such a media pack.

Media example A comprises a wet laid sheet made from a fiber mix as follows: 50% by wt. DuPont polyester bi-component 271P cut to 6 mm length; 40% by wt. DuPont polyester 205 WSD, cut to 6 mm length; and 10% by wt. Owens Corning DS-9501-11W Advantex glass fibers, cut to 6 mm.

The DuPont 271P bi-component fiber is an average fiber diameter of about 13 microns. The DuPont polyester 205 WSD fiber has an average fiber diameter of about 12.4 microns. The Owens Corning DS-9501-11W has an average fiber diameter of about 11 microns.

The example A material was made to a basis weight of about 40.4 lbs./3,000 sq. ft. The material had a thickness at 0.125 psi, of 0.027 inches and at 0.563 psi of 0.023 inches. Thus, the total percent change (compressibility) from 0.125 to 0.563 psi, was only 14%. At 1.5 psi, the thickness of the material was 0.021 inches.

The solidity of the material at 0.125 psi was 6.7%. The permeability (frazier) was 392 feet per minute.

The MD fold tensile was 2.6 lbs./inch width. The calculated pore size, X-Y direction, was 43 microns. The DOP efficiency of 10.5 feet per minute per 0.43 micron particles, was 6%.

(b) Example B.

Example B was made from a fiber mixture comprising 50% by weight DuPont polyester bi-component 271P cut to 6 mm length; and 50% by weight Lausch B 50R microfiber glass. The microfiber glass had lengths on the order of about 3-6 mm. Again, the DuPont polyester bi-component 271P had an average diameter of 13 microns. The Lausch B 50R had an average diameter of 1.6 microns and a $d^2$ mean of 2.6 microns.

The sample was made to a basis weight of 38.3 lbs./3,000 square feet. The thickness of the media at 0.125 psi, 0.020 inches and at 0.563 psi was 0.017 inches. Thus the percent changed from 0.125 psi to 0.563 psi was 15%, i.e., 15% compressibility. At 1.5 psi, the sample had a thickness of 0.016 inches.

The solidity of the material measured at 0.125 psi was 6.9%. The permeability of the material was about 204 feet/minute. The machine direction fold tensile was measured at 3.9 lbs/inch width.

The calculated pore size X-Y direction was 18 microns. The DOP efficiency at 10.5 ft/minute for 0.3 micron particles, was 12%.

The Exhibit B material would be effective when used as a layer or a plurality of layers to polish filtering. Because of its higher efficiency, it can be used alone or in multiple layers to generate high efficiency in the media.

This material would be border line as a coalescer/drain material, however, due to the relatively small pore size.

The Exhibit B material, then, could be used to form a downstream portion of the media pack that included a media having a higher pore size upstream, to form a stage for coalescing/drainage.

In a tubular construction, for example, Exhibit A material could be used to form an inside of the tube, with Exhibit B material used to form an outside of the tube, the two together comprising a filtered media stage in a crankcase ventilation filter of desirable drain properties and overall efficiency of filtering.

G. Crankcase Ventilation Filter Constructions Utilizing the Preferred Media

The preferred wet laid media as characterized above in Section VI, and including in Sections VI. A-F, can be utilized in a variety of manners in crankcase ventilation filter arrangements. In the arrangements described in the figures, they can be used for the tubular stage, for example. Such media can also be used in the optional first stage, if desired.

Typically a tubular stage will be made using 20-70 wraps of coiled wet laid media in accord with descriptions above. Of course alternatives are possible.

Because of the good drain characteristics, in some instances it will be possible to avoid the first stage, characterized herein as optional, when the tubular media stage comprises a media of the type characterized herein. The reason is that such media can provide for initially efficient and effective coalescing and drainage, to be useable both as part of the particulate filter stage and as the coalescing/drain stage.

As a result, the media characterized herein can offer a variety of alternate configurations for crankcase ventilation filters. An example would be one in which the media is arranged in a tubular form, for flow therethrough a crankcase ventilation gases. In others the media could be configured in panel arrangements or other arrangements.

In more general terms, a filtration system which manages both coalescing/drainage of our entrained liquid particulates, and also filtration of particles, should be designed to drain the collected liquids rapidly, otherwise functional life of the filter media would be uneconomically short. The media is positioned so the liquid can drain from the media rapidly. Some key performance properties are: initial and equilibrium fractional efficiency, pressure drop and drainage ability. Some key physical properties of the media are thickness, solidity and strength.

Generally the media for coalescing/drainage is aligned in a manner that enhances the filters capability to drain. For tubular constructions, this would be a media position with the central axis of the tube extending vertically. In this orientation, any given media composition will exhibit an equilibrium load height which is a function of the X-Y pore size, fiber orientation and the interaction of the liquid with the fiber surface, measured as contact angle. Collection of liquid in the media will increase in height to a point balanced with the drainage rate of the liquid from the media. Of course any portion of the media that is plugged with draining liquid would not be available for filtration. Thus such portions of the media would increase pressure drop and decrease efficiency across the filter. As a result it is advantageous to control the portion of the element that remains with porous plugged by liquid phase. Alternately stated is it is advantageous to increase drainage rate.

The media factors effecting drainage rate are X-Y pore size, fiber orientation and interaction of the liquid being drained with the fiber surface. Reducing these to accomplish a desirable liquid flow is in part the issue. The X-Y pore size being increased, facilitates drainage as explained above. However this reduces the number of fibers for filtration, thus the overall efficiency of the filter. To achieve target efficiency, relatively thick media pack structure would be made, by using multiple layers of material having a desirable X-Y pore size. Also, the fibers would preferably be oriented with a vertical direction of the media if possible, but this approach is generally difficult to maximize. Typically the media, if provided in a tubular form, would be oriented with the X-Y plane from the wet laid manufacturing process, defining the surface of the tube and with the Z direction being the thickness.

The interaction of the liquid being drained with the surface of the fibers was discussed above. To enhance this, treatment supplied to the fiber surfaces can be used. Treatments discussed above are flourochemicals or silicone containing treatments. If a higher efficiency is desired than would be obtained with a media that is constructed for good drainage, then at an upstream end of the media a more efficient media stage can be provided, typically as part of the same media pack. This is discussed above, in the example providing Example A material as the earlier stage of the media pack in which most coalescing/drainage occurs, and the later material of Exhibit B to provide for a higher efficiency polish.

H. Some General Observations

In general, the present disclosure relates to utilization of a media of the type characterized, within a coalescer/drain stage of a crankcase ventilation system; i.e., as a media stage in a crankcase ventilation filter. The ventilation filter can have one media stage therein.

In some of the arrangements described, with respect to the drawings, the arrangements shown include an optional first stage and a tubular second stage. The formed media can be used in either or both.

It is noted that because the first stage is characterized as optional, it will be understood that some crankcase ventilation filters can be made which include only a media stage comprising a formed media as characterized herein. An example is shown in FIG. 24.

Figure 24:
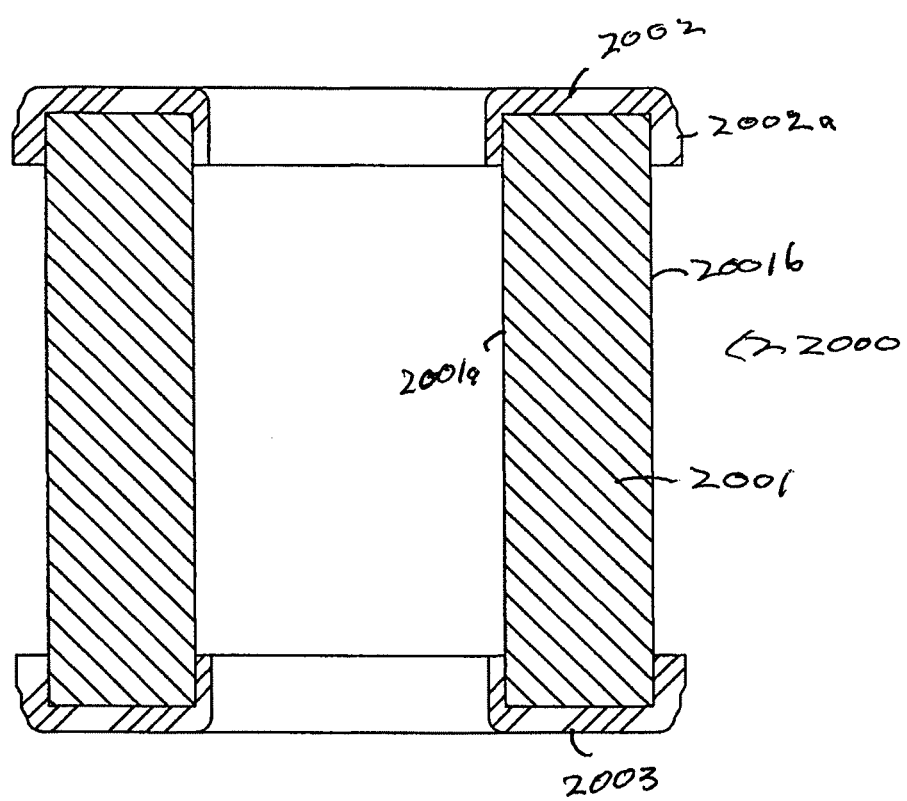
FIG. 24 is a schematic, cross-sectional view, of an additional embodiment of a crankcase ventilation filter including a media stage according to the present disclosure therein.

The reference numeral 2000, FIG. 24, generally indicates a crankcase ventilation cartridge including media 2001 as characterized herein. The media 2001 is positioned in extension between opposite end caps 2002 and 2003. The cartridge 2000 will be provided with an appropriate seal arrangement for a housing, as needed. The particular seal arrangement for cartridge 2000, is an outside radial seal on each of the end caps 2002 and 2003, for example as shown in 2000a, for end cap 2002. Alternative seals are possible including (for example): inside radial seals at each end cap; axial seal arrangement; combination of axial seal arrangements; and, housing seal arrangements which involve only one of the end caps, either axially or radially.

The media 2001 is shown schematically, and will comprise multiple wraps of wet laid media in accord with the description herein. It could include additional stages as well. Media stage 2001 is shown in a tubular form.

Cartridge 2000 could be configured for either in-to-out flow or out-to-in flow. When configured for in-to-out flow, as will be typical for an arrangement as described in the other figures, the upstream edge of the media 2001 would be at 2001a and the downstream edge at 2001b.

What is claimed is:

1. A crankcase ventilation filter including:
   (a) a first, wet laid, media stage comprising:
      (i) at least 30% by weight, based on total weight of fiber material in the stage, bi-component fiber material having an average largest fiber cross-sectional dimension of at least 10 microns and average length of 1-20 mm, inclusive; and
      (ii) at least 30% by weight, based on total weight of fiber material in the stage, secondary fiber material intermixed with the bi-component fiber material, the secondary fiber material having an average largest fiber cross-sectional dimension of at least 1 micron and average length of 1 to 20 mm, inclusive; and
   (b) the first, wet laid, media stage having:
      (i) an added binder resin content, if any, of no greater than 7% by total weight of fiber material.

2. A crankcase ventilation filter according to claim 1 wherein:
   (a) the wet laid media stage comprises a tubular media construction having a plurality of layers of wet laid fiber sheet and an overall media thickness of at least 6 mm.

3. A crankcase ventilation filter according to claim 2 wherein:
   (a) the tubular media construction is positioned in extension between first and second end caps.

4. A crankcase ventilation filter according to claim 1 wherein:
   (a) the first wet laid media stage has a fiber treatment therein selected from the group consisting essentially of silicone and fluorochemical fiber treatment materials.

5. A crankcase ventilation filter according to claim 1 wherein:
   (a) the first wet laid media stage comprises 45 to 70%, by weight, of the bi-component fiber material;
   (b) 30 to 55%, by weight, of the secondary fiber material; and,
   (c) no more than 3%, by weight of total fiber content, added binder resin, if any.

6. A crankcase ventilation filter according to claim 1 wherein:
   (a) a second media stage on a downstream side of the first, wet laid, media stage;
      (i) the second media stage having a different total efficiency than the first, wet laid, media stage.

7. A crankcase ventilation arrangement according to claim 6 wherein:
   (a) the first wet laid media stage comprises a tubular media construction having a plurality of layers of wet laid fiber sheet and an overall media thickness of at least 12 mm.; and,
   (b) the second media stage is wrapped around the first, wet laid, media stage.

8. A crankcase ventilation arrangement according to claim 7 wherein:
   (a) the second media stage is a second, wet laid, media stage comprising:
      (i) at least 30% by weight, based on total fiber weight in the stage bi-component fiber material having an average largest fiber cross-sectional dimension of at least 10 microns and an average length of 1-20 mm, inclusive;
      (ii) at least 30% by weight secondary fiber material having an average largest fiber cross-sectional dimension of at least 1 micron and average length of 1 to 20 mm, inclusive;
      (iii) calculated pore size, X-Y direction, of 12 to 50 microns, inclusive; and,
      (iv) an added binder resin content of no greater than 7% by total weight of fiber material.

9. A crankcase ventilation filter according to claim 1 wherein:
   (a) the first, wet laid, media stage comprises 20 to 70 wraps of coiled wet laid media.

10. A crankcase ventilation filter according to claim 1 wherein:
    (a) the bi-component fiber material has an average length of 1 to 10 mm;
    (b) the bi-component fiber material comprises polyester bi-component fiber material; and,
    (c) the secondary fiber material comprises fibers selected from glass fibers, polyester fibers, metal fibers and mixtures of two or more of glass fibers, polyester fibers and metal fibers.

11. A crankcase ventilation filter according to claim 10 wherein:
    (a) the secondary fiber material is polyester fibers.

12. A crankcase ventilation filtration assembly comprising:
    (a) a housing including a gas flow inlet arrangement, a gas flow outlet arrangement and a liquid drain outlet arrangement; and,
    (b) a serviceable crankcase ventilation filter operably positioned within the housing and comprising:
       (i) a first, wet laid, media stage comprising:
          (A) at least 30% by weight bi-component fiber material having an average largest fiber cross-sectional dimension of at least 10 microns and an average length of 1-20 mm, inclusive;
          (B) at least 30% by weight secondary fiber material intermixed with the bi-component fiber material, the secondary fiber material having an average largest fiber cross-sectional dimension of at least 1 micron and average length of 1 to 20 mm, inclusive; and
       (ii) the first, wet laid, media stage having
          (A) an added binder resin content of no greater than 7% by total weight of fiber material.

13. A crankcase ventilation filtration assembly according to claim 12 wherein:
    (a) the first, wet laid, media stage is tubular; is positioned for in-to-out filtering flow; and, has a height of 101 to 305 mm.

14. A crankcase ventilation filtration assembly according to claim 13 wherein:
    (a) the liquid drain outlet arrangement is configured for liquid flow through a portion of the gas flow inlet arrangement.

* * * * *